US012686018B2

(12) United States Patent

Aoyama et al.

(10) Patent No.: US 12,686,018 B2
(45) Date of Patent: Jul. 21, 2026

(54) BUBBLE LIQUID GENERATING NOZZLE

(71) Applicant: Science Co., Ltd., Osaka (JP)

(72) Inventors: Yasuaki Aoyama, Osaka (JP); Masateru Hirae, Osaka (JP); Takahiro Okumura, Osaka (JP); Yasuhiro Mizukami, Osaka (JP)

(73) Assignee: Science Co., Ltd., Osaka (JP)

( * ) Notice: Subject to any disclaimer, the term of this patent is extended or adjusted under 35 U.S.C. 154(b) by 0 days.

(21) Appl. No.: 18/845,228

(22) PCT Filed: May 26, 2022

(86) PCT No.: PCT/JP2022/021557
§ 371 (c)(1),
(2) Date: Sep. 9, 2024

(87) PCT Pub. No.: WO2023/210028
PCT Pub. Date: Nov. 2, 2023

(65) Prior Publication Data

US 2025/0099986 A1 Mar. 27, 2025

(30) Foreign Application Priority Data

Apr. 27, 2022 (JP) ................................ 2022-072949

(51) Int. Cl.
*B05B 1/34* (2006.01)
*A47K 3/28* (2006.01)
(Continued)

(52) U.S. Cl.
CPC .................. *B05B 1/34* (2013.01); *A47K 3/28* (2013.01); *B01F 23/2373* (2022.01);
(Continued)

(58) Field of Classification Search
CPC .... B05B 1/34; B05B 1/02; B05B 1/14; B05B 1/10; B05B 1/3489; B01F 23/2373; B01F 25/72; F02M 17/22; E03C 1/084
(Continued)

(56) References Cited

U.S. PATENT DOCUMENTS 5,143,295 A * 9/1992 Okayama .............. B05B 7/0425 239/432
5,269,495 A * 12/1993 Dobbeling ................ B05B 1/10 239/590
(Continued)

FOREIGN PATENT DOCUMENTS

CN 109046792 A * 12/2018 ............. B03D 1/025
CN 208177697 U 12/2018
(Continued)

OTHER PUBLICATIONS

First Office Action issued in CN 202280047624.1 dated Apr. 8, 2024; 19 pgs.

(Continued)

*Primary Examiner* — Arthur O. Hall
*Assistant Examiner* — Anna Thi Ho
(74) *Attorney, Agent, or Firm* — Vedder Price P.C.

(57) ABSTRACT

The present invention includes: a nozzle main body (1), which includes a tubular body (8) and a closing flat plate (9) that closes one tube end (8A) of the tubular body (8), and in which an inflow space (δ) into which a liquid flows is formed in the tubular body (8); a liquid jetting hole (2) penetrating through the closing flat plate (9) and communicating to the inflow space (δ); and a liquid guide (23) arranged in the liquid jetting hole (2) from the inflow space (δ). The liquid guide (23) is mounted in the liquid jetting hole (2) from a conical upper surface (23A) so as to form a liquid flow path (ε) between the uneven surface of the (Continued)

conical side surface (23C) and a conical inner peripheral surface (2*a*) of the liquid jetting hole (2).

4 Claims, 60 Drawing Sheets

(51) Int. Cl.
*B01F 23/2373* (2022.01)
*B01F 25/72* (2022.01)
*B05B 1/02* (2006.01)
*B05B 1/14* (2006.01)
*E03C 1/084* (2006.01)

(52) U.S. Cl.
CPC ................ *B01F 25/72* (2022.01); *B05B 1/02* (2013.01); *B05B 1/14* (2013.01); *E03C 1/084* (2013.01)

(58) Field of Classification Search
USPC .......................................................... 239/601
See application file for complete search history.

(56) References Cited

U.S. PATENT DOCUMENTS 5,862,985 A * 1/1999 Neibrook .................. B05B 3/04 239/444
6,357,677 B1 * 3/2002 Ren .................... F02M 51/0675 239/585.4
9,388,557 B2 * 7/2016 Blum .................... B05B 1/3026
9,839,923 B2 * 12/2017 Ramos De Barros ....................... B05B 15/5225
10,369,579 B1 * 8/2019 Badovick .............. B05B 7/0483
11,097,290 B2 * 8/2021 Wu .......................... B05B 1/12
2006/0131447 A1 * 6/2006 Masuda ............. F02M 61/1853 239/533.2
2011/0079664 A1 * 4/2011 Stednitz .................... B05B 1/14 239/428.5
2012/0061492 A1 * 3/2012 Peng ....................... E03C 1/084 239/548
2012/0168538 A1 7/2012 Han
2013/0193237 A1 * 8/2013 Erickson ................... B05B 1/16 239/548
2014/0008462 A1 * 1/2014 Gransow ................... B05B 1/14 239/391
2014/0252139 A1 * 9/2014 Bandawat ............... B05B 1/341 239/589
2017/0197223 A1 * 7/2017 Otoguro .................. B05B 7/005
2018/0126395 A1 * 5/2018 Klassen ................ B05B 1/3006
2019/0143345 A1 5/2019 Hasday et al.
2019/0330829 A1 * 10/2019 Juan .................... B01F 23/2323
2020/0030825 A1 * 1/2020 Otoguro ................ B01F 25/431
2020/0114374 A1 * 4/2020 Wu ....................... B05B 3/0422
2020/0206761 A1 * 7/2020 Fan ......................... B05B 1/185
2021/0162429 A1 6/2021 Mizukami et al.
2021/0270021 A1 * 9/2021 Ohara ..................... E03C 1/086
2021/0283384 A1 * 9/2021 Mezzoli ................ A61M 31/00
2022/0362724 A1 * 11/2022 Volpato ................. B29B 7/7615

FOREIGN PATENT DOCUMENTS

CN 111343891 A 6/2020
JP 2006-177174 A 7/2006
JP 2013252467 A * 12/2013
JP 2015-93219 A 5/2015
JP 2015100720 A * 6/2015
JP 6210857 B2 * 10/2017
JP 2017-225961 A 12/2017
JP 2019-129927 A 8/2019
JP 2020-10962 A 1/2020
JP 2020142219 A * 9/2020
WO WO-2018024159 A1 * 2/2018 ................ B01F 3/04

OTHER PUBLICATIONS

International Search Report issued in PCT/JP2022/021557; dated Aug. 2, 2022; 7 pgs.
Notice of Reasons for Refusal; Application No. JP2022-072949; dated Aug. 9, 2024; 10 pgs.
Written Opinion of the International Search Authority issued in PCT/JP2022-021557; issued on May 21, 2022; 4 pgs.
European Search Report issued on Jul. 8, 2025 in EP Application No. 22940299.5, 16 pgs.

* cited by examiner ( b )

(a)

(b)

（a）

（b）

(a)

(b)

(a)

(b)

(a)

(b)

BUBBLE LIQUID GENERATING NOZZLE

CROSS-REFERENCE TO RELATED APPLICATIONS

The present application is based on and claims priority to PCT/JP2022/021557 filed, on May 26, 2022, which claims priority to Japanese application for Application No. JP2022-072949, filed on Apr. 27, 2022, the disclosure of which is hereby incorporated into the present disclosure by reference in its entirety.

TECHNICAL FIELD

The present invention relates to a bubble liquid generating nozzle that generates (produces) and ejects a bubble liquid.

BACKGROUND ART

As a technology for generating a bubble liquid, in Patent Literature 1, there is a disclosure of a microbubble generating device. The microbubble generating device includes a holder, an inlet adapter, and a mixing adapter, and each of the adapters is mounted to the holder. The inlet adapter has a liquid throttle hole that is gradually reduced in diameter toward the mixing adapter in a liquid flow path. The mixing adapter has a liquid flow path that is gradually increased in diameter toward a liquid outflow port.

The microbubble generating device causes a liquid to flow into the liquid throttle hole of the inlet adapter from a liquid inflow port and ejects the liquid into the liquid flow path of the mixing adapter. The microbubble generating device mixes the liquid with air on a jetting side of the liquid throttle hole to generate microbubbles in the liquid flow path of the mixing adapter.

CITATION LIST

Patent Literature

[PTL 1] JP 2015-93219 A

SUMMARY

Technical Problem

In Patent Literature 1, a certain amount of microbubbles can be generated by ejecting the liquid from the liquid throttle hole and mixing the liquid with air, to thereby pulverize (shear) the air. However, it is desired that the amount of the microbubbles to be mixed and dissolved in the liquid be increased, and ultrafine bubbles be mixed and dissolved therein.

An object of the present invention is to provide a bubble liquid generating nozzle capable of generating (producing) a bubble liquid in which a large amount of microbubbles and a large amount of ultrafine bubbles are mixed and dissolved and ejecting the bubble liquid.

Solution to Problem

According to a first embodiment of the present invention, there is provided a bubble liquid generating nozzle, including: a nozzle main body, which includes a tubular body and a closing body that closes one tube end of the tubular body, and in which an inflow space into which a liquid flows is formed inside the tubular body between another tube end of the tubular body and the closing body; a liquid jetting hole penetrating through the closing body and communicating to the inflow space; and a liquid guide formed in a three-dimensional shape and arranged in the liquid jetting hole. A side surface of the liquid guide is formed in a shape of an uneven surface on which a convex portion and a concave portion are arranged. The liquid guide is inserted into the liquid jetting hole with a gap between the side surface and an inner peripheral surface of the liquid jetting hole. The liquid guide is mounted in the liquid jetting hole so as to form a liquid flow path between the uneven surface and the inner peripheral surface. The liquid flow path is formed in an annular shape over a circumferential direction of the liquid jetting hole between the uneven surface and the inner peripheral surface of the liquid jetting hole and communicates to the inflow space.

According to a second embodiment of the present invention, there is provided a bubble liquid generating nozzle, including: a nozzle main body, which includes a tubular body and a closing body that closes one tube end of the tubular body, and in which an inflow space into which a liquid flows is formed inside the tubular body between another tube end of the tubular body and the closing body; a liquid jetting hole penetrating through the closing body and communicating to the inflow space; and a liquid guide formed in a three-dimensional shape and arranged in the liquid jetting hole. An inner peripheral surface of the liquid jetting hole is formed in a shape of an uneven surface on which a convex portion and a concave portion are arranged. The liquid guide is inserted into the liquid jetting hole with a gap between a side surface of the liquid guide and the inner peripheral surface. The liquid guide is mounted in the liquid jetting hole so as to form a liquid flow path between the side surface and the uneven surface. The liquid flow path is formed in an annular shape over a circumferential direction of the liquid jetting hole between the uneven surface and the side surface of the liquid guide and communicates to the inflow space.

According to a third embodiment of the present invention, there is provided a bubble liquid generating nozzle, including: a nozzle main body, which includes a tubular body and a closing body that closes one tube end of the tubular body, and in which an inflow space into which a liquid flows is formed inside the tubular body between another tube end of the tubular body and the closing body; a liquid jetting hole penetrating through the closing body and communicating to the inflow space; and a liquid guide formed in a conical shape and arranged in the liquid jetting hole from the inflow space. The liquid jetting hole is formed in a shape of a conical hole penetrating through the closing body while being reduced in diameter from the inflow space side. A conical side surface of the liquid guide is formed in a shape of an uneven surface on which a convex portion and a concave portion are arranged. The liquid guide is inserted into the liquid jetting hole from a conical upper surface of the liquid guide with a gap between the conical side surface and a conical inner peripheral surface of the liquid jetting hole. The liquid guide is mounted in the liquid jetting hole so as to form a liquid flow path between the uneven surface and the conical inner peripheral surface. The liquid flow path is formed in an annular shape over a circumferential direction of the liquid jetting hole between the uneven surface and the conical inner peripheral surface of the liquid jetting hole and communicates to the inflow space.

In the third embodiment, it is also possible to adopt a configuration in which the liquid guide is inserted into the liquid jetting hole from the conical upper surface of the liquid guide with a gap between the conical side surface and the conical inner peripheral surface of the guide throttle hole, and is arranged so that a conical bottom surface side of the liquid guide protrudes from the liquid jetting hole to the inflow space.

According to a fourth embodiment of the present invention, in the bubble liquid generating nozzle according to the third embodiment, the conical side surface of the liquid guide is formed in a shape of an uneven surface on which a plurality of convex portions and a plurality of concave portions are arranged.

According to a fifth embodiment of the present invention, in the bubble liquid generating nozzle according to the third embodiment, each of the convex portions is arranged so as to be separated at arrangement angles between each of the convex portions in the circumferential direction of the liquid guide. Each of the concave portions is arranged between each of the convex portions so as to be separated at arrangement angles between each of the concave portions in the circumferential direction of the liquid guide. Each of the convex portions and each of the concave portions extend between the conical upper surface and a conical bottom surface of the liquid guide in a direction of a cone center line of the liquid guide.

According to a sixth embodiment of the present invention, in the bubble liquid generating nozzle according to claim 4, each of the convex portions is formed in an annular shape. Each of the convex portions is arranged concentrically with a cone center line of the liquid guide. Each of the convex portions is arranged so as to be separated at arrangement intervals between each of the convex portions in a direction of the cone center line of the liquid guide. Each of the concave portions is formed in an annular shape. Each of the concave portions is arranged concentrically with the cone center line of the liquid guide. Each of the concave portions is arranged between each of the convex portions so as to be separated at arrangement intervals between each of the concave portions in the direction of the cone center line of the liquid guide.

According to a seventh embodiment of the present invention, in the bubble liquid generating nozzle according to the third embodiment, the convex portion is formed in a helical shape. The concave portion is formed in a helical shape, and is arranged so as to be interposed in the convex portion formed in the helical shape. The convex portion and the concave portion are arranged concentrically with a cone center line of the liquid guide. The convex portion and the concave portion extend in a helical shape while being reduced in diameter toward the conical upper surface from a conical bottom surface of the liquid guide in a direction of the cone center line of the liquid guide.

According to an eighth embodiment of the present invention, there is provided a bubble liquid generating nozzle, including: a nozzle main body, which includes a tubular body and a closing body that closes one tube end of the tubular body, and in which an inflow space into which a liquid flows is formed in the tubular body between another tube end of the tubular body and the closing body; a plurality of liquid jetting holes each penetrating through the closing body and communicating to the inflow space; a guide ring arranged in the inflow space concentrically with the tubular body; a plurality of guide ribs arranged inside the guide ring; and a plurality of liquid guides each formed in a conical shape and each arranged in each of the liquid jetting holes from the inflow space. Each of the liquid jetting holes is arranged so as to be separated at hole angles between each of the liquid jetting holes in a circumferential direction of the tubular body. Each of the liquid jetting holes is formed in a shape of a conical hole penetrating through the closing body while being reduced in diameter from the inflow space side. Each of the guide ribs is arranged so as to be separated at rib angles between each of the guide ribs in a circumferential direction of the guide ring, to thereby form a communication hole between each of the guide ribs. Each of the guide ribs is arranged in the flow path space with a guide interval between each of the guide ribs and the closing body in a direction of a tube center line of the tubular body, to thereby partition a flow path space between each of the guide ribs and the closing body. Each of the communication holes communicates to the inflow space on another tube end side of the tubular body and the flow path space. A conical side surface of each of the liquid guides is formed in a shape of an uneven surface on which a convex portion and a concave portion are arranged. Each of the liquid guides is arranged so as to be separated at guide angles between each of the liquid guides in the circumferential direction of the guide ring. Each of the liquid guides is fixed to each of the guide ribs so that a conical bottom surface of the liquid guide is brought into abutment against each of the guide ribs. Each of the liquid guides is inserted into each of the liquid jetting holes from a conical upper surface of the liquid guide with a gap between the conical side surface and a conical inner peripheral surface of each of the liquid jetting holes, and is arranged so that the conical bottom surface side protrudes to the flow path space. Each of the liquid guides is mounted in each of the liquid jetting holes so as to form a liquid flow path between the uneven surface and the conical inner peripheral surface. Each of the liquid flow paths is formed in an annular shape over a circumferential direction of the liquid jetting hole between the uneven surface and the conical inner peripheral surface of the liquid jetting hole and communicates to the flow path space.

According to a ninth embodiment of the present invention, there is provided a bubble liquid generating nozzle, including: a nozzle main body, which includes a tubular body and a closing body that closes one tube end of the tubular body, and in which an inflow space into which a liquid flows is formed inside the tubular body between another tube end of the tubular body and the closing body; a liquid jetting hole penetrating through the closing body and communicating to the inflow space; and a liquid guide formed in a conical shape and arranged in the liquid jetting hole from the inflow space. The liquid jetting hole is formed in a shape of a conical hole penetrating through the closing body while being reduced in diameter from the inflow space side. A conical inner peripheral surface of the liquid jetting hole is formed in a shape of an uneven surface on which a convex portion and a concave portion are arranged. The liquid guide is inserted into the liquid jetting hole from a conical upper surface of the liquid guide with a gap between a conical side surface of the liquid guide and the conical inner peripheral surface. The liquid guide is mounted in the liquid jetting hole so as to form a liquid flow path between the conical side surface and the uneven surface. The liquid flow path is formed in an annular shape over a circumferential direction of the liquid jetting hole between the uneven surface and the conical side surface of the liquid guide and communicates to the inflow space.

According to a tenth embodiment of the present invention, there is provided a bubble liquid generating nozzle, including: a nozzle main body, which includes a tubular body and a closing body that closes one tube end of the tubular body, and in which an inflow space into which a liquid flows is formed inside the tubular body between another tube end of the tubular body and the closing body; a liquid jetting hole penetrating through the closing body and communicating to the inflow space; and a liquid guide formed in a columnar shape and arranged in the liquid jetting hole. The liquid jetting hole is formed in a shape of a circular hole penetrating through the closing body. An outer peripheral side surface of the liquid guide is formed in a shape of an uneven surface on which a convex portion and a concave portion are arranged. The liquid guide is inserted into the liquid jetting hole with a gap between the outer peripheral side surface and an inner peripheral surface of the liquid jetting hole. The liquid guide is mounted in the liquid jetting hole so as to form a liquid flow path between the uneven surface and the inner peripheral surface. The liquid flow path is formed in an annular shape over a circumferential direction of the liquid jetting hole between the uneven surface and the inner peripheral surface of the liquid jetting hole and communicates to the inflow space.

According to an eleventh embodiment of the present invention, there is provided a bubble liquid generating nozzle, including: a nozzle main body, which includes a tubular body and a closing body that closes one tube end of the tubular body, and in which an inflow space into which a liquid flows is formed inside the tubular body between another tube end of the tubular body and the closing body; a liquid jetting hole penetrating through the closing body and communicating to the inflow space; and a liquid guide formed in a columnar shape and arranged in the liquid jetting hole. The liquid jetting hole is formed in a shape of a circular hole penetrating through the closing body. An inner peripheral surface of the liquid jetting hole is formed in a shape of an uneven surface on which a convex portion and a concave portion are arranged. The liquid guide is inserted into the liquid jetting hole with a gap between an outer peripheral side surface of the liquid guide and the inner peripheral surface. The liquid guide is mounted in the liquid jetting hole so as to form a liquid flow path between the outer peripheral side surface and the uneven surface. The liquid flow path is formed in an annular shape over a circumferential direction of the liquid jetting hole between the uneven surface and the outer peripheral side surface of the liquid guide and communicates to the inflow space.

Advantageous Effects of Invention

According to the present invention, it is possible to generate (produce) a bubble liquid in which a large amount of microbubbles and a large amount of ultrafine bubbles are mixed and dissolved and eject (jet) the bubble liquid from a liquid flow path.

According to the present invention, a soft annular liquid (annular liquid film or annular bubble liquid film) can be ejected to an ejection target by forming a bubble liquid into an annular (circular annular) liquid (liquid film) through an annular (circular annular) liquid flow path.

In the international standard "ISO20480-1" of the International Organization for Standardization (ISO), air bubbles of 1 micrometer (μm) or more and 100 micrometers (μm) are defined as "microbubbles", and air bubbles of less than 1 micrometer (μm) are defined as "ultrafine bubbles" (same below).

DESCRIPTION OF EMBODIMENTS

Figure 1:
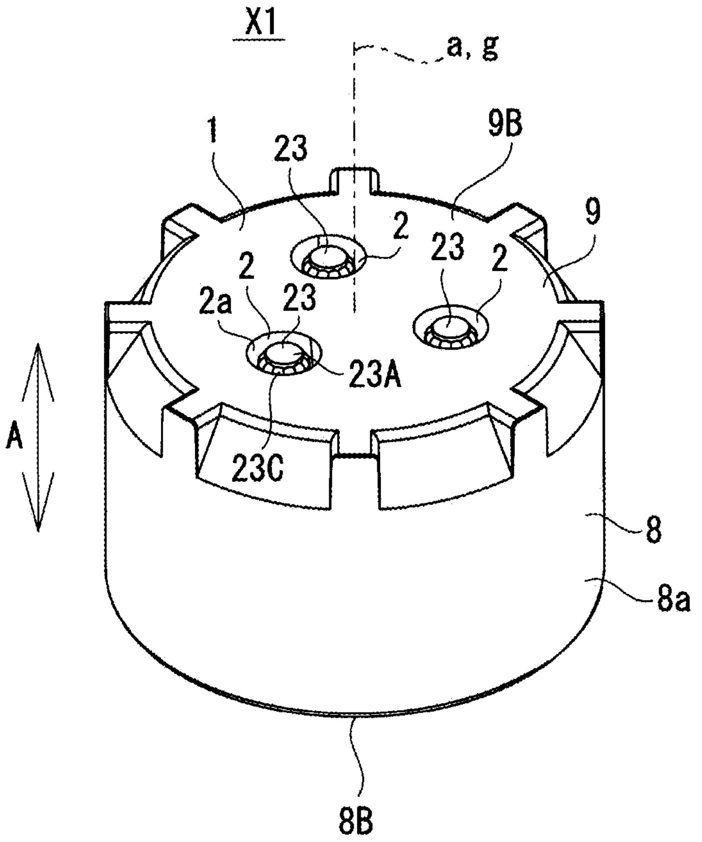
FIG. 1 is a perspective view for illustrating a bubble liquid generating nozzle according to a first embodiment.
Figure 2:
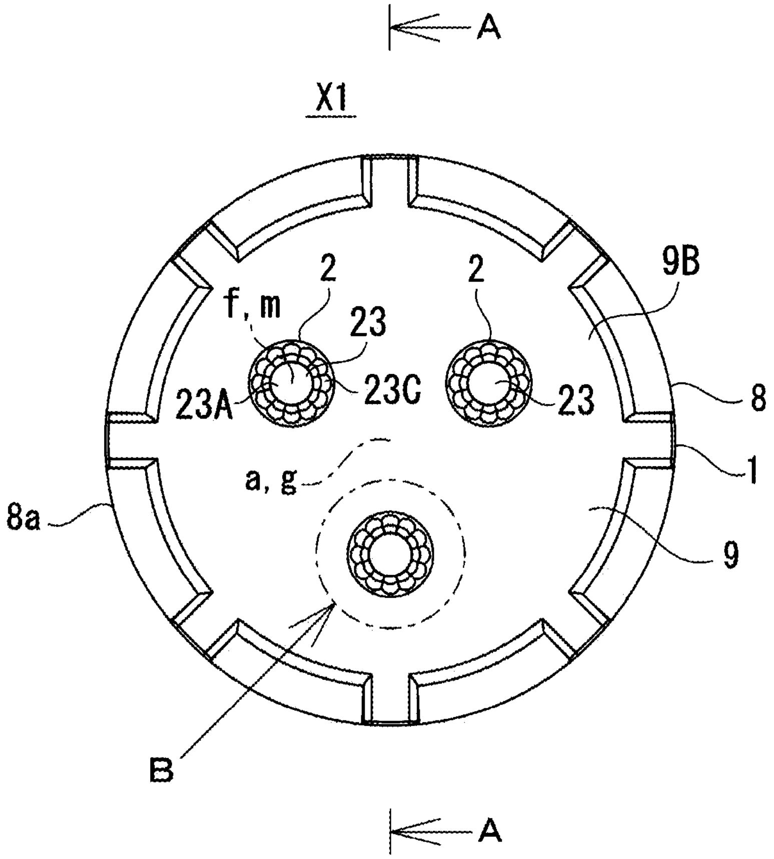
FIG. 2 is a top plan view (top view) for illustrating the bubble liquid generating nozzle according to the first embodiment.

A bubble liquid generating nozzle according to the present invention is described with reference to FIG. 1 to FIGS. 62.

Bubble liquid generating nozzles according to first to sixth embodiments are described below with reference to FIG. 1 to FIGS. 62.

A bubble liquid generating nozzle according to a first embodiment is described with reference to FIG. 1 to FIGS. 14.

In FIG. 1 to FIGS. 14, a bubble liquid generating nozzle X1 according to the first embodiment (hereinafter referred to as "bubble liquid generating nozzle X1") includes a nozzle main body 1, a plurality of (for example, three) liquid jetting holes 2 (liquid throttle holes), and a liquid guide body 3 (liquid guides 23).

As illustrated in FIG. 1 to FIGS. 9, the nozzle main body 1 includes a tubular body 8, a closing body 9, and a plurality of (for example, three) connecting tubular portions 10.

As illustrated in FIG. 1 to FIG. 3, FIGS. 5, and FIG. 7 to FIGS. 9, the tubular body 8 is formed in, for example, a cylindrical shape (cylindrical body).

As illustrated in FIG. 1 to FIG. 3, FIGS. 5, and FIG. 7 to FIGS. 9, the closing body 9 is formed in, for example, a circular flat plate (hereinafter referred to as "closing flat plate 9 (nozzle flat plate)"). The closing flat plate 9 (nozzle flat plate) is arranged concentrically with the tubular body 8. The closing flat plate 9 closes one tube end 8A of the tubular body 8 so that one closing plate flat surface 9A (one nozzle plate surface/one nozzle plate flat surface) is brought into abutment against the one tube end 8A of the tubular body 8. The closing flat plate 9 (closing body) is formed integrally with the tubular body 8 with a synthetic resin or the like.

As illustrated in FIG. 3, FIGS. 5, FIGS. 8, and FIGS. 9, in the nozzle main body 1, an inflow space "δ" is formed inside the tubular body 8 between another tube end 8B of the tubular body 8 and the closing flat plate 9. A liquid flows into the inflow space "δ".

Figure 8:
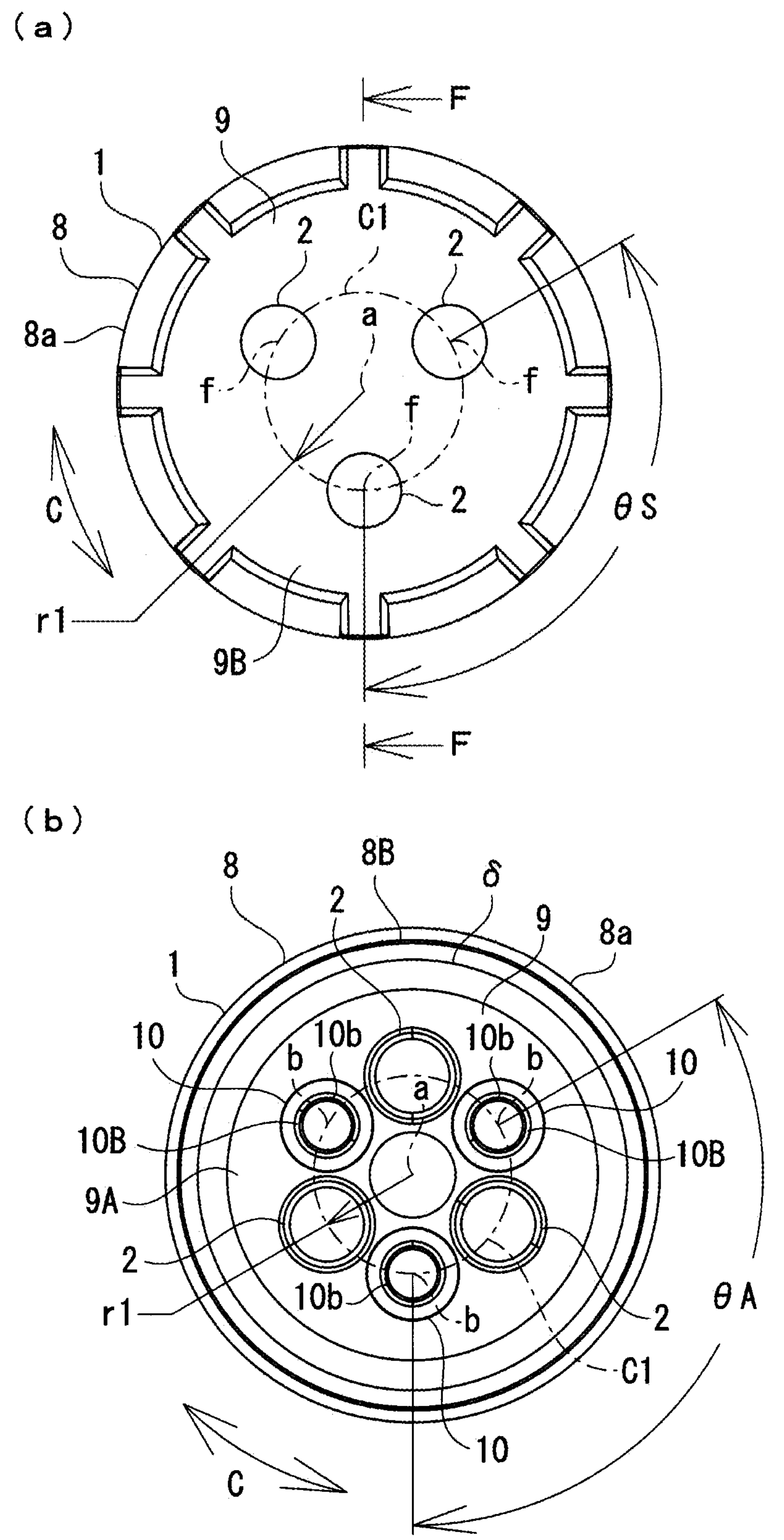
FIG. 8(*a*) is a top plan view (top view) for illustrating the nozzle main body in the bubble liquid generating nozzle according to the first to third embodiments, and FIG. 8(*b*) is a bottom plan view (bottom view) for illustrating the nozzle main body.
Figure 9:
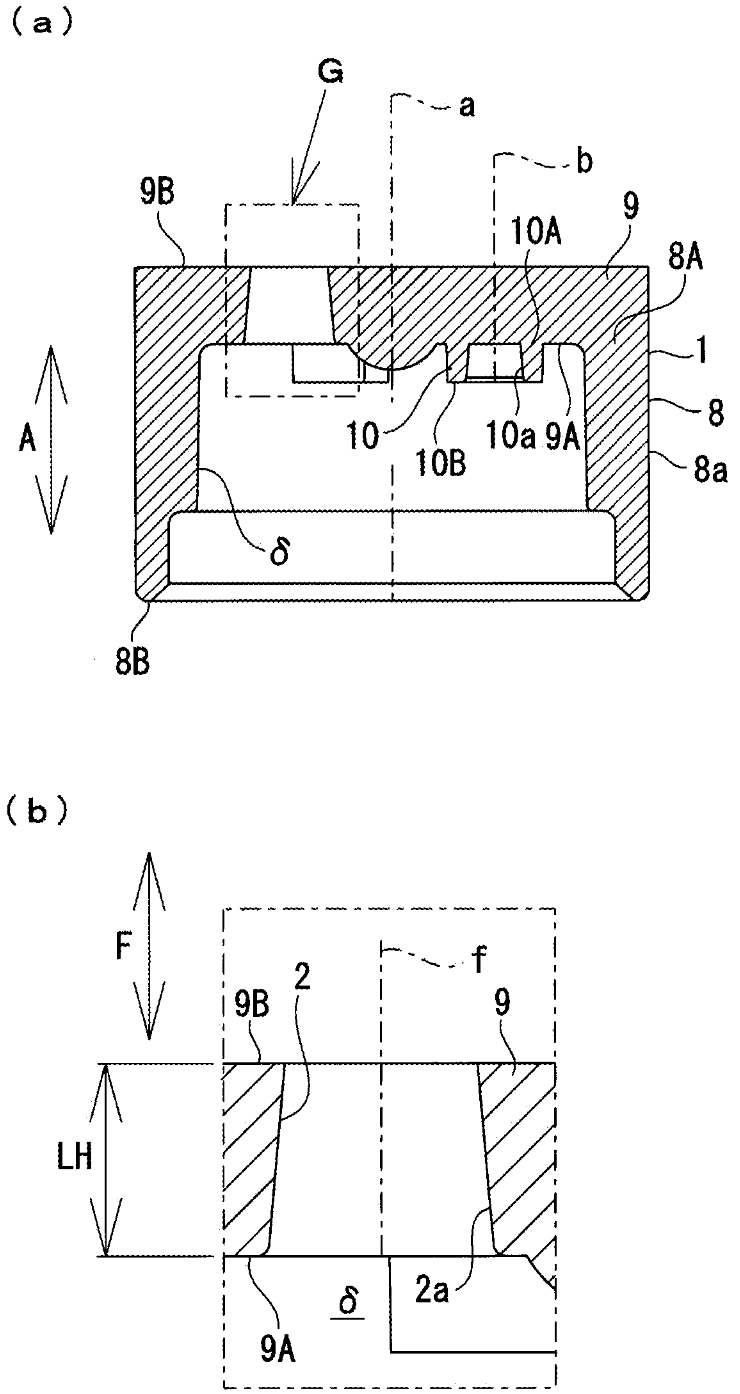
FIG. 9(*a*) is a sectional view taken along the line F-F of FIG. 8(*a*), and FIG. 9(*b*) is an enlarged view of a G-portion of FIG. 9(*a*).

As illustrated in FIGS. 8 and FIGS. 9, each of the connecting tubular portions 10 is formed in, for example, a cylindrical shape. Each of the connecting tubular portions 10 is arranged between a tube center line "a" of the tubular body 8 and an outer periphery 8*a* (outer peripheral surface) of the tubular body 8 in a radial direction of the tubular body 8. Each of the connecting tubular portions 10 is arranged on a circle C1 having a radius r1 centered at the tube center line "a" of the tubular body 8. Each of the connecting tubular portions 10 is arranged so that a tube center line "b" of the connecting tubular portion 10 is located at (matched with) the circle C1. Each of the connecting tubular portions 10 is arranged so as to be separated at tube angles θA (equal angles) between each of the connecting tubular portions 10 in a circumferential direction C of the tubular body 8.

As illustrated in FIGS. 8 and FIGS. 9, each of the connecting tubular portions 10 is arranged in the inflow space "δ" (inside the tubular body 8) so that one connecting tube end 10A is brought into abutment against the one closing plate flat surface 9A of the closing flat plate 9. Each of the connecting tubular portions 10 is fixed to the closing flat plate 9 (closing body) so as to protrude from the one closing plate flat surface 9A of the closing flat plate 9 to the inflow space "δ" (into the tubular body 8) in a direction A of the tube center line "a" of the tubular body 8. Each of the connecting tubular portions 10 has an inner peripheral surface 10*b* having a conical shape (conical inner peripheral surface) that is gradually reduced in diameter from another connecting tube end 10B of the connecting tubular portion 10 to the one connecting tube end 10A (closing flat plate 9).

Each of the connecting tubular portions 10 is formed integrally with the closing flat plate 9 (nozzle main body) with a synthetic resin or the like.

Figure 7:
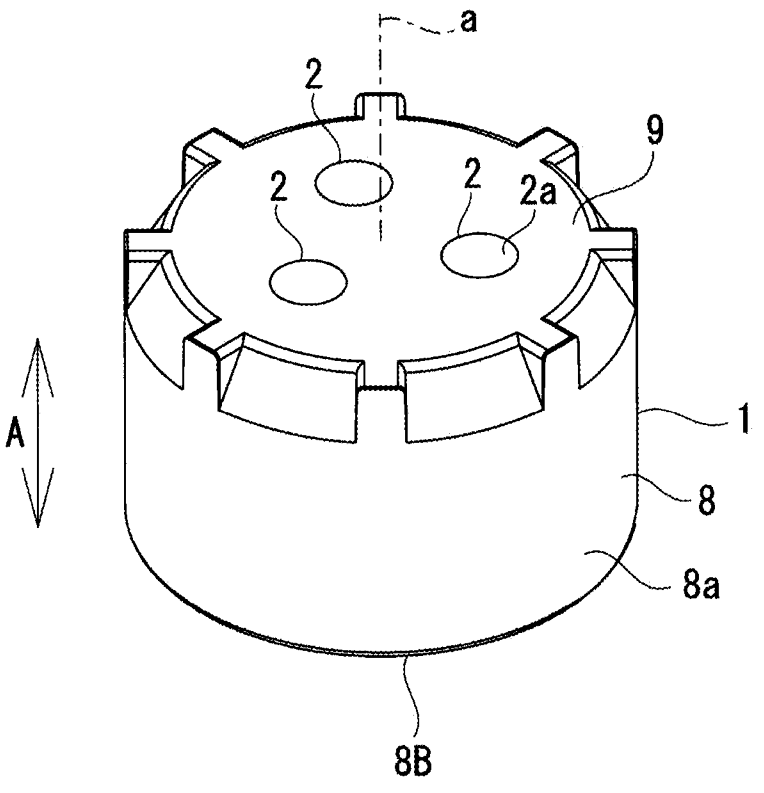
FIG. 7 is a perspective view for illustrating a nozzle main body in a bubble liquid generating nozzle according to first to third embodiments.

As illustrated in FIG. 7 to FIGS. 9, each of the liquid jetting holes 2 (liquid throttle holes) is formed in the closing flat plate 9 (nozzle main body 1). Each of the liquid jetting holes 2 is arranged between the tube center line "a" of the tubular body 8 and the outer periphery 8*a* of the tubular body 8 in the radial direction of the tubular body 8. Each of the liquid jetting holes 2 is arranged on the circle C1. Each of the liquid jetting holes 2 is arranged so that a hole center line "f" is located at (matched with) the circle C1. Each of the liquid jetting holes 2 is arranged so as to be separated at hole angles θS (equal angles) between each of the liquid jetting holes 2 in the circumferential direction C of the tubular body 8. Each of the liquid jetting holes 2 is arranged between each of the connecting tubular portions 10 (at the center between each of the connecting tubular portions 10) in the circumferential direction C of the tubular body 8.

As illustrated in FIG. 7 to FIGS. 9, each of the liquid jetting holes 2 penetrates through the closing flat plate 9 (closing body) in the direction A of the tube center line "a" of the tubular body 8 to be opened to each of the closing plate flat surfaces 9A and 9B (each nozzle plate surface/each nozzle plate flat surface) of the closing flat plate 9 (nozzle flat plate). Each of the liquid jetting holes 2 communicates to the inflow space "δ". Each of the liquid jetting holes 2 is formed in a shape of a conical hole (truncated cone hole) penetrating through the closing flat plate 9 (closing body) while being reduced in diameter from the inflow space "δ" side in the direction A of the tube center line "a" of the tubular body 8.

Each of the liquid jetting holes 2 has a jetting hole length LH in a direction F of the hole center line "f".

As illustrated in FIG. 10 to FIGS. 13, the liquid guide body 3 (guide fixed body) includes a guide ring 21, a plurality of (for example, six) guide ribs 22 (guide legs), a plurality of (for example, three) liquid guides 23, and a plurality of (for example, three) connecting protrusions 24.

The liquid guide body 3 is constructed by integrally forming the guide ring 21, each of the guide ribs 22, each of the liquid guides 23, and each of the connecting protrusions 24 with a synthetic resin or the like.

As illustrated in FIG. 10 to FIGS. 14, the guide ring 21 is formed in, for example, a circular annular shape (annular body). The guide ring 21 has a ring thickness in a direction G of a ring center line "g". The guide ring 21 has a ring front surface 21A and a ring back surface 21B in a ring thickness direction (direction G of the ring center line "g"). The ring front surface 21A and the ring back surface 21B are arranged in parallel, with the ring thickness in the ring thickness direction.

As illustrated in FIG. 10 to FIGS. 13, each of the guide ribs 22 (guide leg portions) is arranged inside the guide ring 21 and fixed to the guide ring 21. Each of the guide ribs 22 is arranged so as to be separated at rib angles θP (equal angles) between each of the guide ribs 22 in the circumferential direction C of the guide ring 21. The rib angle θP is, for example, 60 degrees (60°).

As illustrated in FIG. 10 to FIGS. 13, each of the guide ribs 22 has a rib width in the circumferential direction C of the guide ring and a ring length in a radial direction of the guide ring 21 and extends between the ring center line "g" of the guide ring 21 and an inner periphery 21*a* (inner peripheral surface) of the guide ring 21. Each of the guide rings 21 is radially arranged in a radially outward direction from the ring center line "g" of the guide ring 21 and extends between the ring center line "g" and the inner periphery 21*a* of the guide ring 21.

Each of the guide ribs 22 is connected to each other at a ring center of the guide ring 21 and connected (fixed) to the inner periphery 21*a* of the guide ring 21.

As illustrated in FIG. 10 to FIGS. 13, each of the guide ribs 22 has the same rib thickness as that of the guide ring 21 in the direction G of the ring center line "g" of the guide ring 21. Each of the guide ribs 22 has a rib front surface 22A and a rib back surface 22B in a rib thickness direction. The rib front surface 22A and the rib back surface 22B are arranged in parallel, with the rib thickness in the rib thickness direction. Each of the guide ribs 22 is arranged inside the guide ring 21 so that the rib front surface 22A is flush with the ring front surface 21A.

As illustrated in FIG. 10 to FIGS. 13, each of the guide ribs 22 is fixed to the guide ring 21 so as to form a communication hole 25 between each of the guide ribs 22. Each of the communication holes 25 is formed between each of the guide ribs 22. The communication hole 25 extends in the direction G of the ring center line "g" of the guide ring 21 to be opened to the ring front surface 21A (rib front surface 22A) and the ring back surface 21B (rib back surface 22B).

As illustrated in FIG. 10 to FIGS. 14, each of the liquid guides 23 is formed in a three-dimensional shape having a pair of end faces and a side surface arranged (formed) between each of the end faces. Each of the liquid guides 23 is formed in a conical shape (truncated cone). Each of the liquid guides 23 has a conical upper surface 23A (one end face), a conical bottom surface 23B (another end face), and a conical side surface 23C (side surface). The conical side surface 23C (side surface) of each of the liquid guides 23 is formed (arranged) between the conical upper surface 23A and the conical bottom surface 23B (between each of the end faces). The conical side surface 23C (side surface) of each of the liquid guides 23 is formed in a shape of an uneven surface (uneven shape) on which a convex portion 27 and a concave portion 28 are arranged. The conical side surface 23C (side surface) of each of the liquid guides 23 is formed in a shape of an uneven surface (uneven shape) having a plurality of convex portions 27 and a plurality of concave portions 28.

Figure 11:
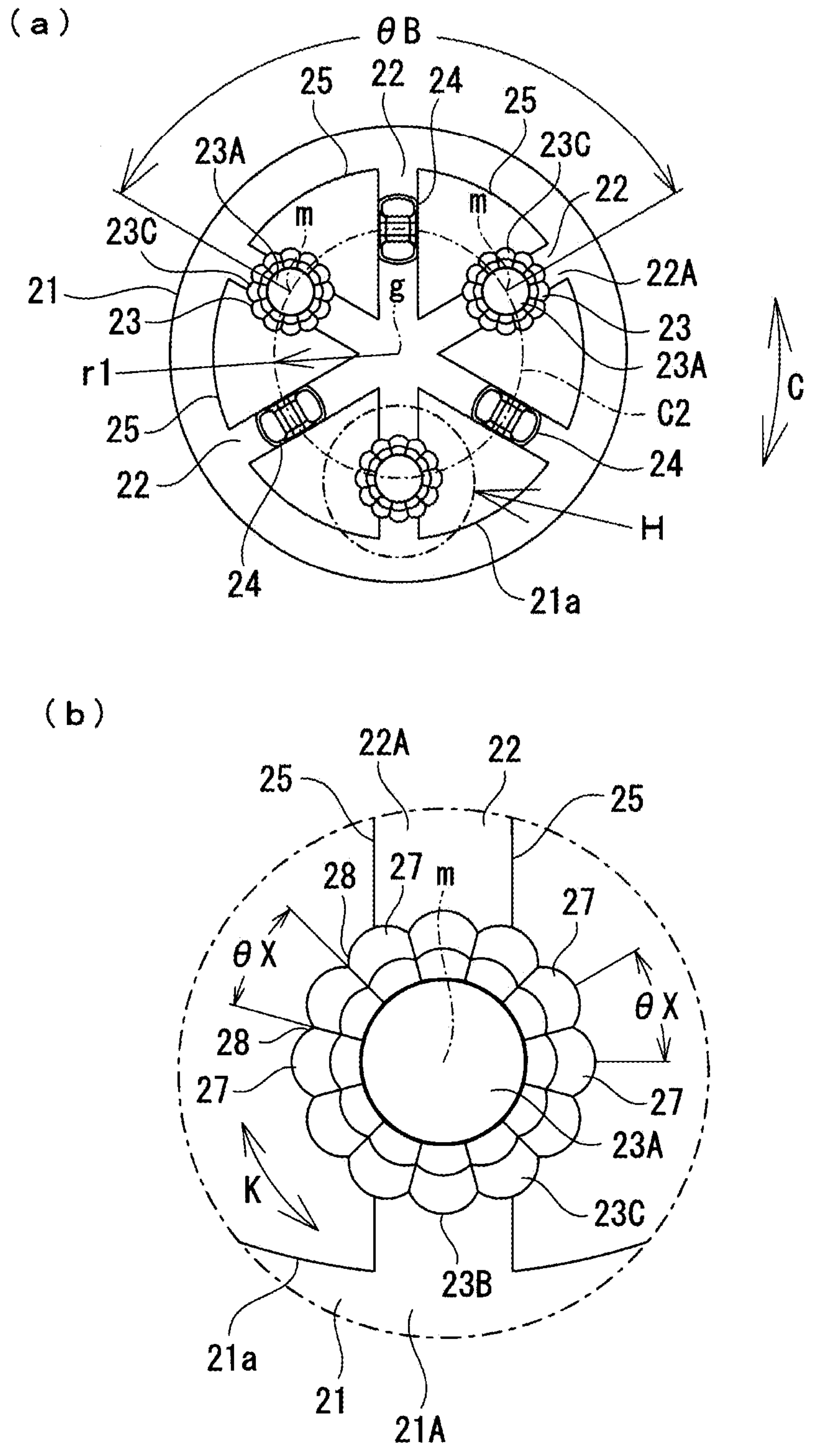
FIG. 11(*a*) is a top plan view (top view) for illustrating the liquid guide body (for example, liquid guides) in the bubble liquid generating nozzle according to the first embodiment, and FIG. 11(*b*) is an enlarged view of an H-portion of FIG. 11(*a*).
Figure 13:
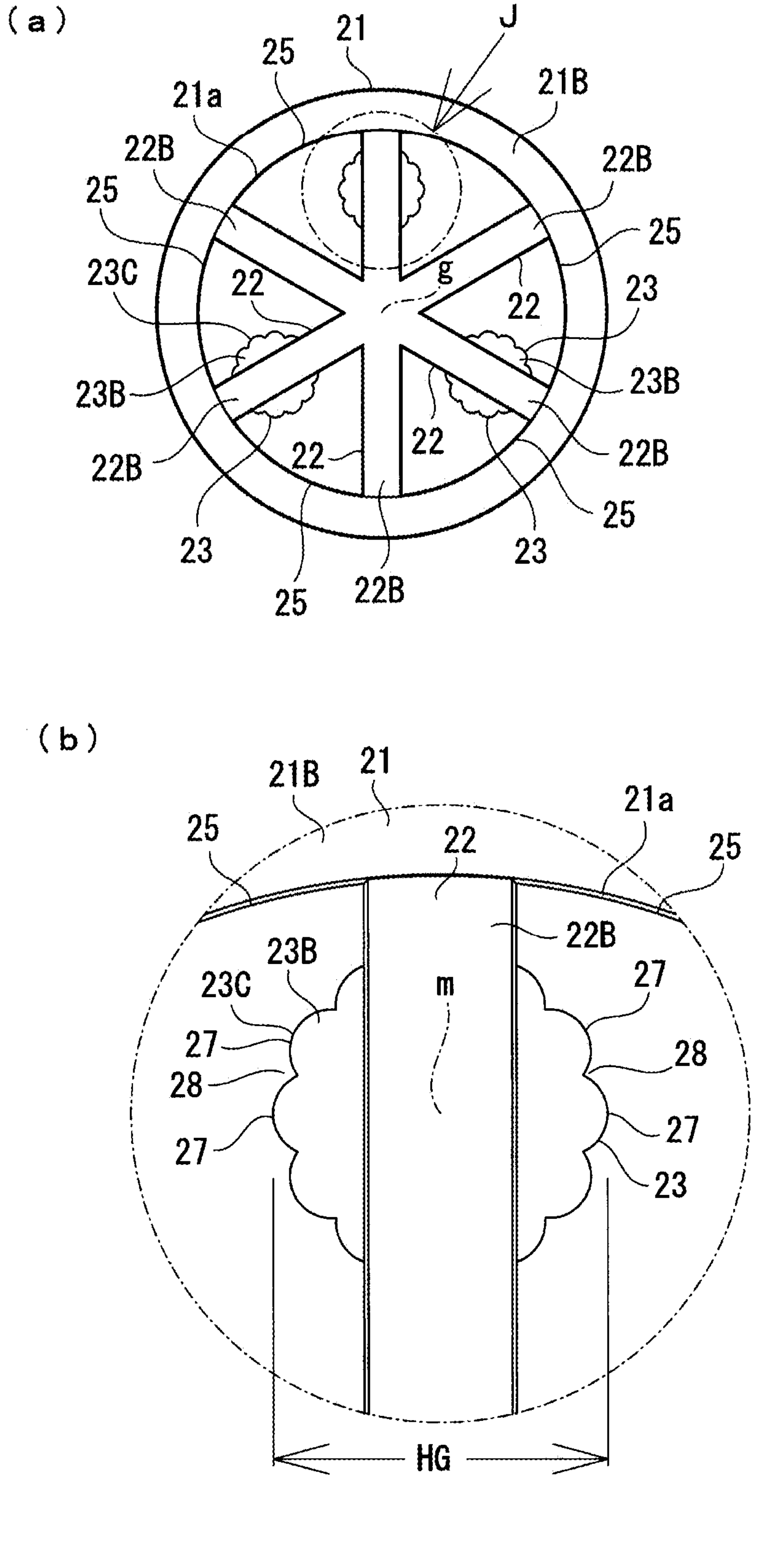
FIG. 13(*a*) is a bottom plan view (bottom view) for illustrating the liquid guide body in the bubble liquid generating nozzle according to the first embodiment, and FIG. 13(*b*) is an enlarged view of a J-portion of FIG. 13(*a*).
Figure 14:
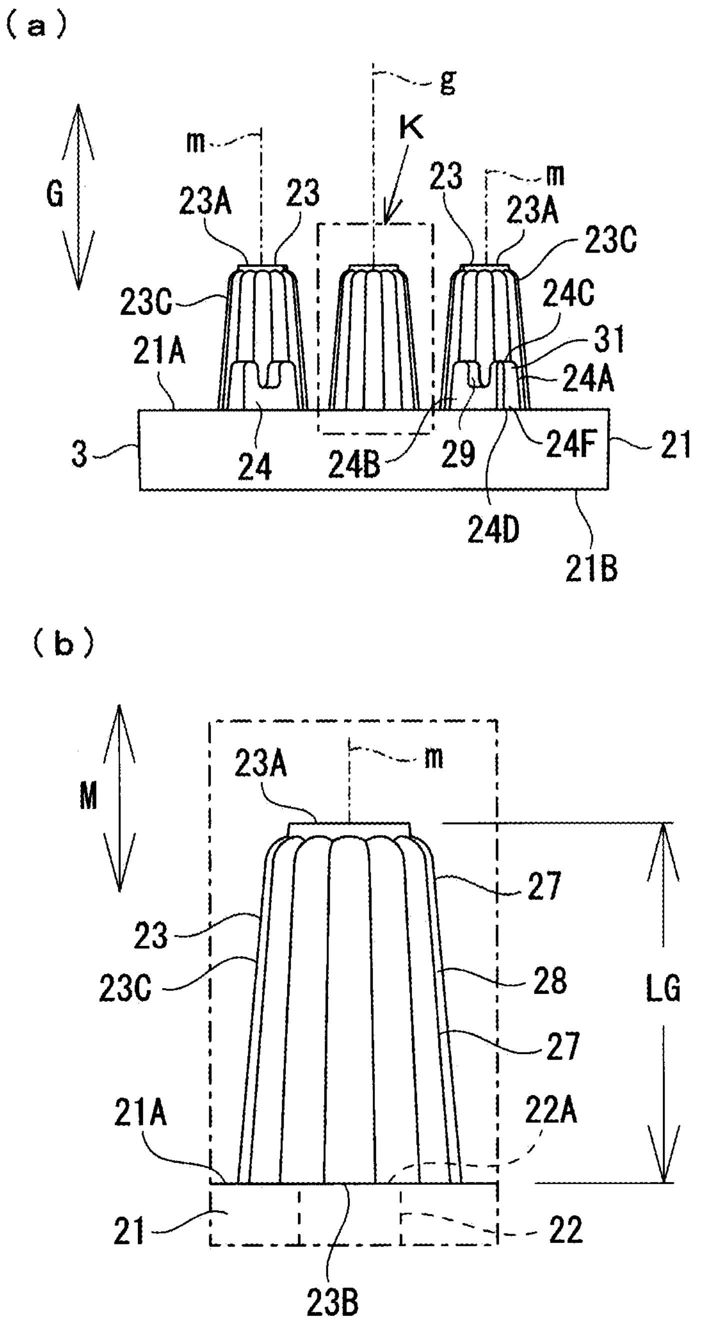
FIG. 14(*a*) is a side view for illustrating the liquid guide body in the bubble liquid generating nozzle according to the first embodiment, and FIG. 14(*b*) is an enlarged view of a K-portion of FIG. 14(*a*).
Figure 15:
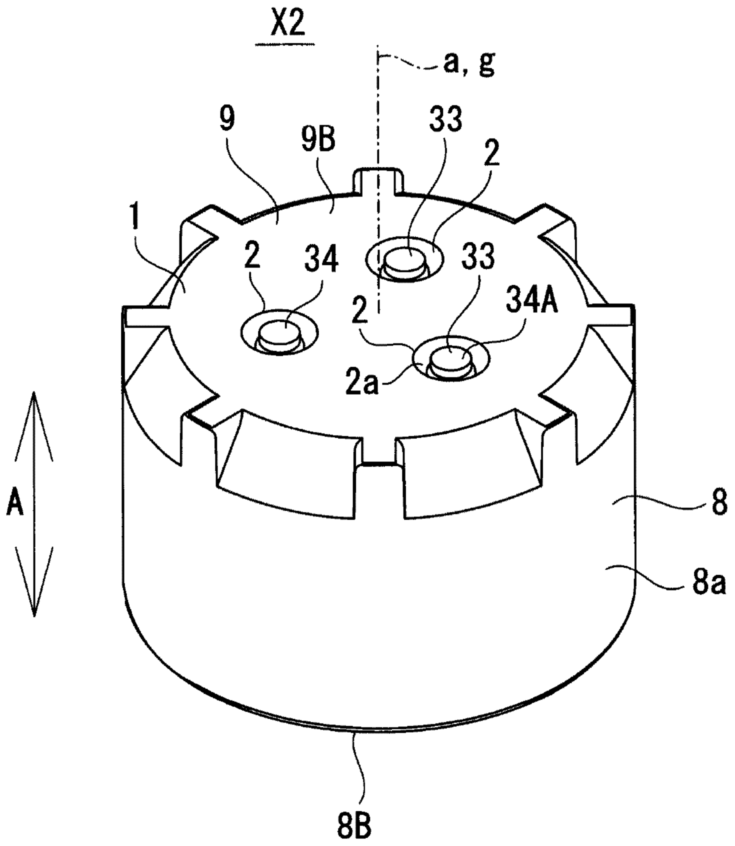
FIG. 15 is a perspective view for illustrating a bubble liquid generating nozzle according to a second embodiment.
Figure 16:
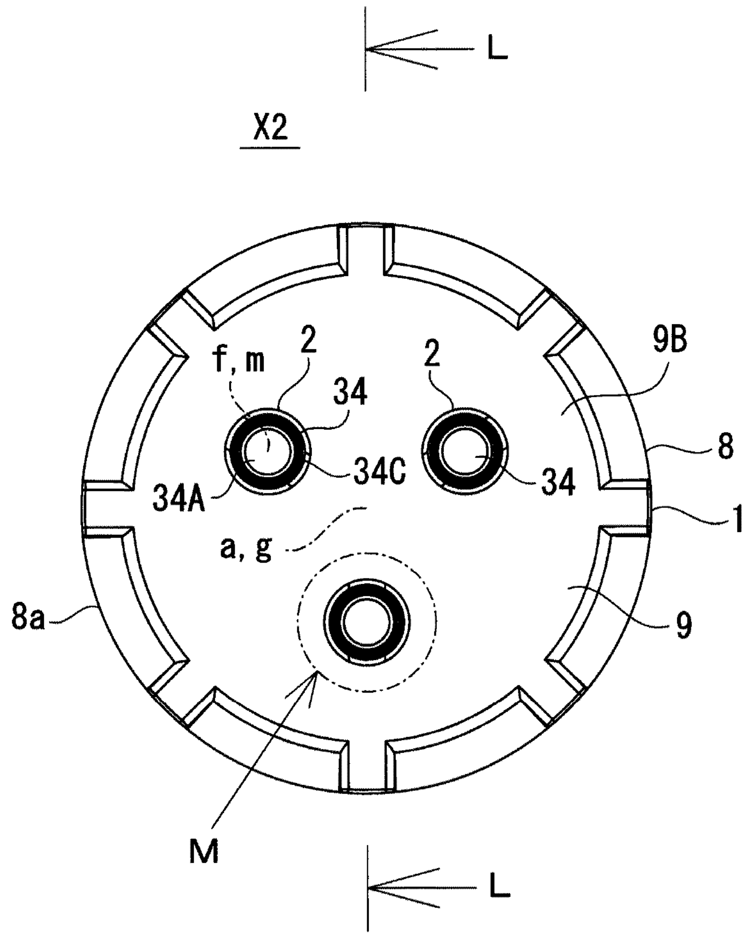
FIG. 16 is a top plan view (top view) for illustrating the bubble liquid generating nozzle according to the second embodiment.
Figure 17:
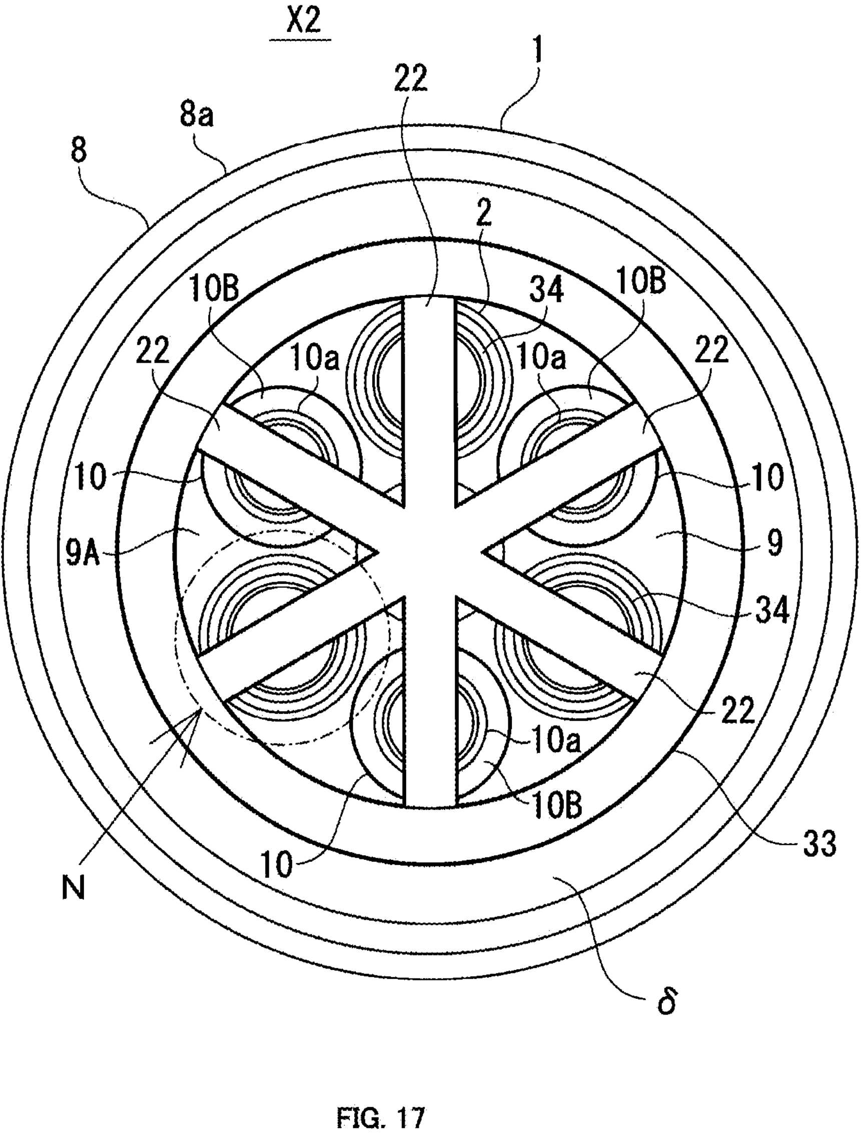
FIG. 17 is a bottom plan view (bottom view) for illustrating the bubble liquid generating nozzle according to the second embodiment.

As illustrated in FIGS. 11, FIGS. 13, and FIGS. 14, each of the plurality of convex portions 27 is formed in a linear shape (stripe) (linear convex portion/stripe convex portion). Each of the convex portions 27 is arranged so as to be separated at arrangement angles θX between each of the convex portions 27 in a circumferential direction K of the liquid guide 23. Each of the convex portions 27 is formed so that the cross-section perpendicular to a cone center line "m" of the liquid guide 23 is formed in an arc shape (hereinafter referred to as "arc shape in cross-section").

As illustrated in FIGS. 11, FIGS. 13, and FIGS. 14, each of the plurality of concave portions 28 is formed in a linear shape (stripe) (linear concave portion/stripe concave portion). Each of the concave portions is formed (arranged) between each of the convex portions 27 so as to be separated at the arrangement angles θX between each of the concave portions 28 in the circumferential direction K of the liquid guide 23.

Each of the convex portions 27 is continuously formed (arranged) in the circumferential direction K of the liquid guide 23 so as to have, for example, an arc shape in cross-section, and each of the concave portions 28 is arranged (formed) between each of the convex portions 27 that continues in the circumferential direction K of the liquid guide 23.

As illustrated in FIGS. 14, each of the convex portions 27 and each of the concave portions 28 extend between the conical upper surface 23A and the conical bottom surface 23B in a direction M of the cone center line "m" of the liquid guide 23, to thereby form the uneven surface of the conical side surface 23C (side surface) [form the conical side surface 23C (side surface) into an uneven shape]. Each of the convex portions 27 and each of the concave portions 28 are inclined from the conical upper surface 23A to the conical bottom surface 23B at an angle with respect to the conical bottom surface 23B, to thereby form the uneven surface of the conical side surface 23C (side surface) [form the conical side surface 23C (side surface) into an uneven shape].

As illustrated in FIGS. 14, each of the liquid guides 23 has a guide height LG in the direction M of the cone center line "m". The guide height LG is set to be higher than the jetting hole length LH of the liquid jetting hole 2. As illustrated in FIGS. 13, each of the liquid guides 23 has a maximum bottom width HG (maximum diameter) of the conical bottom surface 23B. The maximum bottom width HG is wider (larger in diameter) than the rib width of each of the guide ribs 22.

As illustrated in FIG. 10 to FIGS. 13, each of the liquid guides 23 is arranged between the ring center line "g" and the inner periphery 21*a* (inner peripheral surface) of the guide ring 21 in the radial direction of the guide ring 21. Each of the liquid guides 23 is arranged on a circle C2 having the same radius r1 as that of the circle C1 centered at the ring center line "g" of the guide ring 21. Each of the liquid guides 23 is arranged so that the cone center line "m" is located at (matched with) the circle C2. Each of the liquid guides 23 is arranged so as to be separated at guide angles θB that are the same as the hole angles θA between each of the liquid guides 23 in the circumferential direction C of the guide ring 21. The guide angle θB is 120 degrees (120°).

As illustrated in FIG. 10, FIGS. 11, FIGS. 13, and FIGS. 14, each of the liquid guides 23 is placed on each of the guide ribs 22 separated at the guide angles θB. Each of the liquid guides 23 is fixed to each of the guide ribs 22 so that the conical bottom surface 23B is brought into abutment against the rib front surface 22A of each of the guide ribs 22. As illustrated in FIGS. 11 and FIGS. 13, each of the liquid guides 23 is fixed to each of the guide ribs 22 so that the conical bottom surface 23B protrudes from each of the guide ribs 22 to each of the communication holes 25 in the circumferential direction C of the guide ring 21 (liquid guide body 3). Each of the liquid guides 23 protrudes from the rib front surface 22A of each of the guide ribs 22 in the direction G of the ring center line "g" of the guide ring 21 to be provided upright on each of the guide ribs 22.

As illustrated in FIG. 10 to FIGS. 14, each of the connecting protrusions 24 is formed in a trapezoidal flat plate (flat plate protrusion) having the same plate thickness as the rib width of the guide rib 22. Each of the connecting protrusions 24 has a plate front surface 24A and a plate back surface 24B in the plate thickness direction. Each of the connecting protrusions 24 (trapezoidal flat plates) has a trapezoidal upper surface 24C, a trapezoidal bottom surface 24D, and a pair of trapezoidal side surfaces 24E and 24F.

Figure 12:
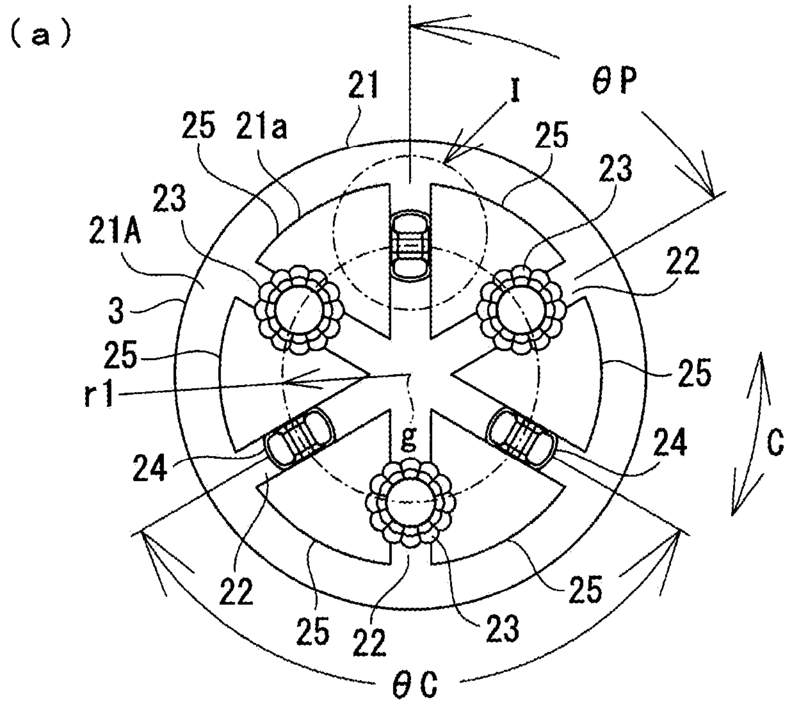
FIG. 12(*a*) is a top plan view (top view) for illustrating the liquid guide body (for example, connecting protrusions) in the bubble liquid generating nozzle according to the first embodiment, and FIG. 12(*b*) is an enlarged view of an I-portion of FIG. 12(*a*).
Figure 12:
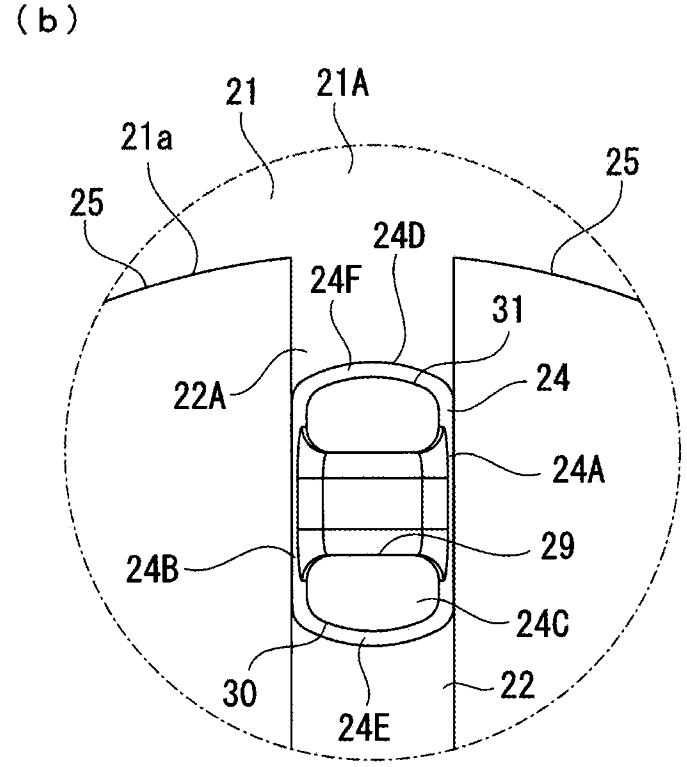

As illustrated in FIGS. 12 and FIGS. 14, each of the connecting protrusions 24 includes a connecting hole groove 29 and a pair of connecting convex portions 30 and 31. The connecting hole groove 29 penetrates through the connecting protrusion (trapezoidal flat plate), and is opened to the plate front surface 24A and the plate back surface 24B and opened to the trapezoid upper surface 24C. Each of the connecting convex portions 30 and 31 is formed between the connecting hole groove 29 and each of the trapezoidal side surfaces 24E and 24F.

Figure 10:
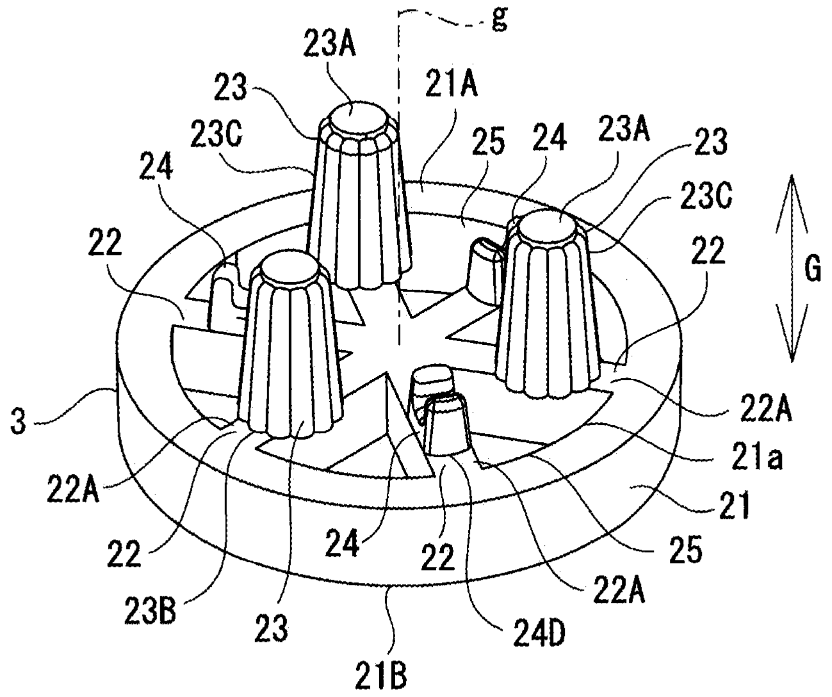
FIG. 10 is a perspective view for illustrating a liquid guide body (for example, liquid guides) in the bubble liquid generating nozzle according to the first embodiment.

As illustrated in FIG. 10 and FIGS. 12, each of the connecting protrusions 24 is arranged between the ring center line “g” and the inner periphery 21*a* (inner peripheral surface) of the guide ring 21 in the radial direction of the guide ring 21. Each of the connecting protrusions 24 is arranged on the circle C2. Each of the connecting protrusions 24 is arranged between each of the liquid guides 23 so as to be separated at protrusion angles θC that are the same as the guide angles θB between each of the connecting protrusions 24 in the circumferential direction C of the guide ring 21 (liquid guide body 3). Each of the connecting protrusions 24 is placed on each of the guide ribs 22 between each of the liquid guides 23 in each of the guide ribs 22 separated at the protrusion angles θC.

Each of the connecting protrusions 24 (trapezoidal flat plates) is fixed to each of the guide ribs 22 so that the plate front surface 24A and the plate back surface 24B face the circumferential direction C of the guide ring 21 and the trapezoidal bottom surface 24D is brought into abutment against the rib front surface 22A of the each of the guide ribs 22. Each of the connecting protrusions 24 is fixed to each of the guide ribs 22 so that the plate front surface 24A and the plate back surface 24B are arranged to be flush with each rib width end face of each of the guide ribs 22.

Each of the connecting protrusions 24 protrudes from the rib front surface 22A of each of the guide ribs 22 to be provided upright on the guide rib 22 in the same direction as that of each of the liquid guides 23.

As illustrated in FIG. 1 to FIG. 6, the liquid guide body 3 (guide ring 21, each guide rib 22, each liquid guide 23, and each connecting protrusion 24) is incorporated into the nozzle main body 1.

As illustrated in FIG. 1 to FIG. 6, the liquid guide body 3 is inserted into the inflow space “δ” (into the tubular body 8) from the another tube end 8B so that the conical upper surface 23A of the liquid guide 23 faces the closing flat plate 9. The liquid guide body 3 is inserted into the inflow space “δ” concentrically with the tubular body 8.

As illustrated in FIG. 1 to FIGS. 5, each of the liquid guides 23 is arranged in each of the liquid jetting holes 2. Each of the liquid guides 23 is arranged in each of the liquid jetting holes 2 from the inflow space “δ”. Each of the liquid guides 23 is arranged concentrically with each of the liquid jetting holes 2, and is inserted into each of the liquid jetting holes 2 from the conical upper surface 23A (one end face).

Figure 4:
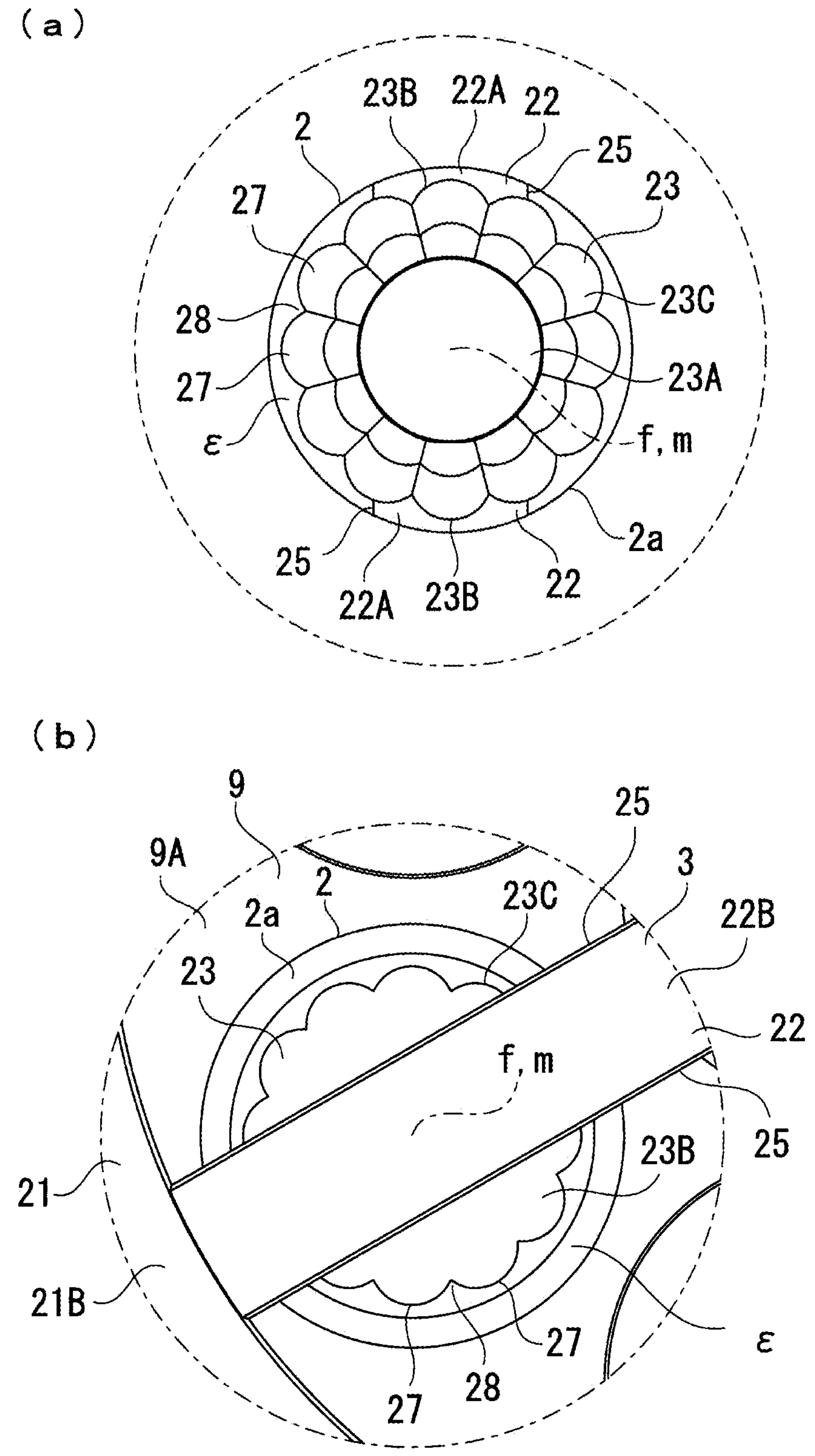
FIG. 4(*a*) is an enlarged view of a B-portion of FIG. 2, and FIG. 4(*b*) is an enlarged view of a C-portion of FIG. 3.
Figure 5:
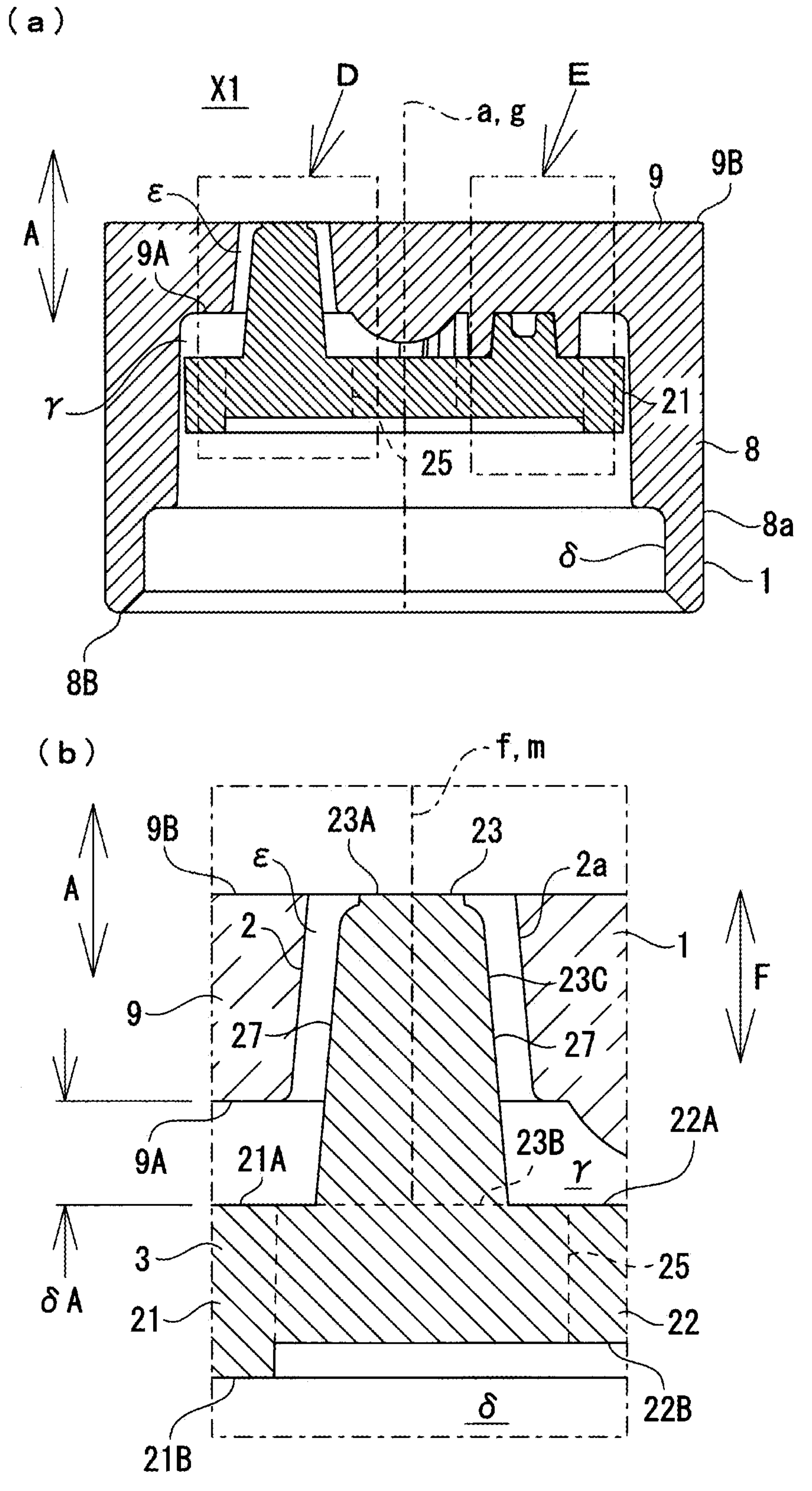
FIG. 5(*a*) is a sectional view taken along the line A-A of FIG. 2, and FIG. 5(*b*) is an enlarged view of a D-portion of FIG. 5(*a*).

As illustrated in FIGS. 4 and FIGS. 5, each of the liquid guides 23 is inserted into each of the liquid jetting holes 2 from the conical upper surface 23A (one end face) with a gap between the conical side surface 23C (side surface) and a conical inner peripheral surface 2*a* (inner peripheral surface) of each of the liquid jetting holes 2. Each of the liquid guides 23 is arranged so that the conical bottom surface 23B side (uneven surface on the conical bottom surface 23B side) protrudes to the inflow space “δ”. Each of the liquid guides 23 is arranged concentrically with each of the liquid jetting holes 2 to be mounted in each of the liquid jetting holes 2 so as to form a liquid flow path “ε” between the uneven surface (conical side surface 23C) and the conical inner peripheral surface 2*a* (inner peripheral surface) of each of the liquid jetting holes 2. Each of the liquid guides 23 is mounted in each of the liquid jetting holes 2 so that the conical upper surface 23A is arranged to be flush with the another closing plate flat surface 9B (another nozzle plate surface) of the closing flat plate 9 (nozzle flat plate/nozzle plate). As illustrated in FIGS. 4 and FIGS. 5, the liquid flow path “ε” is formed in a circular annular shape over the circumferential direction of the liquid jetting hole 2 between the uneven surface (conical side surface 23C/side surface) and the conical inner peripheral surface 2*a* of the liquid jetting hole 2. The liquid flow path “ε” is formed in an annular shape (circular annular shape) over the entire circumference of the conical inner peripheral surface 2*a* of the liquid jetting hole 2. The liquid flow path “ε” is formed in an annular shape (circular annular shape) over the circumferential direction of the liquid jetting hole 2 (circumferential direction K of the liquid guide 23) between each of the convex portions 27 (each of the concave portions 28) of the uneven surface (conical side surface 23C) and the conical inner peripheral surface 2*a* of the liquid jetting hole 2. As illustrated in FIGS. 5, the liquid flow path “ε” is formed in an annular shape (circular annular shape) penetrating through the closing flat plate 9 (nozzle flat plate/nozzle plate) while being reduced in diameter from the inflow space “δ” side in the direction F of the hole center line “f” of the liquid jetting hole 2. The liquid flow path “ε” penetrates through the closing flat plate 9 in the direction F of the hole center line “f” of the liquid jetting hole 2 and communicates to the inflow space “δ”. The liquid flow path “ε” is opened to each of the closing plate flat surfaces 9A and 9B (each nozzle plate flat surface) of the closing flat plate 9 (nozzle flat plate) over the circumferential direction of the liquid jetting hole 2 and communicates to the inflow space “δ”.

Figure 3:
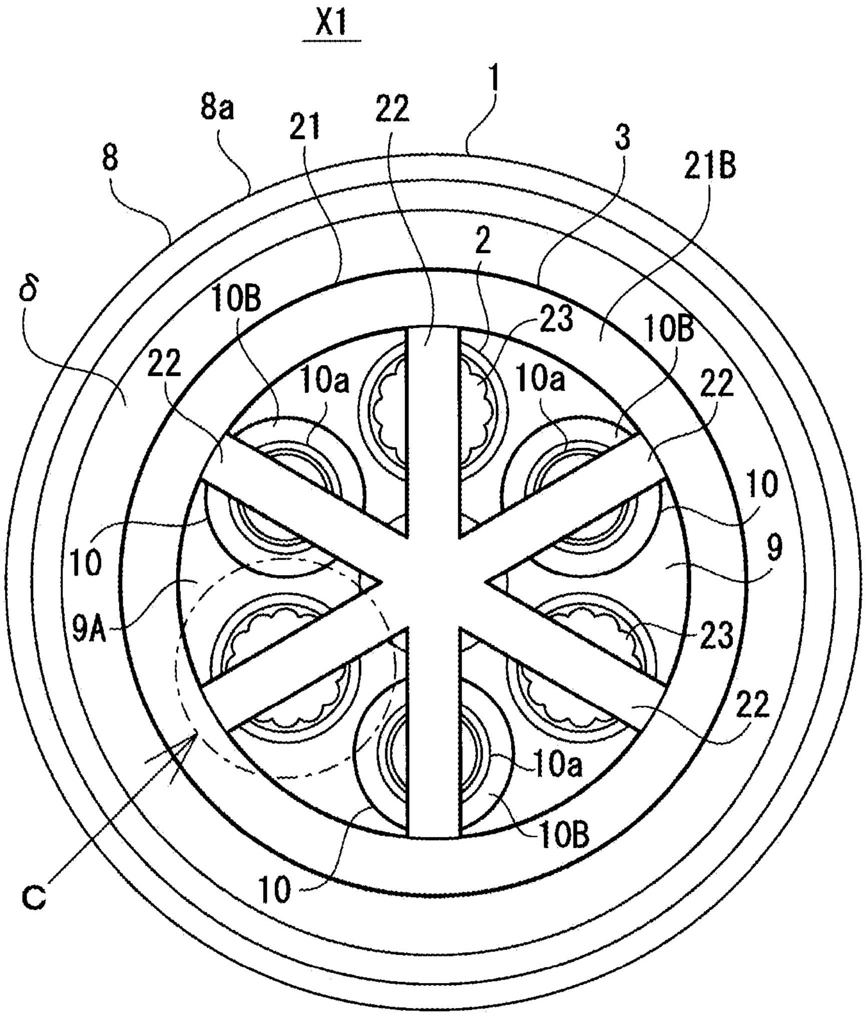
FIG. 3 is a bottom plan view (bottom view) for illustrating the bubble liquid generating nozzle according to the first embodiment.

As illustrated in FIG. 3, FIGS. 5, and FIG. 7, each of the connecting protrusions 24 is inserted into each of the connecting tubular portions 10 from the inflow space “δ”. Each of the connecting protrusions 24 is press-fitted into each of the connecting tubular portions 10 from the another connecting tube end 10B. Each of the connecting protrusions 24 is mounted (press-fitted) into each of the connecting tubular portions 10 from the trapezoidal upper surface 24C. Each of the connecting protrusions 24 is mounted in each of the connecting tubular portions 10 while each of the connecting convex portions 30 and 31 (each of the trapezoidal side surfaces 24E and 24F) is brought into abutment against the conical inner peripheral surface 10*b* of each of the connecting tubular portions 10. Each of the connecting convex portions 30 and 31 is elastically deformed by abutment against the conical inner peripheral surface 10*b*, and is pressed against the inner peripheral surface 10*b* of each of the connecting tubular portions 10.

Each of the connecting protrusions 24 is fixed to each of the connecting tubular portions 10 (nozzle main body 1) by pressing of each of the connecting convex portions 30 and 31 against the inner peripheral surface 10*b*.

As illustrated in FIGS. 5 and FIG. 7, the guide ring 21, each of the guide ribs 22, and each of the liquid guides 23 are fixed to the nozzle main body 1 by fixing of each of the connecting protrusions 24 to each of the connecting tubular portions 10 (nozzle main body 1).

The guide ring 21 is arranged concentrically with the tubular body 8 in the inflow space “δ”, and is fixed to the nozzle main body 1. The guide ring 21 is arranged in the inflow space “δ” with a guide interval δA between the ring front surface 21A (guide ring 21) and the closing flat plate 9 (one closing plate flat surface 9A) in the direction A of the tube center line “a” of the tubular body 8. The guide interval δA is an interval obtained by subtracting the jetting hole length LH from the guide height LG (δA=LG−LH). The guide ring 21 partitions a flow path space “γ” between the guide ring 21 and the closing flat plate 9 (closing body) in the direction of the tube center line “a” of the tubular body 8. The guide ring 21 and the closing flat plate 9 partition the flow path space "γ" with the guide interval δA between the ring front surface 21A and the one closing plate flat surface 9A (each of the liquid jetting holes 2) in the direction A of the tube center line "a" of the tubular body 8.

Figure 6:
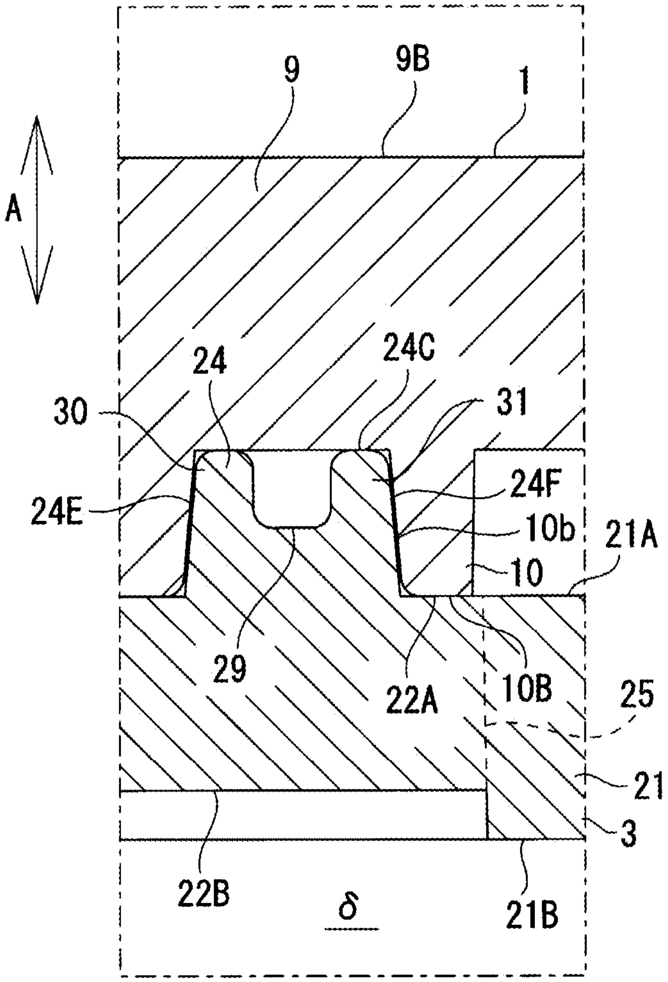
FIG. 6 is an enlarged view of an E-portion of FIG. 5(*a*).

As illustrated in FIGS. 5 and FIG. 6, each of the guide ribs 22 (each of the guide ribs on which the connecting protrusions 24 are placed) is arranged in the inflow space "δ" so that the rib front surface 22A is brought into abutment against the another connecting tube end 10B of each of the connecting tubular portions 10 by insertion of each of the connecting protrusions 24 into each of the connecting tubular portions 10. Each of the guide ribs 22 is arranged in the inflow space "δ" with the guide interval δA between each of the guide ribs 22 (rib front surface 22A) and the closing flat plate 9 (one closing plate flat surface 9A) in the direction A of the tube center line "a" of the tubular body 8 by abutment against the another connecting tube end 10B.

Each of the guide ribs 22 partitions the flow path space "γ" between each of the guide ribs 22 and the closing flat plate 9 (closing body) in the direction A of the tube center line "a" of the tubular body 8. Each of the guide ribs 22 and the closing flat plate 9 partition the flow path space "γ" with the guide interval δA between the rib front surface 22A and the one closing plate flat surface 9A (liquid jetting hole 2) in the direction A of the tube center line "a" of the tubular body 8.

Each of the communication holes 25 communicates to the inflow space "δ" on the another tube end 8B side of the tubular body 8 and the flow path space "γ".

As illustrated in FIGS. 5, each of the liquid guides 23 is arranged so that the conical bottom surface 23B side (another end face side) protrudes from each of the liquid jetting holes 2 to the flow path space "γ" by abutment of each of the guide ribs 22 (rib front surface 22A) against each of the connecting tubular portions 10 (another connecting tube end 10B). Each of the liquid guides 23 is arranged so that the conical side surface 23C (side surface) on the conical bottom surface 23B side (another end face side) protrudes from each of the liquid jetting holes 2 to the flow path space "γ". Each of the liquid flow paths "ε" penetrates through the closing flat plate 9 in the direction F of the hole center line "f" of the liquid jetting hole 2 and communicates to the flow path space "γ".

In FIG. 1 to FIGS. 5, in the bubble liquid generating nozzle X1, a liquid (for example, water) flows from the another tube end 8B of the tubular body 8 into the inflow space "δ". The liquid having flowed into the inflow space "δ" flows into each of the communication holes 25, flows through each of the communication holes 25, and flows out to the flow path space "γ".

As illustrated in FIGS. 4 and FIGS. 5, the liquid having flowed out to the flow path space "γ" flows along the conical side surface 23C (uneven surface) on the conical bottom surface 23B side, and flows into each of the liquid flow paths "ε". The liquid having flowed out to the flow path space "γ" is guided by the conical side surface 23C (uneven surface) protruding to the flow path space "γ" (inflow space "δ"), and flows into the liquid flow path "ε" from the entire circumference of each of the liquid jetting holes 2.

As illustrated in FIGS. 4 and FIGS. 5, the liquid having flowed into the liquid flow path "ε" from the flow path space "γ" (inflow space "δ") flows through the liquid flow path "ε" [between the uneven surface and the conical inner peripheral surface 2*a* (inner peripheral surface)]. As a result, the liquid is reduced in pressure while being increased in flow velocity, and is ejected from the nozzle main body 1 (each of the liquid jetting holes 2). The liquid having flowed into the liquid flow path "ε" flows along the uneven surface (conical side surface 23C) to become turbulence due to the uneven surface, and generates cavitation. The gas (air) in the liquid flowing through the liquid flow path "ε" is precipitated from the liquid by cavitation and turbulence (fluid resistance), and is crushed (sheared) to form a large amount of microbubbles and a large amount of ultrafine bubbles. The microbubbles and ultrafine bubbles are mixed and dissolved in the liquid flowing through the liquid flow path "ε", and become a bubble liquid (bubble water) in which a large amount of microbubbles and a large amount of ultrafine bubbles are mixed and dissolved. The bubble liquid flows through the liquid flow path "ε", and is ejected from each of the liquid jetting holes 2 (liquid flow path "ε"). The bubble liquid (bubble water) flows through the liquid flow path "ε" in an annular shape (circular annular shape) due to the liquid flow path "ε" [between the conical inner peripheral surface 2*a* (inner peripheral surface) and the uneven surface] formed in an annular shape (circular annular shape) over the circumferential direction of the liquid jetting hole 2 to be formed into a liquid film (film of water) having an annular shape (circular annular shape), and is ejected from each of the liquid jetting holes 2 (liquid flow path "ε"). The liquid film (water film) having an annular shape (circular annular shape) becomes a soft annular liquid film (annular bubble liquid film), and is ejected from each of the liquid jetting holes 2 (each of the liquid flow paths "ε") to an ejection target to effectively remove dirt and germs from the ejection target. The liquid flow path "ε" forms the liquid (bubble liquid) flowing through the liquid flow path "ε" into an annular shape (circular annular shape) and ejects the annular liquid (bubble liquid/annular bubble liquid film) from the liquid jetting hole 2.

A bubble liquid generating nozzle according to a second embodiment is described with reference to FIG. 15 to FIG. 23.

In FIG. 15 to FIG. 23, the same reference symbols as those in FIG. 1 to FIG. 14 denote the same members and the same configurations, and hence the detailed description thereof is omitted.

In FIG. 15 to FIG. 23, a bubble liquid generating nozzle X2 according to the second embodiment (hereinafter referred to as "bubble liquid generating nozzle X2") includes a nozzle main body 1, a plurality of (for example, three) liquid jetting holes 2 (liquid throttle holes), and a liquid guide body 33 (liquid guides 34).

As illustrated in FIG. 20 to FIG. 23, the liquid guide body 33 (guide fixed body) includes a guide ring 21, a plurality of (for example, six) guide ribs 22 (guide leg portions), a plurality of (for example, three) liquid guides 34, and a plurality of (for example, three) connecting protrusions 24.

The liquid guide body 33 is constructed by integrally forming the guide ring 21, each of the guide ribs 22, each of the liquid guides 34, and each of the connecting protrusions 24 with a synthetic resin or the like.

As illustrated in FIG. 20 to FIG. 23, each of the liquid guides 34 is formed in a three-dimensional shape having a pair of end faces and a side surface arranged (formed) between each of the end faces. Each of the liquid guides 34 is formed in a conical shape (truncated cone). Each of the liquid guides 34 has a conical upper surface 34A (one end face), a conical bottom surface 34B (another end face), and a conical side surface 34C (side surface). The conical side surface 23C (side surface) of each of the liquid guides 34 is arranged (formed) between the conical upper surface 23A and the conical bottom surface 23B (between each of the end faces). The conical side surface 34C (side surface) of each of the liquid guides 34 is formed in a shape of an uneven surface (uneven shape) on which a convex portion 35 and a concave portion 36 are arranged. The conical side surface 34C (side surface) of each of the liquid guides 34 is formed in a shape of an uneven surface (uneven shape) having a plurality of convex portions 35 and a plurality of concave portions 36.

Figure 25:
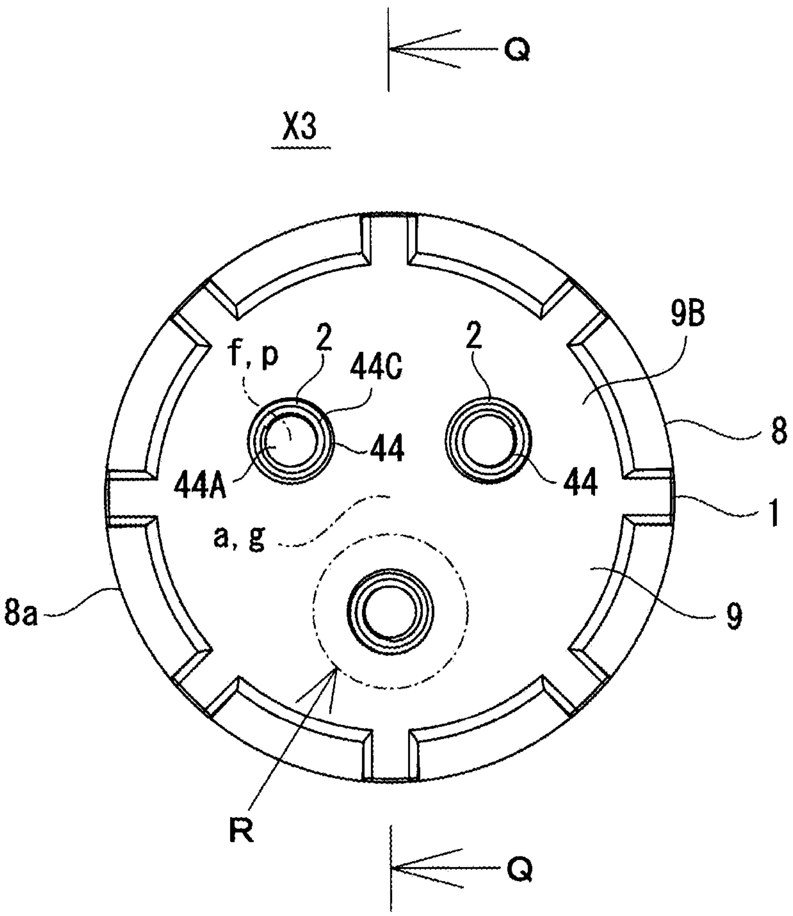
FIG. 25 is a top plan view (top view) for illustrating the bubble liquid generating nozzle according to the third embodiment.
Figure 26:
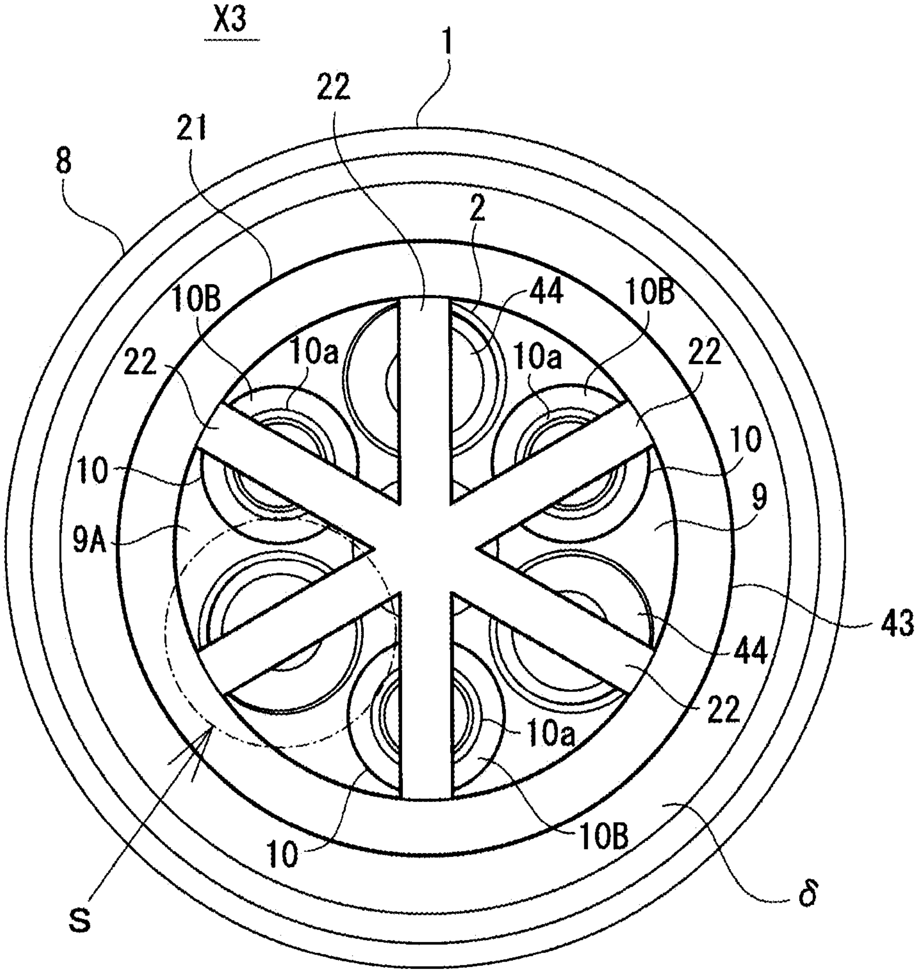
FIG. 26 is a bottom plan view (bottom view) for illustrating the bubble liquid generating nozzle according to the third embodiment.

As illustrated in FIG. 20 to FIG. 23, each of the plurality of convex portions 35 is formed in a circular annular shape (circular annular convex portion). As illustrated in FIG. 25, each of the convex portions 35 is arranged concentrically with a cone center line "n" of the liquid guide 34. Each of the convex portions 35 is arranged at arrangement intervals "s" between each of the convex portions 35 in a direction N of the cone center line "n".

As illustrated in FIG. 20 to FIG. 23, each of the plurality of concave portions 36 is formed in a circular annular shape (circular annular concave portion). Each of the concave portions 36 is arranged concentrically with the cone center line "n" of the liquid guide 34. As illustrated in FIG. 25, each of the concave portions 36 is arranged between each of the convex portions 35 at arrangement intervals "s" between each of the concave portions 36 in the direction N of the cone center line "n".

Figure 23:
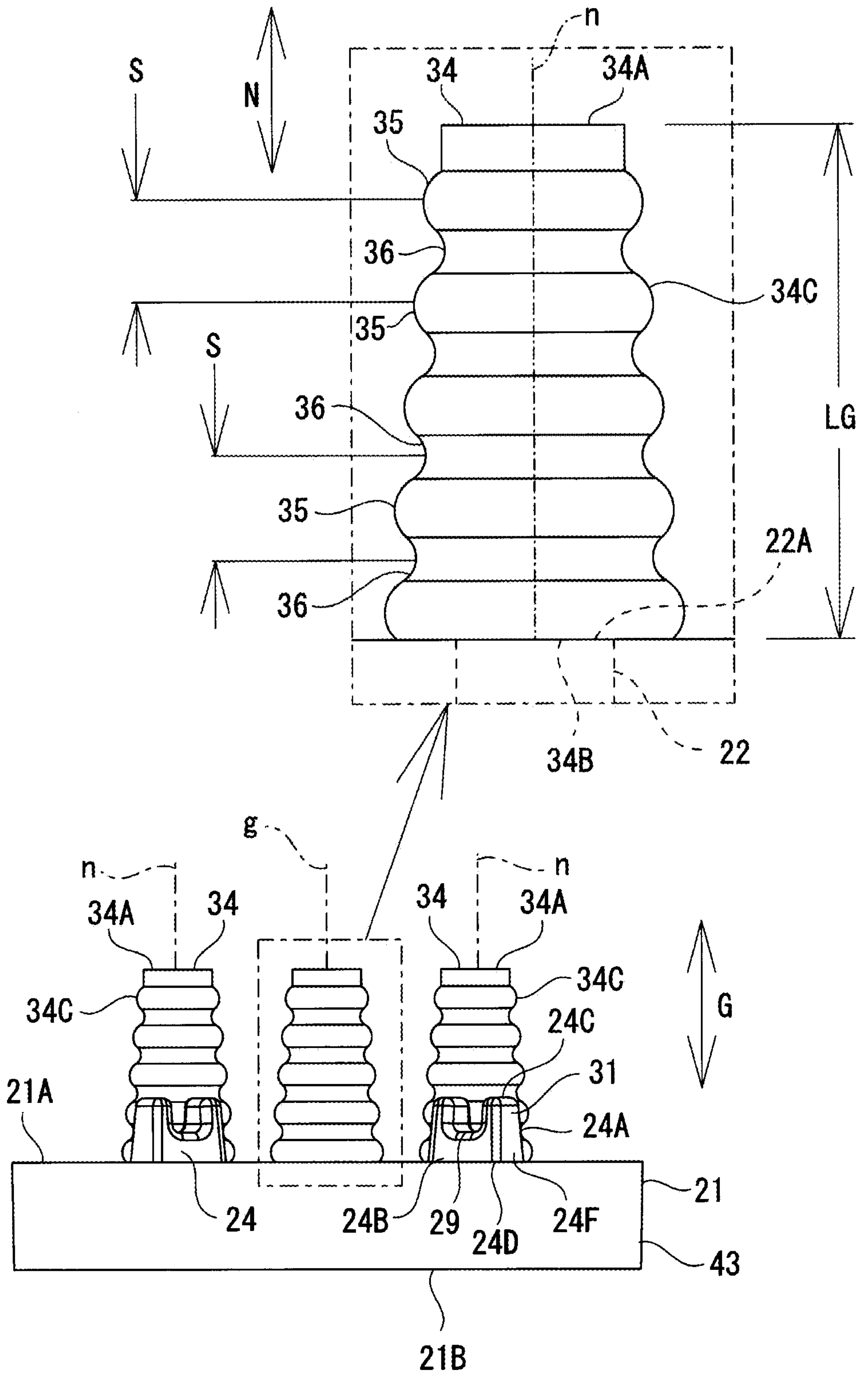
FIG. 23 is a side view for illustrating the liquid guide body in the bubble liquid generating nozzle according to the second embodiment.
Figure 24:
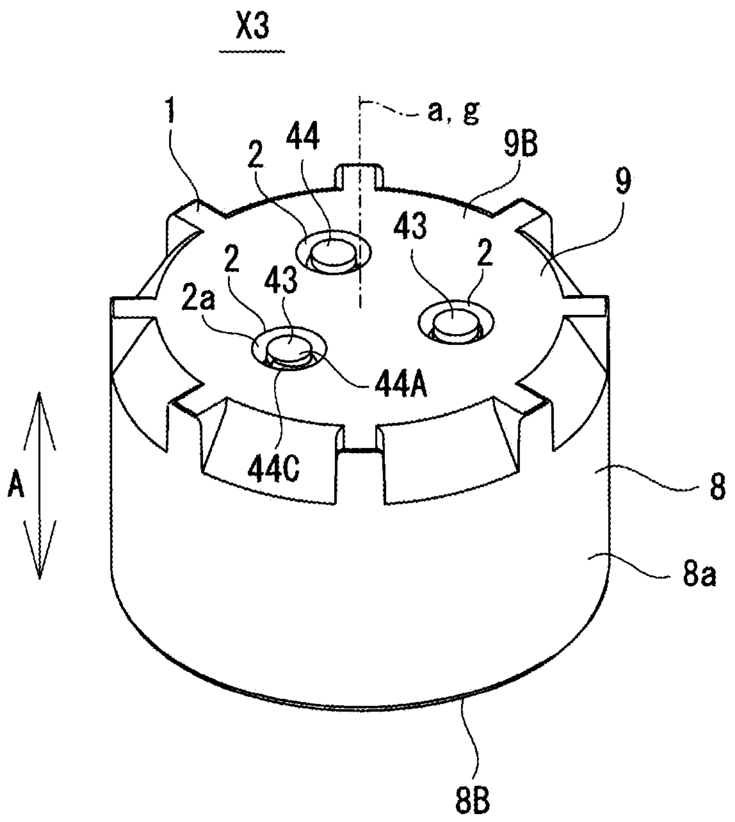
FIG. 24 is a perspective view for illustrating a bubble liquid generating nozzle according to a third embodiment.

As illustrated in FIG. 23, each of the convex portions 35 and each of the concave portions 36 are gradually increased in diameter from the conical upper surface 34A to the conical bottom surface 34B in the direction N of the cone center line "n" of the liquid guide 34, to thereby form the uneven surface of the conical side surface 34C (side surface) [form the conical side surface 34C (side surface) into an uneven shape]. In each of the convex portions 35 adjacent to each other, the convex portion 35 on the conical bottom surface 34B side is formed so as to be increased in diameter as compared to the convex portion 35 on the conical upper surface 34A side. In each of the concave portions 36 adjacent to each other, the concave portion 36 on the conical bottom surface 34B side is formed so as to be increased in diameter as compared to the concave portion 36 on the conical upper surface 34A side.

Figure 22:
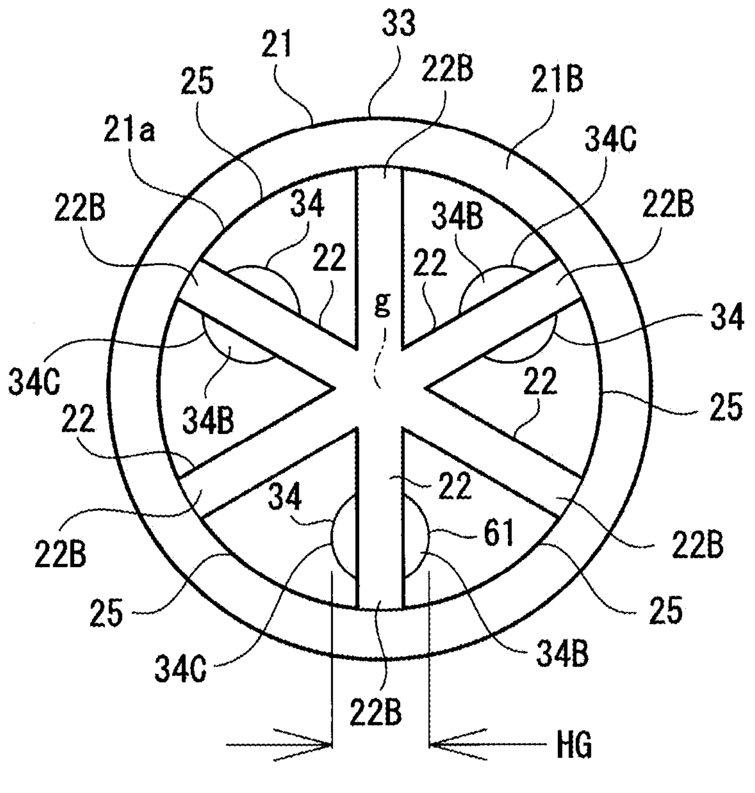
FIG. 22 is a bottom plan view (bottom view) for illustrating the liquid guide body in the bubble generating nozzle according to the second embodiment.

As illustrated in FIG. 23, each of the liquid guides 34 has a guide height LG in the direction N of the cone center line "n". As illustrated in FIG. 22, each of the liquid guides 34 has a maximum diameter HG on the conical bottom surface 34B side.

Figure 20:
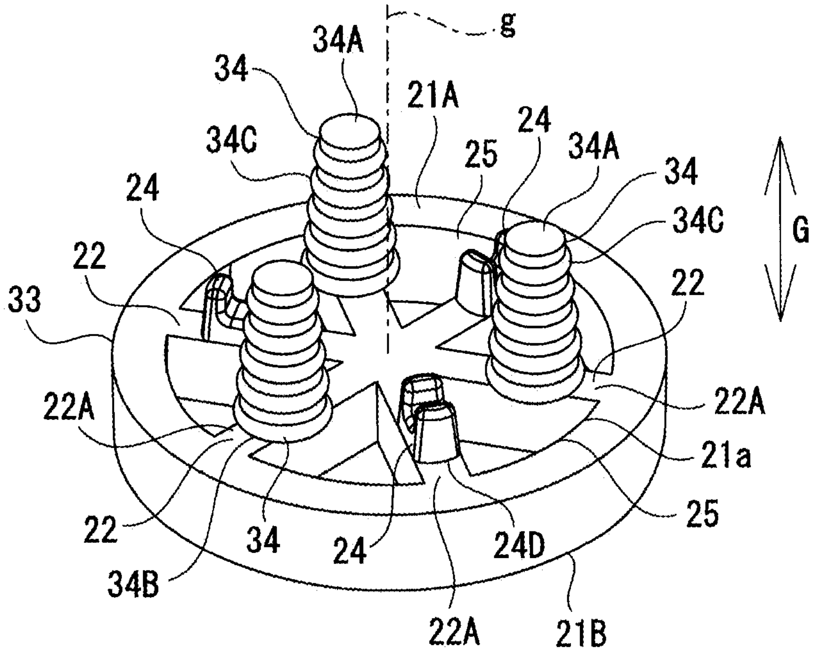
FIG. 20 is a perspective view for illustrating a liquid guide body (for example, liquid guides) in the bubble liquid generating nozzle according to the second embodiment.
Figure 21:
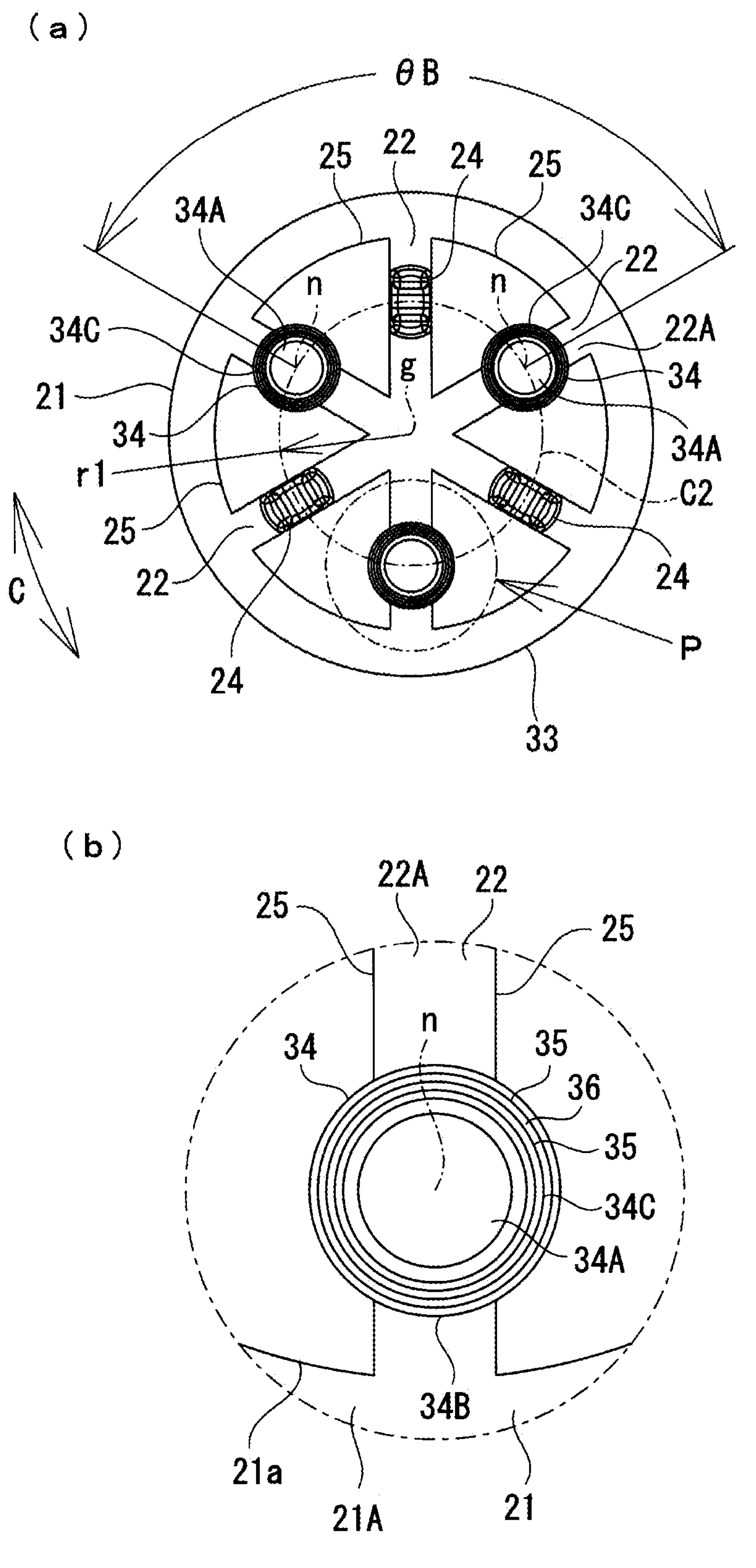
FIG. 21(*a*) is a top plan view (top view) for illustrating the liquid guide body (for example, liquid guides) in the bubble liquid generating nozzle according to the second embodiment, and FIG. 21(*b*) is an enlarged view of a P-portion of FIG. 21(*a*).

As illustrated in FIG. 20 to FIG. 22, each of the liquid guides 34 is arranged between the ring center line "g" and the inner periphery 21*a* (inner peripheral surface) of the guide ring 21 in the radial direction of the guide ring 21. Each of the liquid guides 34 is arranged on a circle C2 having the same radius r1 centered at the ring center line "g" of the guide ring 21. Each of the liquid guides 34 is arranged so that the cone center line "n" is located at (matched with) the circle C2. Each of the liquid guides 34 is arranged so as to be separated at guide angles θB between each of the liquid guides 34 in the circumferential direction C of the guide ring 21.

As illustrated in FIG. 20 and FIG. 22, each of the liquid guides 34 is placed on each of the guide ribs 22 separated at the guide angles θB. Each of the liquid guides 34 is fixed to each of the guide ribs 22 so that the conical bottom surface 34B is brought into abutment against the rib front surface 22A of each of the guide ribs 22. Each of the liquid guides 34 is fixed to each of the guide ribs 22 so that the conical bottom surface 34B protrudes from each of the guide ribs 22 to each of the communication holes 25 in the circumferential direction C of the guide ring 21 (liquid guide body 3). Each of the liquid guides 34 protrudes from the rib front surface 22A of each of the guide ribs 22 in the direction G of the ring center line "g" of the guide ring 21 to be provided upright on each of the guide ribs 22.

In the bubble liquid generating nozzle X2, each of the connecting protrusions 24 is arranged between each of the liquid guides 34 (see FIG. 20 and FIGS. 21) in the same manner as described in FIG. 10 to FIGS. 14.

As illustrated in FIG. 15 to FIGS. 19, the liquid guide body 33 (guide ring 21, each guide rib 22, each liquid guide 34, and each connecting protrusion 24) is incorporated into the nozzle main body 1.

The liquid guide body 33 is inserted into the inflow space "δ" (into the tubular body 8) from the another tube end 8B so that the conical upper surface 34A of the liquid guide 34 faces the closing flat plate 9. The liquid guide body 33 is inserted into the inflow space "δ" concentrically with the tubular body 8.

As illustrated in FIG. 15 to FIGS. 19, each of the liquid guides 34 is arranged in each of the liquid jetting holes 2. Each of the liquid guides 34 is arranged in each of the liquid jetting holes 2 from the inflow space "δ". Each of the liquid guides 34 is arranged concentrically with each of the liquid jetting holes 2, and is inserted into each of the liquid jetting holes 2.

Figure 18:
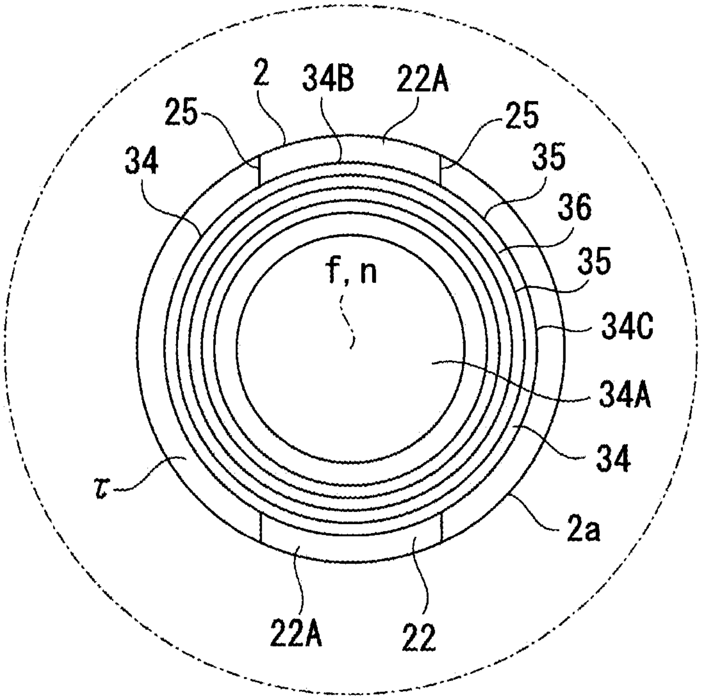
FIG. 18(*a*) is an enlarged view of an M-portion of FIG. 16, and FIG. 18(*b*) is an enlarged view of an N-portion of FIG. 17.
Figure 18:
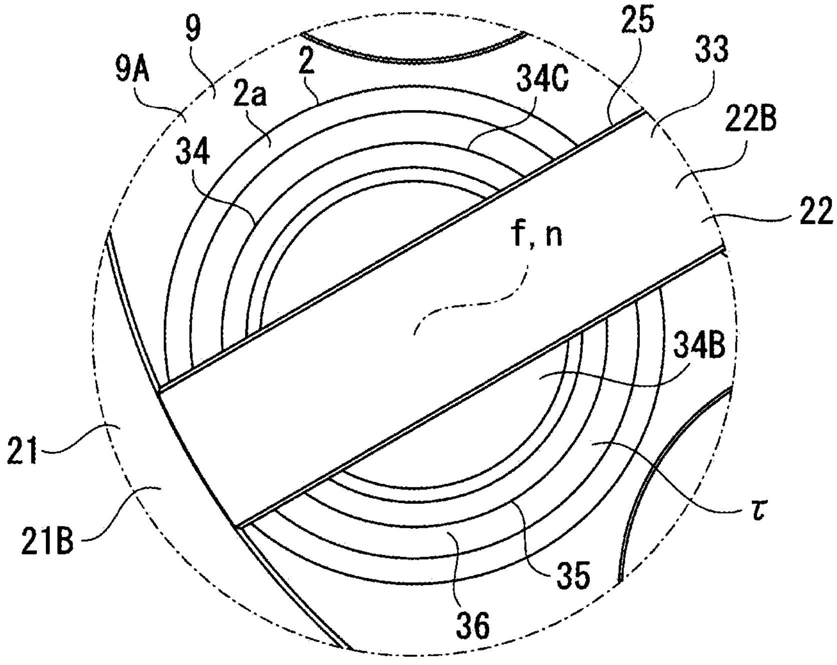
Figure 19:
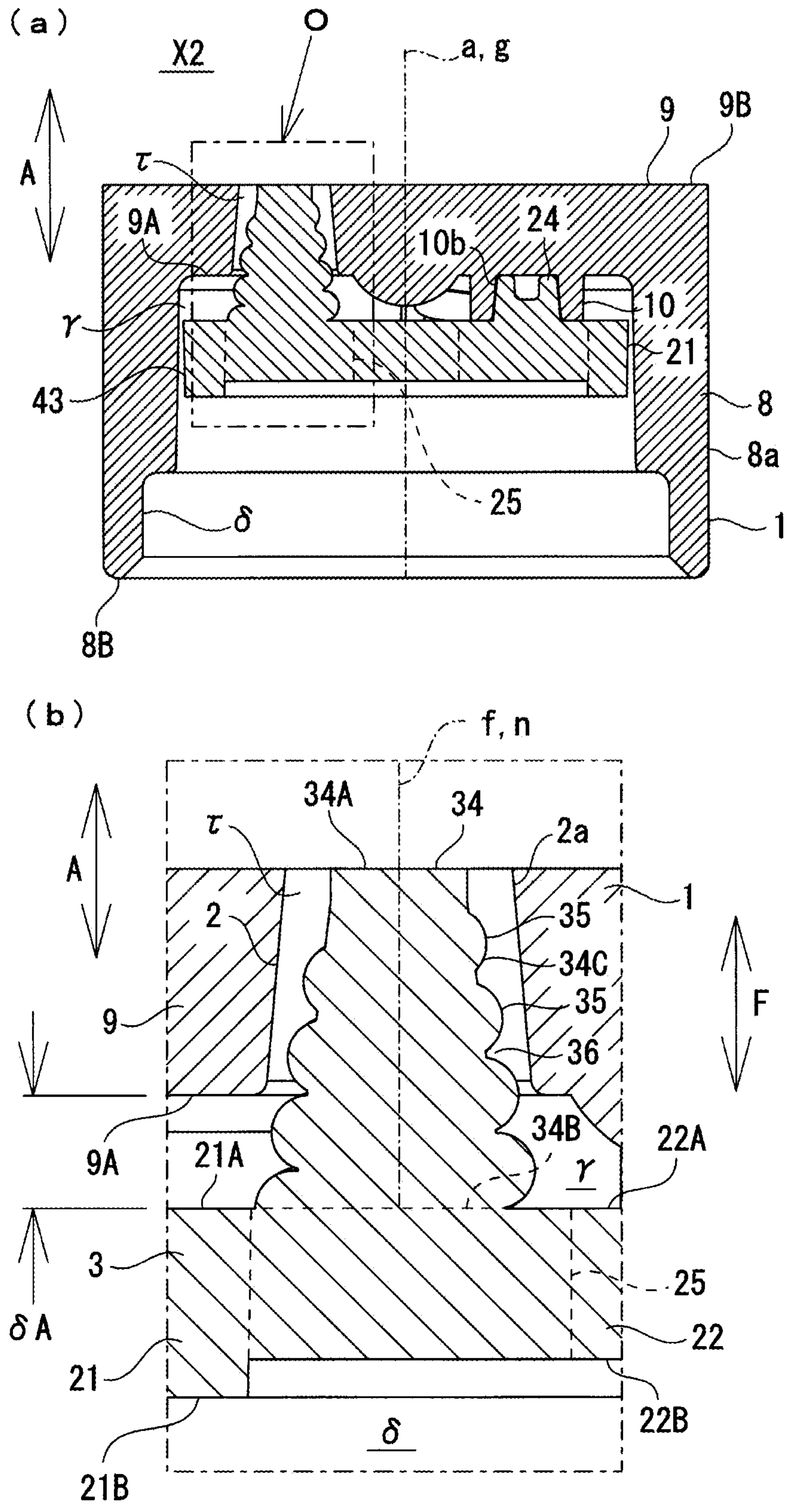
FIG. 19(*a*) is a sectional view taken along the line L-L of FIG. 16, and FIG. 19(*b*) is an enlarged view of an O-portion of FIG. 19(*a*).

Each of the liquid guides 34 is inserted into each of the liquid jetting holes 2 from the conical upper surface 34A (one end face) with a gap between the conical side surface 34C (side surface) and the conical inner peripheral surface 2*a* (inner peripheral surface) of each of the liquid jetting holes 2. Each of the liquid guides 34 is arranged so that the conical bottom surface 34B side (uneven surface on the conical bottom surface 34B side) protrudes to the inflow space "δ". As illustrated in FIGS. 18 and FIGS. 19, each of the liquid guides 34 is arranged concentrically with each of the liquid jetting holes 2 to be mounted in each of the liquid jetting holes 2 so as to form a liquid flow path "τ" between the uneven surface (conical side surface 34C) and the conical inner peripheral surface 2*a* (inner peripheral surface) of each of the liquid jetting holes 2. Each of the liquid guides 34 is mounted in each of the liquid jetting holes 2 so that the conical upper surface 34A is arranged to be flush with the another closing plate flat surface 9B (another nozzle plate surface) of the closing flat plate 9 (nozzle flat plate/nozzle plate). As illustrated in FIGS. 18 and FIGS. 19, the liquid flow path "τ" is formed in an annular shape (circular annular shape) over the circumferential direction of the liquid jetting hole 2 between the uneven surface (conical side surface 34C/side surface) and the conical inner peripheral surface 2*a* of the liquid jetting hole 2. The liquid flow path "τ" is formed in an annular shape (circular annular shape) over the entire circumference of the conical inner peripheral surface 2*a* (inner peripheral surface) of the liquid jetting hole 2. The liquid flow path "τ" is formed in a circular annular shape (annular shape) over the circumferential direction of the liquid jetting hole 2 (circumferential direction of the liquid guide 34) between each of the convex portions 35 (each of the concave portions 36) of the uneven surface (conical side surface 34C) and the conical inner peripheral surface 2*a* of the liquid jetting hole 2. The liquid flow path "τ" is formed in an annular shape (circular annular shape) penetrating through the closing flat plate 9 (nozzle flat plate) in the direction F of the hole center line "f" of the liquid jetting hole 2. The liquid flow path "τ" penetrates through the closing flat plate 9 in the direction F of the hole center line "f" of the liquid jetting hole 2 and communicates to the inflow space "δ". The liquid flow path "τ" is opened to each of the closing flat surfaces 9A and 9B (each nozzle plate flat surface) of the closing flat plate 9 (nozzle flat plate) over the circumferential direction of the liquid jetting hole 2 and communicates to the inflow space "δ" (flow path space "γ").

In the bubble liquid generating nozzle X2, each of the connecting protrusions 24 is fixed to each of the connecting tubular portions 10 (nozzle main body 1) by pressing of each of the connecting convex portions 30 and 31 against the inner peripheral surface 10*b* (see FIGS. 19) in the same manner as described in FIG. 3, FIGS. 5, and FIG. 7.

As illustrated in FIGS. 19, the guide ring 21, each of the guide ribs 22, and each of the liquid guides 34 are fixed to the nozzle main body 1 by fixing of each of the connecting protrusions 24 to each of the connecting tubular portions 10 (nozzle main body 1).

The guide ring 21 is arranged concentrically with the tubular body 8 in the inflow space "δ", and is fixed to the nozzle main body 1.

The guide ring 21 partitions the flow path space "γ" between the guide ring 21 and the closing flat plate 9 (closing body) in the direction A of the tube center line "a" of the tubular body 8 (see FIGS. 19) in the same manner as described in FIGS. 5. Each of the guide ribs 22 partitions the flow path space "γ" between each of the guide ribs 22 and the closing flat plate 9 (closing body) in the direction A of the tube center line "a" of the tubular body 8 (see FIGS. 19) in the same manner as described in FIGS. 5 and FIG. 6.

As illustrated in FIGS. 19, each of the liquid guides 34 is arranged so that the conical bottom surface 34B side (another end face side) protrudes from each of the liquid jetting holes 2 to the flow path space "γ" by abutment of each of the guide ribs 22 (rib front surface 22A) against each of the connecting tubular portions 10 (another connecting tube end 10B). Each of the liquid guides 34 is arranged so that the conical side surface 34C (side surface) on the conical bottom surface 34B side (another end face side) protrudes from each of the liquid jetting holes 2 to the flow path space "γ". Each of the liquid flow paths "τ" penetrates through the closing flat plate 9 in the direction F of the hole center line "f" of the liquid jetting hole 2 and communicates to the flow path space "γ".

In FIG. 15 to FIGS. 19, in the bubble liquid generating nozzle X2, a liquid (for example, water) flows from the another tube end 8B of the tubular body 8 into the inflow space "δ". The liquid having flowed into the inflow space "δ" flows into each of the communication holes 25, flows through each of the communication holes 25, and flows out to the flow path space "γ".

As illustrated in FIGS. 18 and FIGS. 19, the liquid having flowed out to the flow path space "γ" flows along the conical side surface 34C (uneven surface) on the conical bottom surface 34B side, and flows into each of the liquid flow paths "τ". The liquid having flowed out to the flow path space "γ" is guided by the conical side surface 34C (uneven surface) protruding to the flow path space "γ" (inflow space "δ"), and flows into the liquid flow path "τ" from the entire circumference of each of the liquid jetting holes 2.

As illustrated in FIGS. 18 and FIGS. 19, the liquid having flowed into the liquid flow path "τ" from the flow path space "γ" (inflow space "δ") flows through the liquid flow path "τ" (between the uneven surface and the conical inner peripheral surface 2*a*). As a result, the liquid is reduced in pressure while being increased in flow velocity, and is ejected from the nozzle main body 1 (each of the liquid jetting holes 2). The liquid having flowed into the liquid flow path "τ" flows along the uneven surface (conical side surface 34C) to become turbulence due to the uneven surface, and generates cavitation. The gas (air) in the liquid flowing through the liquid flow path "ε" is precipitated from the liquid by cavitation and turbulence (fluid resistance), and is crushed (sheared) to form a large amount of microbubbles and a large amount of ultrafine bubbles. The microbubbles and ultrafine bubbles are mixed and dissolved in the liquid flowing through the liquid flow path "ε", and become a bubble liquid (bubble water) in which a large amount of microbubbles and a large amount of ultrafine bubbles are mixed and dissolved. The bubble liquid flows through the liquid flow path "τ", and is ejected from each of the liquid jetting holes 2 (liquid flow path "τ"). The bubble liquid (bubble water) flows through the liquid flow path "τ" in an annular shape (circular annular shape) due to the liquid flow path "τ" [between the conical inner peripheral surface 2*a* (inner peripheral surface) and the uneven surface] formed in an annular shape (circular annular shape) over the circumferential direction of the liquid jetting hole 2 to be formed into a liquid film (film of water) having an annular shape (circular annular shape), and is ejected from each of the liquid jetting holes 2 (liquid flow path "ε"). The liquid film (water film) having an annular shape (circular annular shape) becomes a soft annular liquid film (annular bubble liquid film), and is ejected from each of the liquid jetting holes 2 (liquid flow paths "τ") to an ejection target to effectively remove dirt and germs from the ejection target. The liquid flow path "τ" forms the liquid (bubble liquid) flowing through the liquid flow path "τ" into an annular shape (circular annular shape) and ejects the annular liquid (bubble liquid/annular bubble liquid film) from the liquid jetting hole 2.

A bubble liquid generating nozzle according to a third embodiment is described with reference to FIG. 24 to FIG. 32.

In FIG. 24 to FIG. 32, the same reference symbols as those in FIG. 1 to FIG. 14 denote the same members and the same configurations, and hence the detailed description thereof is omitted.

In FIG. 24 to FIG. 32, a bubble liquid generating nozzle X3 according to the third embodiment (hereinafter referred to as "bubble liquid generating nozzle X3") includes a nozzle main body 1, a plurality of (for example, three) liquid jetting holes 2 (liquid throttle holes), and a liquid guide body 43 (liquid guides 44).

As illustrated in FIG. 29 to FIG. 32, the liquid guide body 43 (guide fixed body) includes a guide ring 21, a plurality of (for example, six) guide ribs 22 (guide leg portions), a plurality of (for example, three) liquid guides 44, and a plurality of (for example, three) connecting protrusions 24.

The liquid guide body 43 is constructed by integrally forming the guide ring 21, each of the guide ribs 22, each of the liquid guides 44, and each of the connecting protrusions 24 with a synthetic resin or the like.

As illustrated in FIG. 29 to FIG. 32, each of the liquid guides 44 is formed in a three-dimensional shape having a pair of end faces and a side surface arranged (formed) between each of the end faces. Each of the liquid guides 44 is formed in a conical shape (truncated cone). Each of the liquid guides 44 has a conical upper surface 44A (one end face), a conical bottom surface 44B (another end face), and a conical side surface 44C (side surface). The conical side surface 44C (side surface) of each of the liquid guides 44 is arranged (formed) between the conical upper surface 44A and the conical bottom surface 44B (between each of the end faces). The conical side surface 44C (side surface) of each of the liquid guides 44 is formed in a shape of an uneven surface (uneven shape) on which a convex portion 45 and a concave portion 46 are arranged. The conical side surface 44C of each of the liquid guides 44 is formed in a shape of an uneven surface (uneven shape) having the convex portion 45 and the concave portion 46.

As illustrated in FIG. 29 to FIG. 32, the convex portion 45 is formed in a helical shape (helical convex portion). The convex portion 45 is formed in, for example, an arc shape in cross-section.

As illustrated in FIG. 29 to FIG. 32, the concave portion 46 is formed in a helical shape (helical concave portion). The concave portion 46 is arranged so as to be interposed in the convex portion 46 formed in the helical shape.

Figure 32:
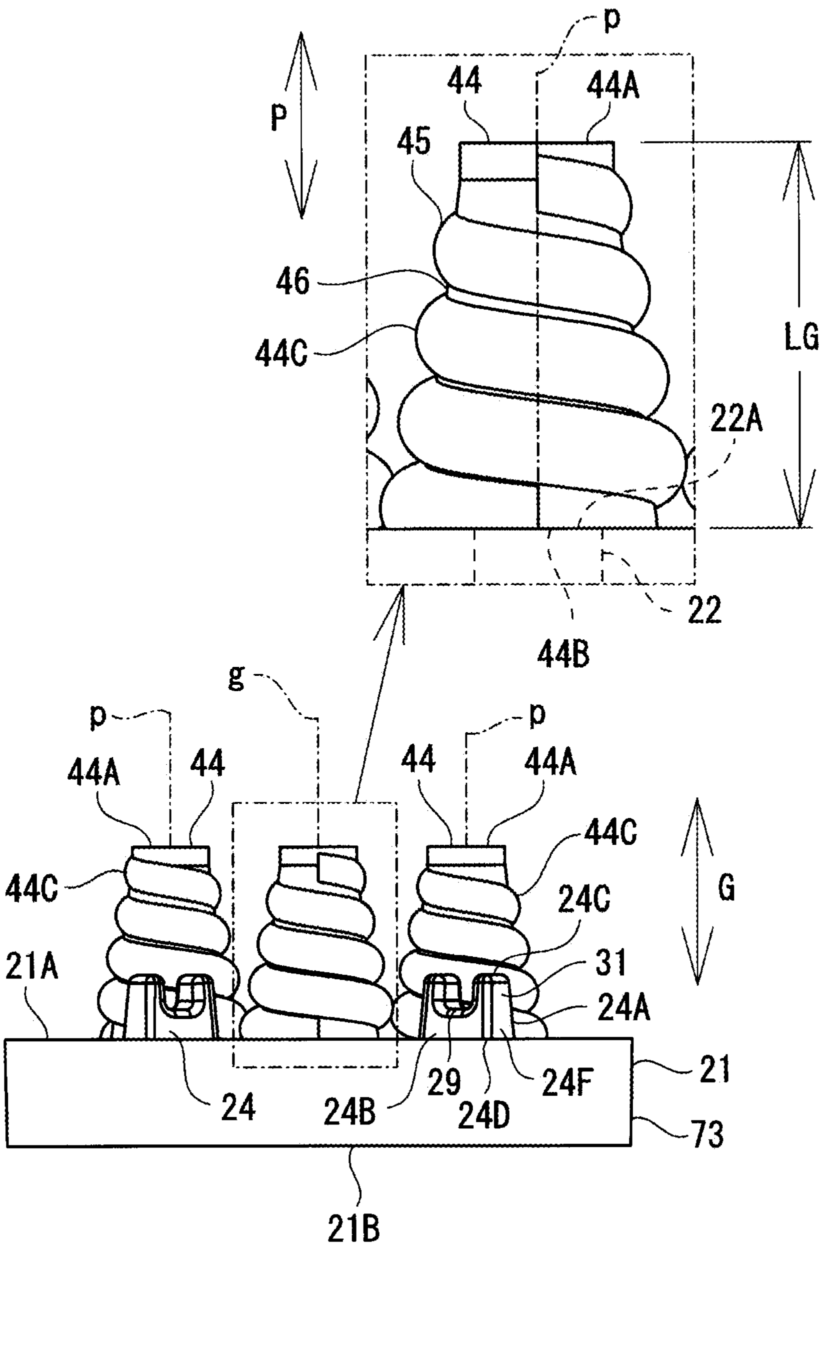
FIG. 32 is a side view for illustrating the liquid guide body in the bubble liquid generating nozzle according to the third embodiment.
Figure 33:
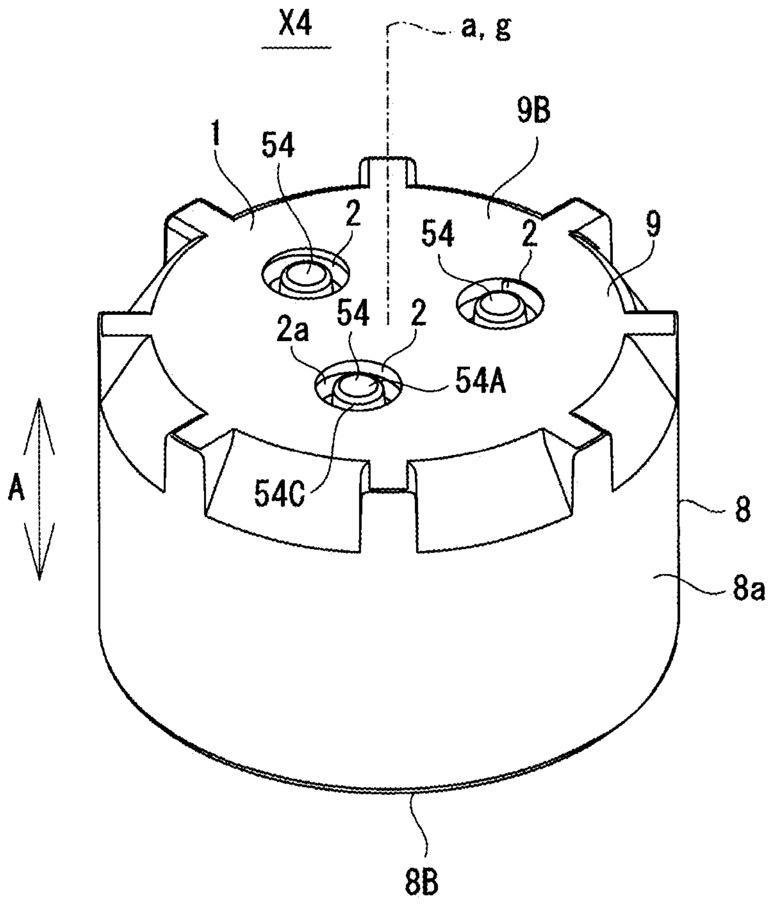
FIG. 33 is a perspective view for illustrating a bubble liquid generating nozzle according to a fourth embodiment.
Figure 34:
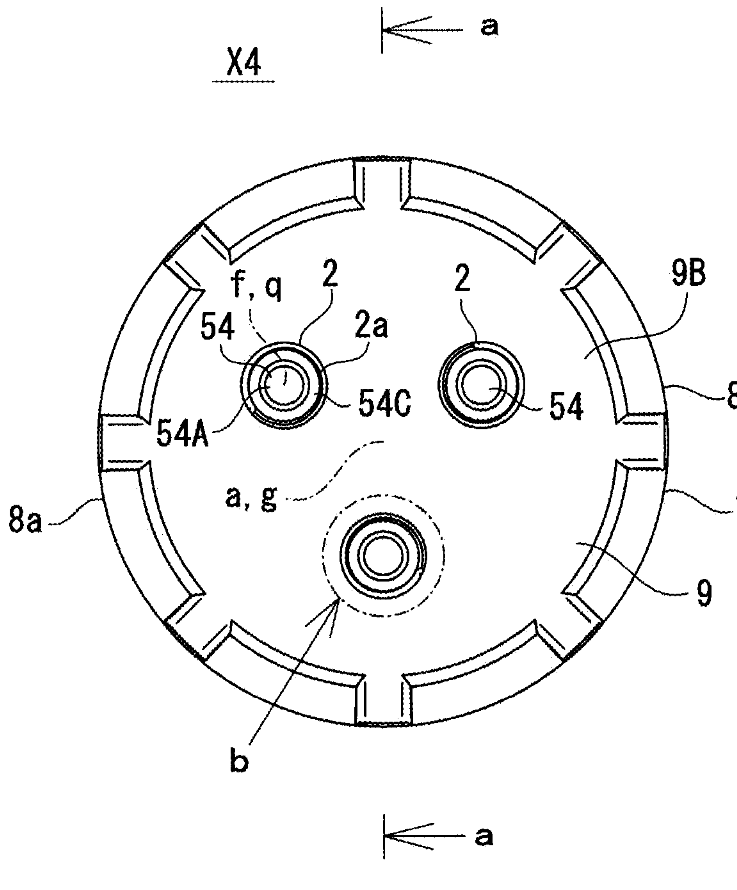
FIG. 34 is a top plan view (top view) for illustrating the bubble liquid generating nozzle according to the fourth embodiment.

As illustrated in FIG. 32, the convex portion 45 and the concave portion 46 are arranged concentrically with a cone center line "p" of the liquid guide 44. The convex portion 45 and the concave portion 46 are arranged between the conical upper surface 44A and the conical bottom surface 44B so as to extend in a helical line shape while being reduced in diameter from the conical bottom surface 44B to the conical upper surface 44A in a direction P of the cone center line "p" of the liquid guide 43, to thereby form the uneven surface of the conical side surface 44C (side surface) [form the conical side surface 44C (side surface) into an uneven shape].

Figure 31:
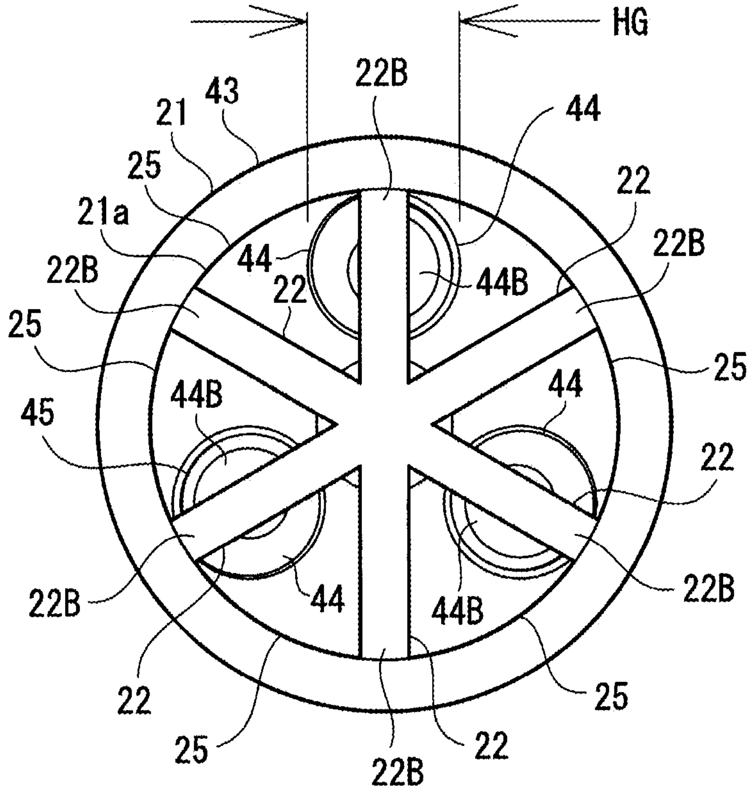
FIG. 31 is a bottom plan view (bottom view) for illustrating the liquid guide body in the bubble liquid generating nozzle according to the third embodiment.
Figure 36:
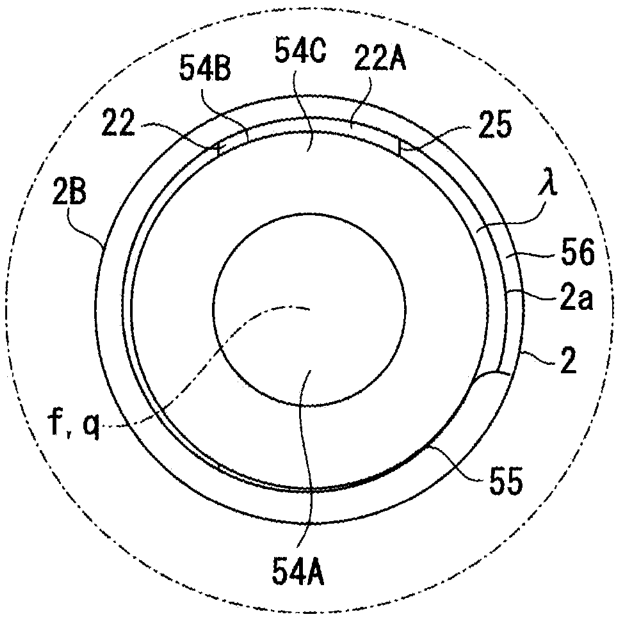
FIG. 36(*a*) is an enlarged view of a b-portion of FIG. 34, and FIG. 36(*b*) is an enlarged view of a c-portion of FIG. 35.
Figure 36:
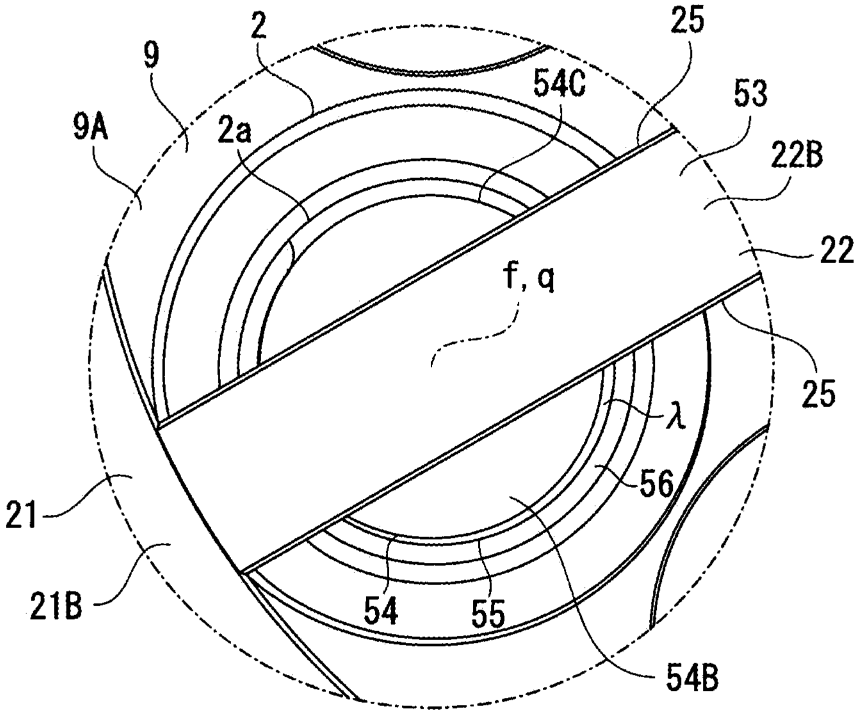

As illustrated in FIGS. 36, each of the liquid guides 44 has a guide height LG in the direction P of the cone center line "p". As illustrated in FIG. 31, each of the liquid guides 44 has a maximum bottom width HG on the conical bottom surface 34B side.

As illustrated in FIG. 29 to FIG. 32, each of the liquid guides 44 is arranged between the ring center line "g" and the inner periphery 21*a* (inner peripheral surface) of the guide ring 21 in the radial direction of the guide ring 21. Each of the liquid guides 44 is arranged on a circle C2 having a radius r1 centered at the ring center line "g" of the guide ring 21. Each of the liquid guides 44 is arranged so that the cone center line "p" is located at (matched with) the circle C2. Each of the liquid guides 44 is arranged so as to be separated at guide angles θB between each of the liquid guides 44 in the circumferential direction C of the guide ring 21.

Figure 30:
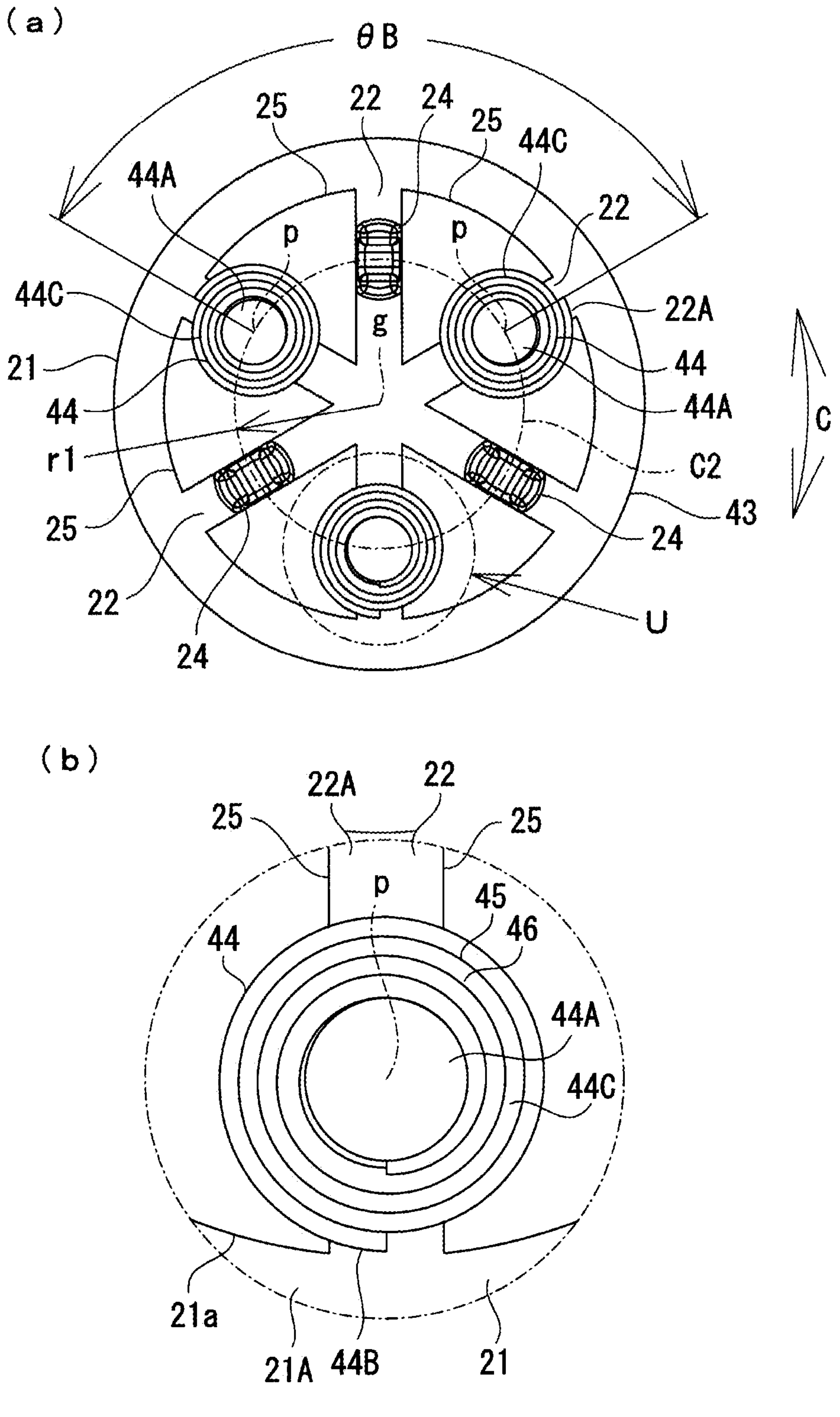
FIG. 30(*a*) is a top plan view (top view) for illustrating the liquid guide body in the bubble liquid generating nozzle according to the third embodiment, and FIG. 30(*b*) is an enlarged view of a U-portion of FIG. 30(*a*).

As illustrated in FIGS. 30, each of the liquid guides 44 is placed on each of the guide ribs 22 separated at the guide angles θB. Each of the liquid guides 44 is fixed to each of the guide ribs 22 so that the conical bottom surface 44B is brought into abutment against the rib front surface 22A of each of the guide ribs 22.

As illustrated in FIGS. 30 and FIG. 31, each of the liquid guides 44 is fixed to each of the guide ribs 22 so that the conical bottom surface 44B protrudes from each of the guide ribs 22 to each of the communication holes 25 in the circumferential direction C of the guide ring 21 (liquid guide body 3).

Each of the liquid guides 44 protrudes from the rib front surface 22A of each of the guide ribs 22 in the direction G of the ring center line "g" of the guide ring 21 to be provided upright on each of the guide ribs 22.

In the bubble liquid generating nozzle X3, each of the connecting protrusions 24 is arranged between each of the liquid guides 44 (see FIGS. 28) in the same manner as described in FIG. 10 to FIGS. 14.

As illustrated in FIG. 24 to FIGS. 28, the liquid guide body 43 (guide ring 21, each guide rib 22, each liquid guide 44, and each connecting protrusion 24) is incorporated into the nozzle main body 1.

The liquid guide body 43 is inserted into the inflow space "δ" (into the tubular body 8) from the another tube end 8B so that the conical upper surface 44A of the liquid guide 44 faces the closing flat plate 9. The liquid guide body 43 is inserted into the inflow space "δ" concentrically with the tubular body 8.

As illustrated in FIG. 24 to FIGS. 28, each of the liquid guides 44 is arranged in each of the liquid jetting holes 2. Each of the liquid guides 44 is arranged in each of the liquid jetting holes 2 from the inflow space "δ". Each of the liquid guides 44 is arranged concentrically with each of the liquid jetting holes 2, and is arranged in each of the liquid jetting holes 2.

Figure 27:
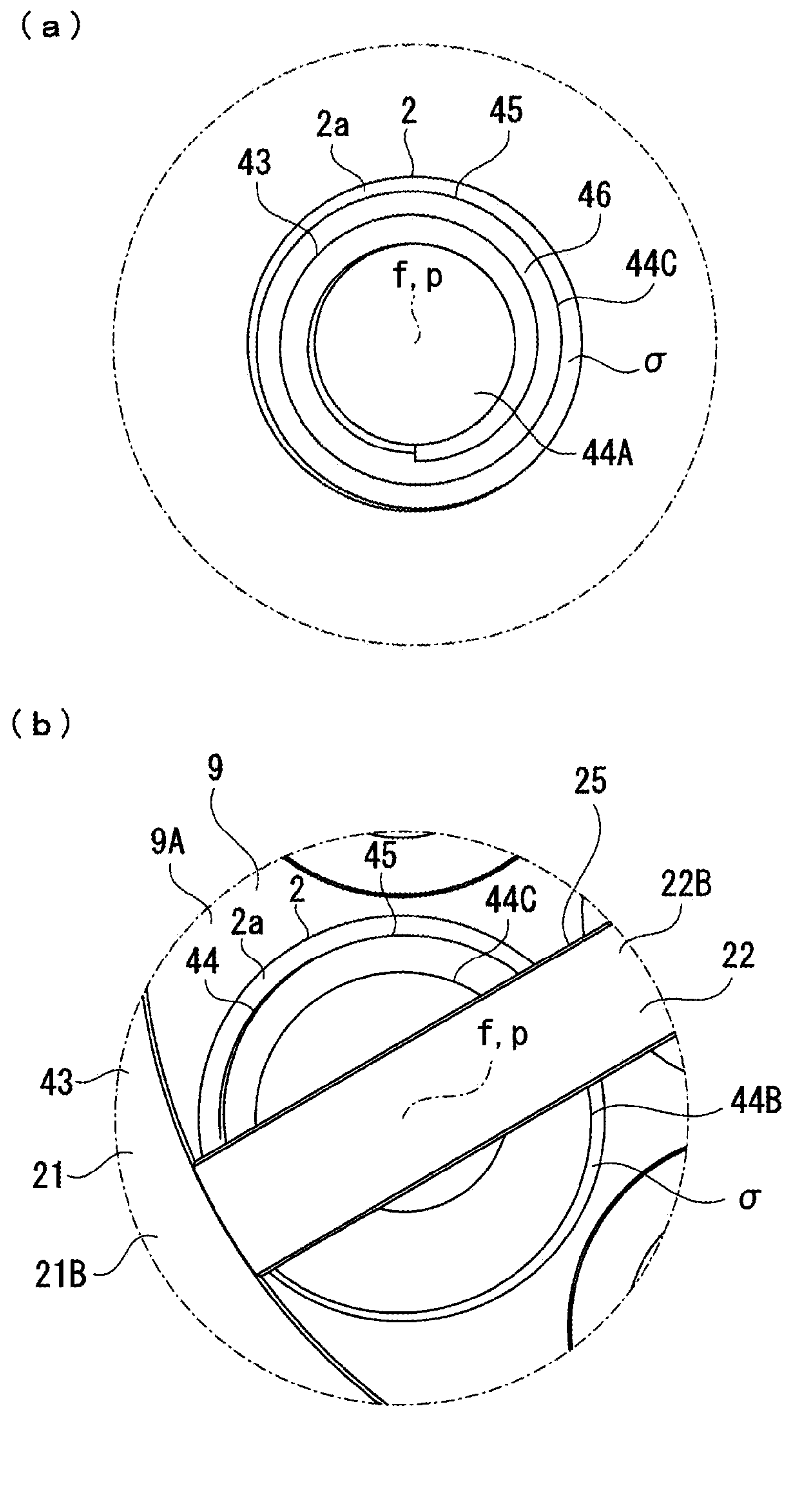
FIG. 27(*a*) is an enlarged view of an R-portion of FIG. 25, and FIG. 27(*b*) is an enlarged view of an S-portion of FIG. 26.
Figure 28:
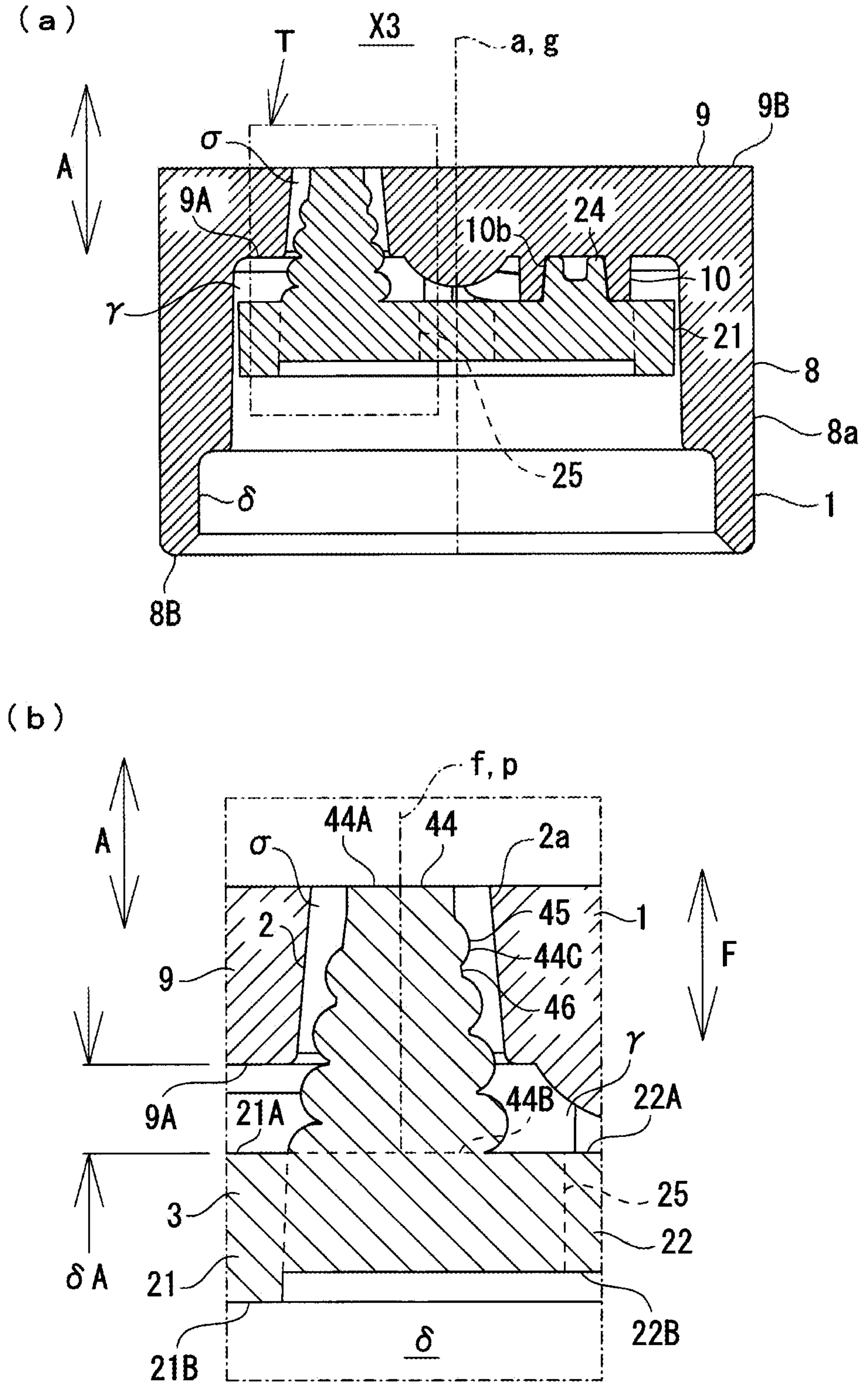
FIG. 28(*a*) is a sectional view taken along the line Q-Q of FIG. 25, and FIG. 28(*b*) is an enlarged view of a T-portion of FIG. 28(*a*).
Figure 29:
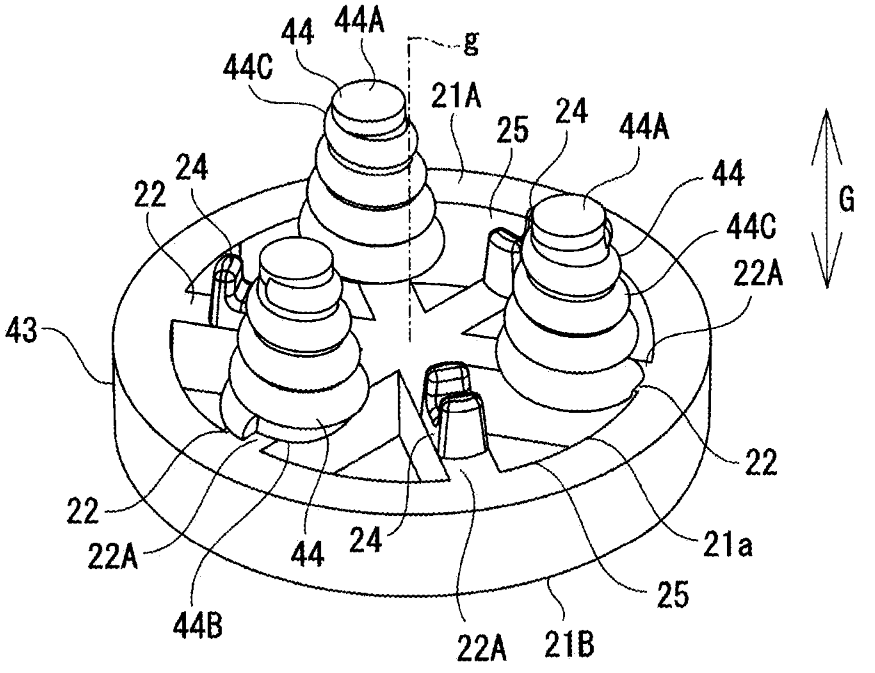
FIG. 29 is a perspective view for illustrating a liquid guide body (for example, liquid guides) in the bubble liquid generating nozzle according to the third embodiment.

As illustrated in FIG. 29 and FIGS. 30, each of the liquid guides 44 is inserted into each of the liquid jetting holes 2 from the conical upper surface 44A (one end face) with a gap between the conical side surface 44C (side surface) and the conical inner peripheral surface 2*a* (inner peripheral surface) of each of the liquid jetting holes 2. As illustrated in FIGS. 28, each of the liquid guides 44 is arranged concentrically with each of the liquid jetting holes 2 to be mounted in each of the liquid jetting holes 2 so as to form a liquid flow path "σ" between the uneven surface (conical side surface 44C) and the conical inner peripheral surface 2*a* (inner peripheral surface) of each of the liquid jetting holes 2. Each of the liquid guides 44 is mounted in each of the liquid jetting holes 2 so that the conical upper surface 44A is arranged to be flush with the another closing plate flat surface 9B (another nozzle plate surface) of the closing flat plate 9 (nozzle flat plate/nozzle plate). As illustrated in FIGS. 27 and FIGS. 28, the liquid flow path "σ" is formed in an annular shape (circular annular shape) over the circumferential direction of the liquid jetting hole 2 between the uneven surface (conical side surface 44C/side surface) and the conical inner peripheral surface 2*a* of the liquid jetting hole 2. The liquid flow path "σ" is formed in an annular shape (circular annular shape) over the entire circumference of the conical inner peripheral surface 2*a* of the liquid jetting hole 2. The liquid flow path "σ" is formed in a circular annular shape (annular shape) over the circumferential direction of the liquid jetting hole 2 (circumferential direction of the liquid guide 44) between the convex portion 45 of the uneven surface (conical side surface 44C) and the conical inner peripheral surface 2*a* of the liquid jetting hole 2. As illustrated in FIGS. 28, the liquid flow path "σ" is formed in an annular shape (circular annular shape) penetrating through the closing flat plate 9 (nozzle flat plate/nozzle plate) while being reduced in diameter from the inflow space "δ" side in the direction F of the hole center line "f" of the liquid jetting hole 2. The liquid flow path "σ" penetrates through the closing flat plate 9 in the direction F of the hole center line "f" of the liquid jetting hole 2 and communicates to the inflow space "δ". The liquid flow path "σ" is opened to each of the closing plate flat surfaces 9A and 9B (each nozzle plate flat surface) of the closing flat plate 9 (nozzle flat plate) over the circumferential direction of the liquid jetting hole 2 and communicates to the inflow space "δ" (flow path space "γ").

In the bubble liquid generating nozzle X3, each of the connecting protrusions 24 is fixed to each of the connecting tubular portions 10 (nozzle main body 1) by pressing of each of the connecting convex portions 30 and 31 against the inner peripheral surface 10*b* (see FIGS. 28, FIG. 35, and FIGS. 36) in the same manner as described in FIG. 3, FIGS. 5, and FIG. 7.

Figure 35:
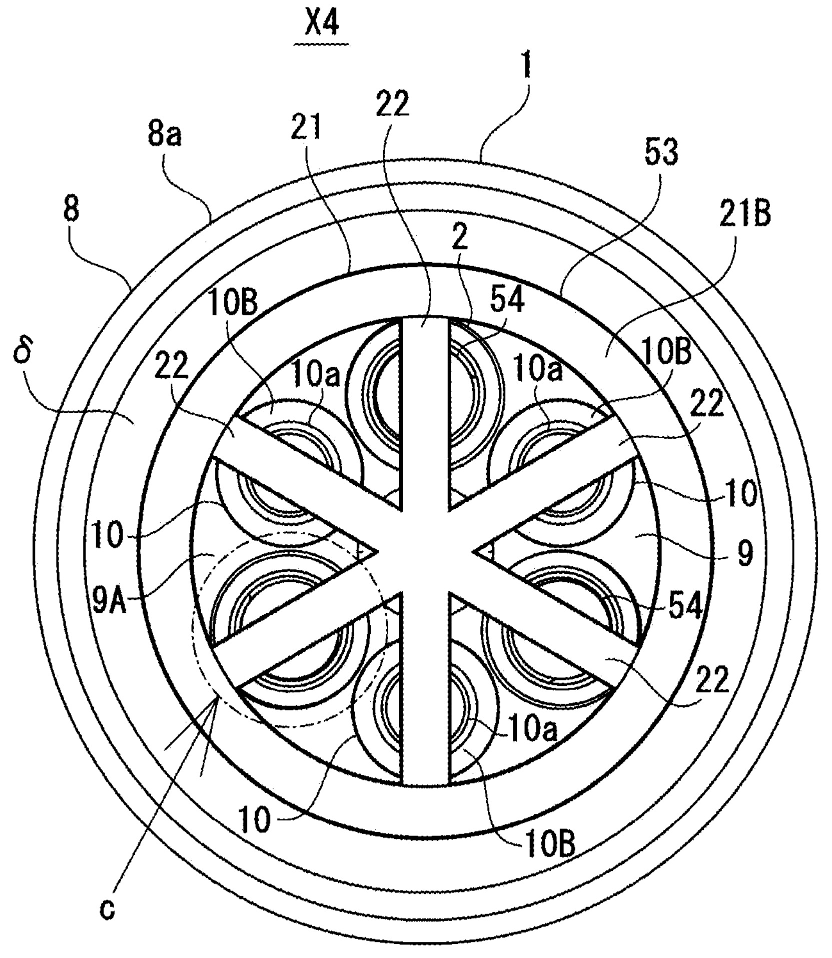
FIG. 35 is a bottom plan view (bottom view) for illustrating the bubble liquid generating nozzle according to the fourth embodiment.

As illustrated in FIG. 35 and FIGS. 36, the guide ring 21, each of the guide ribs 22, and each of the liquid guides 44 are fixed to the nozzle main body 1 by fixing of each of the connecting protrusions 24 to each of the connecting tubular portions 10 (nozzle main body 1).

The guide ring 21 is arranged concentrically with the tubular body 8 in the inflow space "δ", and is fixed to the nozzle main body 1.

The guide ring 21 partitions the flow path space "γ" between the guide ring 21 and the closing flat plate 9 (closing body) in the direction A of the tube center line "a" of the tubular body 8 (see FIGS. 28) in the same manner as described in FIGS. 5. Each of the guide ribs 22 partitions the flow path space "γ" between each of the guide ribs 22 and the closing flat plate 9 (closing body) in the direction A of the tube center line "a" of the tubular body 8 (see FIGS. 28) in the same manner as described in FIGS. 5 and FIG. 6.

As illustrated in FIGS. 28, each of the liquid guides 44 is arranged so that the conical bottom surface 44B side (another end face side) protrudes from each of the liquid jetting holes 2 to the flow path space "γ" by abutment of each of the guide ribs 22 (rib front surface 22A) against each of the connecting tubular portions 10 (another connecting tube end 10B). Each of the liquid guides 44 is arranged so that the conical side surface 44C (side surface) on the conical bottom surface 44B side (another end face side) protrudes from each of the liquid jetting holes 2 to the flow path space "γ". Each of the liquid flow paths "σ" penetrates through the closing flat plate 9 in the direction F of the hole center line "f" of the liquid jetting hole 2 and communicates to the flow path space "γ".

In FIG. 24 to FIGS. 28, in the bubble liquid generating nozzle X3, a liquid (for example, water) flows from the another tube end 8B of the tubular body 8 into the inflow space "δ". The liquid having flowed into the inflow space "δ" flows into each of the communication holes 25, flows through each of the communication holes 25, and flows out to the flow path space "γ".

As illustrated in FIGS. 27 and FIGS. 28, the liquid having flowed out to the flow path space "γ" flows along the conical side surface 44C (uneven surface) on the conical bottom surface 44B side, and flows into each of the liquid flow paths "σ". The liquid having flowed out to the flow path space "γ" is guided by the conical side surface 44C (uneven surface) protruding to the flow path space "γ" (inflow space "δ"), and flows into the liquid flow path "σ" from the entire circumference of each of the liquid jetting holes 2.

As illustrated in FIGS. 27 and FIGS. 28, the liquid having flowed into the liquid flow path "σ" from the flow path space "γ" (inflow space "δ") flows through the liquid flow path "σ" [between the uneven surface and the conical inner peripheral surface 2*a* (inner peripheral surface)]. As a result, the liquid is reduced in pressure while being increased in flow velocity, and is ejected from the nozzle main body 1 (each of the liquid jetting holes 2). The liquid having flowed into the liquid flow path "σ" flows along the uneven surface (conical side surface 44C) to become turbulence due to the uneven surface, and generates cavitation. The gas (air) in the liquid flowing through the liquid flow path "ε" is precipitated from the liquid by cavitation and turbulence (fluid resistance), and is crushed (sheared) to form a large amount of microbubbles and a large amount of ultrafine bubbles. The microbubbles and ultrafine bubbles are mixed and dissolved in the liquid flowing through the liquid flow path "ε", and become a bubble liquid (bubble water) in which a large amount of microbubbles and a large amount of ultrafine bubbles are mixed and dissolved. The bubble liquid flows through the liquid flow path "σ", and is ejected from each of the liquid jetting holes 2 (liquid flow path "τ"). The bubble liquid (bubble water) flows through the liquid flow path "σ" in an annular shape (circular annular shape) due to the liquid flow path "σ" [between the conical inner peripheral surface 2*a* (inner peripheral surface) and the uneven surface] formed in an annular shape (circular annular shape) over the circumferential direction of the liquid jetting hole 2 to be formed into a liquid film (film of water) having an annular shape (circular annular shape), and is ejected from each of the liquid jetting holes 2 (liquid flow path "ε"). The liquid film (water film) having an annular shape (circular annular shape) becomes a soft annular liquid film (annular bubble liquid film), and is ejected from each of the liquid jetting holes 2 to an ejection target to effectively remove dirt and germs from the ejection target. The liquid flow path "σ" forms the liquid (bubble liquid) flowing through the liquid flow path "σ" into an annular shape (circular annular shape) and ejects the annular liquid (bubble liquid/annular bubble liquid film) from the liquid jetting hole 2.

A bubble liquid generating nozzle according to a fourth embodiment is described with reference to FIG. 33 to FIG. 42.

In FIG. 33 to FIG. 42, the same reference symbols as those in FIG. 1 to FIG. 14 denote the same members and the same configurations, and hence the detailed description thereof is omitted.

In FIG. 33 to FIG. 42, a bubble liquid generating nozzle X4 according to the fourth embodiment (hereinafter referred to as "bubble liquid generating nozzle X4") includes a nozzle main body 1, a plurality of (for example, three) liquid jetting holes 2 (liquid throttle holes), and a liquid guide body 53 (liquid guides 54).

Figure 38:
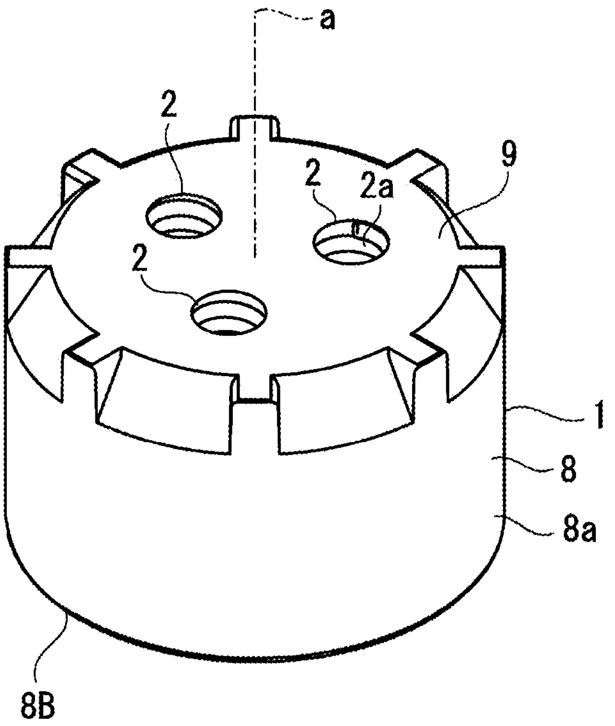
FIG. 38(*a*) is a perspective view for illustrating a nozzle main body in the bubble liquid generating nozzle according to the fourth embodiment, and FIG. 38(*b*) is a top plan view (top view) for illustrating the nozzle main body.
Figure 38:
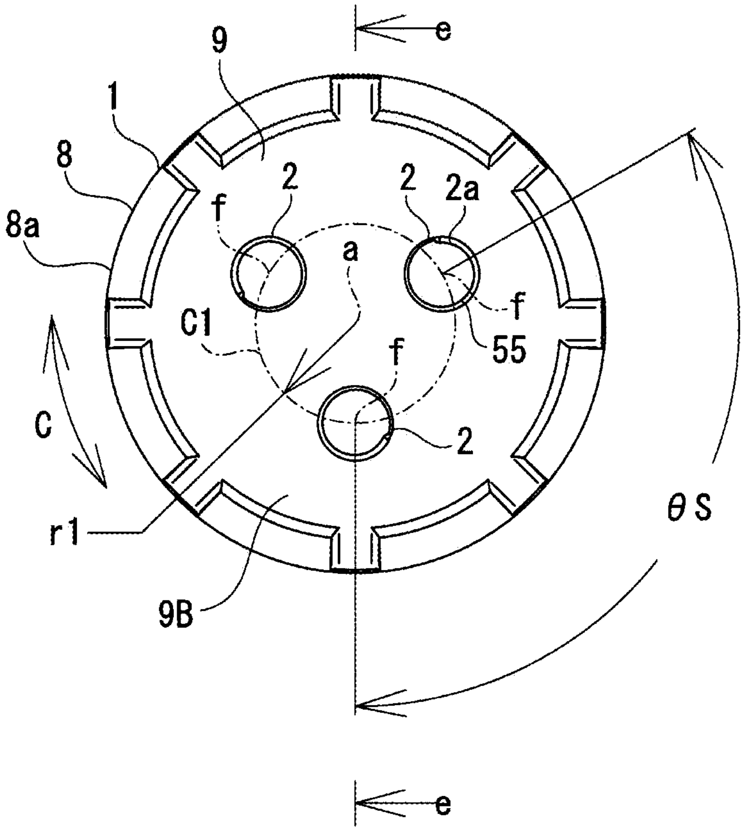
Figure 39:
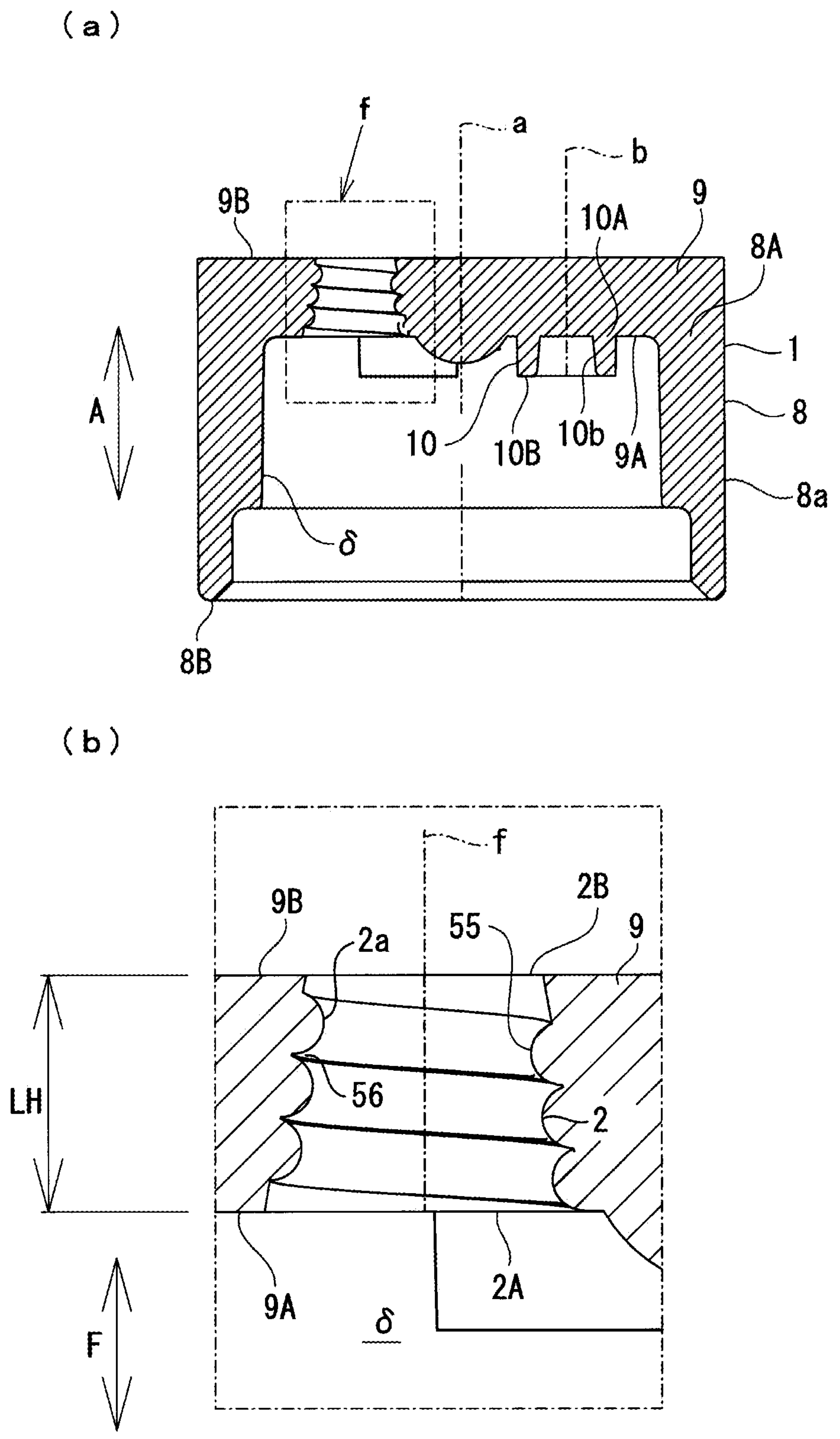
FIG. 39(*a*) is a sectional view taken along the line e-e of FIG. 38(*b*), and FIG. 39(*b*) is an enlarged view of an f-portion of FIG. 39(*a*).

As illustrated in FIGS. 38 and FIGS. 39, the conical inner peripheral surface 2*a* (inner peripheral surface) of each of the liquid jetting holes 2 is formed in a shape of an uneven surface (uneven shape) on which a convex portion 55 and a concave portion 56 are arranged. The conical inner peripheral surface 2*a* (inner peripheral surface) of each of the liquid jetting holes 2 is formed in a shape of an uneven surface (uneven shape) having the convex portion 55 and the concave portion 56.

As illustrated in FIGS. 38 and FIGS. 39, the convex portion 55 is formed in a helical shape (helical convex portion). The convex portion 55 is formed in, for example, an arc shape in cross-section (arc-like shape in cross-section).

As illustrated in FIGS. 38 and FIGS. 39, the concave portion 56 is formed in a helical shape (helical concave portion). The concave portion 56 is arranged so as to be interposed in the convex portion 55 formed in the helical shape.

As illustrated in FIGS. 39, the convex portion 55 and the concave portion 56 are arranged concentrically with the hole center line "f" of the liquid jetting hole 2. The convex portion 55 and the concave portion 56 are arranged between each of the closing plate flat surfaces 9A and 9B of the closing flat plate 9 (between each of the openings 2A and 2B of the liquid jetting hole 2) so as to extend in a helical shape while being reduced in diameter from one opening 2A (one closing plate flat surface 9A) on the inflow space "δ" side to another opening 2B (another closing plate flat surface 9B) in the direction F of the hole center line "f" of the liquid jetting hole 2, to thereby form the uneven surface of the conical inner peripheral surface 2*a* (inner peripheral surface) [form the conical inner peripheral surface 2*a* (inner peripheral surface) into an uneven shape].

Figure 40:
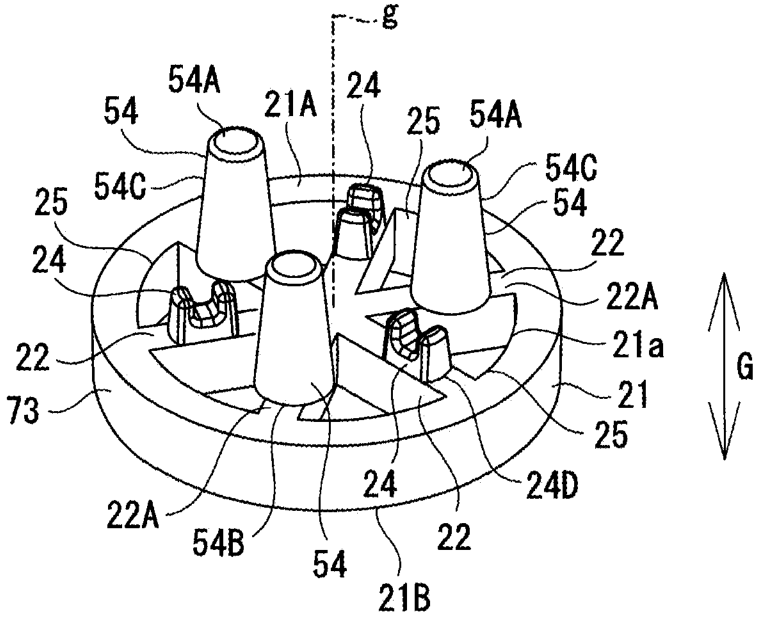
FIG. 40 is a perspective view for illustrating a liquid guide body (for example, liquid guides) in the bubble liquid generating nozzle according to the fourth embodiment.
Figure 41:
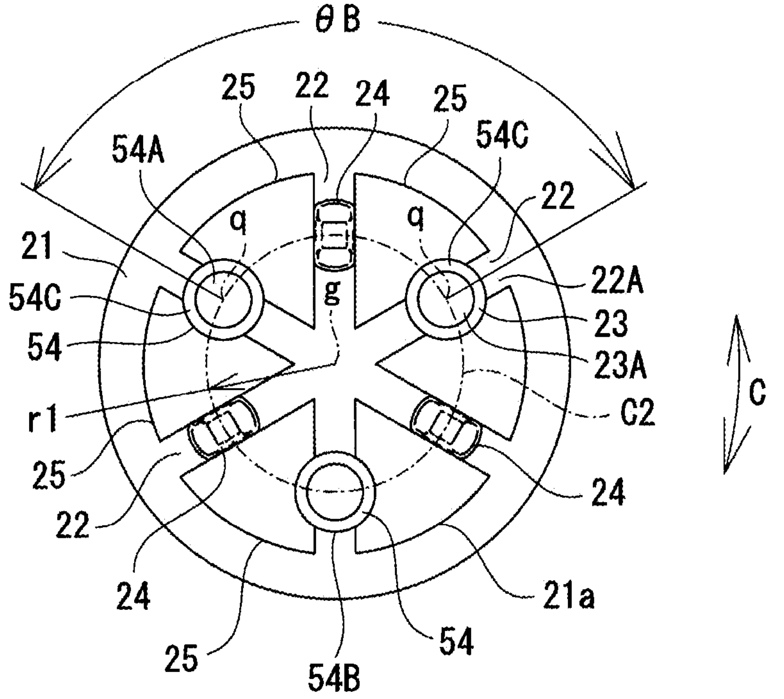
FIG. 41(*a*) is a top plan view (top view) for illustrating the liquid guide body in the bubble liquid generating nozzle according to the fourth embodiment, and FIG. 41(*b*) is a bottom plan view (bottom view) for illustrating the liquid guide body.
Figure 41:
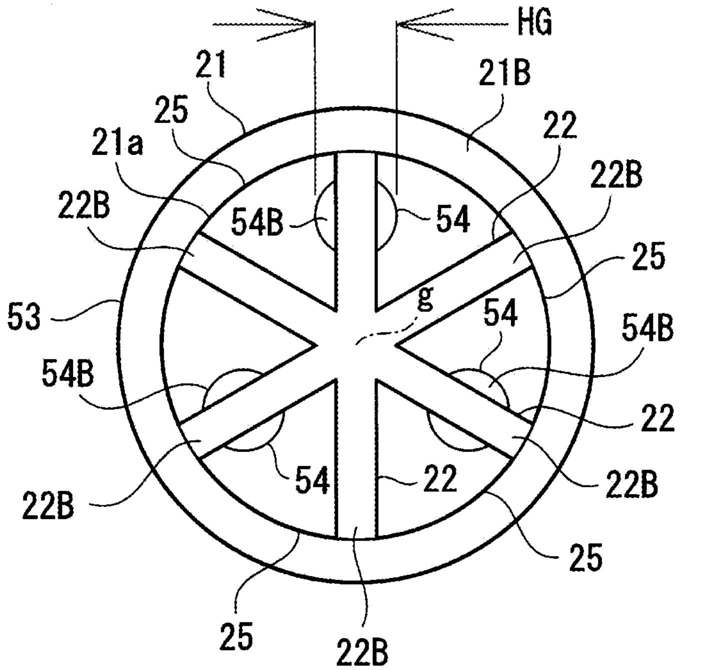
Figure 42:
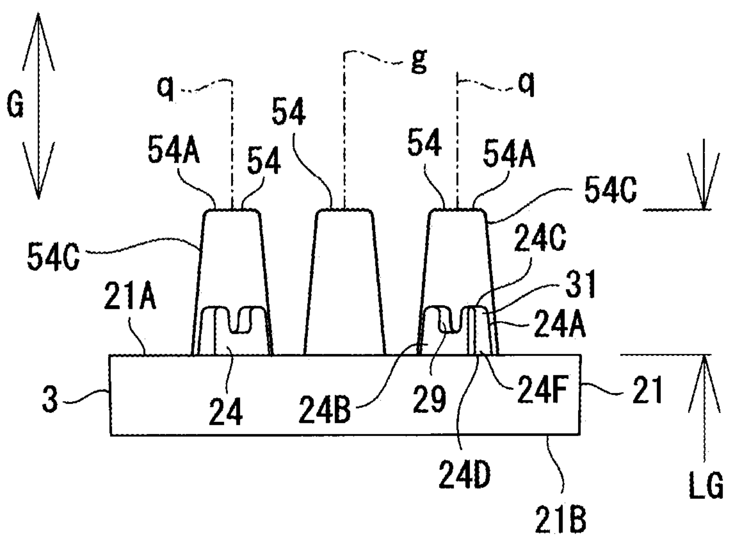
FIG. 42 is a side view for illustrating the liquid guide body in the bubble liquid generating nozzle according to the fourth embodiment.
Figure 43:
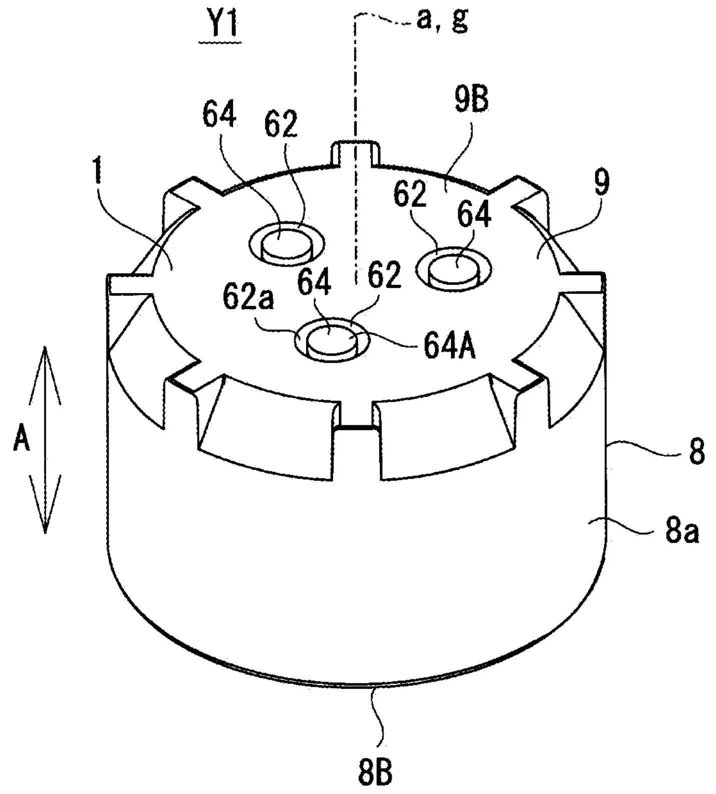
FIG. 43 is a perspective view for illustrating a bubble liquid generating nozzle according to a fifth embodiment.
Figure 44:
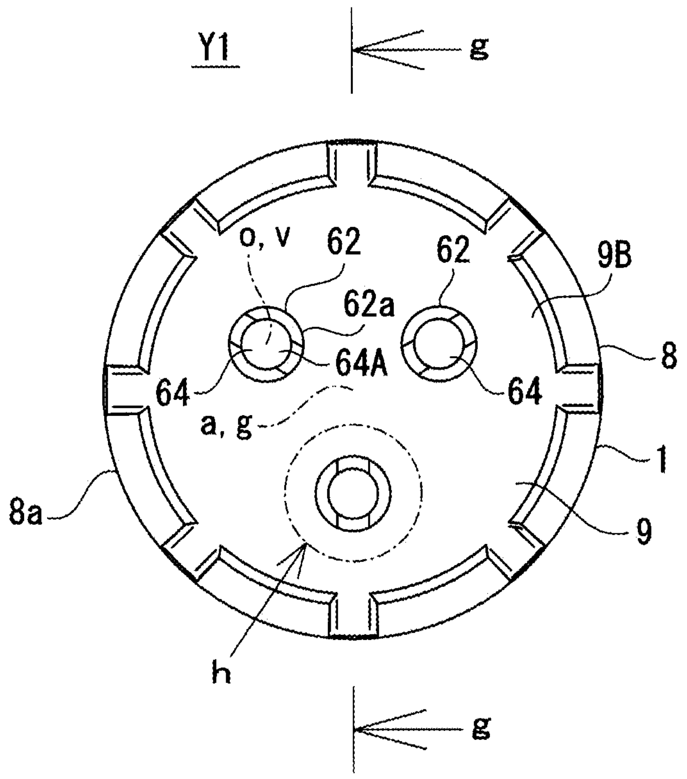
FIG. 44 is a top plan view (top view) for illustrating the bubble liquid generating nozzle according to the fifth embodiment.

As illustrated in FIG. 40 to FIG. 42, the liquid guide body 53 (guide fixed body) includes a guide ring 21, a plurality of (for example, six) guide ribs 22 (guide leg portions), a plurality of (for example, three) liquid guides 54, and a plurality of (three) connecting protrusions 24.

The liquid guide body 53 is constructed by integrally forming the guide ring 21, each of the guide ribs 22, each of the liquid guides 54, and each of the connecting protrusions 24 with a synthetic resin.

As illustrated in FIG. 40 to FIG. 42, each of the liquid guides 54 is formed in a three-dimensional shape having a pair of end faces and a side surface arranged (formed) between each of the end faces. Each of the liquid guides 54 is formed in a conical shape (truncated cone). Each of the liquid guides 54 has a conical upper surface 54A (one end face), a conical bottom surface 54B (another end face), and a conical side surface 54C (side surface). The conical side surface 54C (side surface) of each of the liquid guides 54 is arranged (formed) between the conical upper surface 54A and the conical bottom surface 54B (between each of the end faces).

As illustrated in FIG. 42, each of the liquid guides 54 has a guide height LG in a direction Q of a cone center line "q". As illustrated in FIGS. 41, each of the liquid guides 54 has a maximum bottom width HG of the conical bottom surface 54B.

As illustrated in FIG. 40 to FIG. 42, each of the liquid guides 54 is arranged between the ring center line "g" and the inner periphery 21*a* (inner peripheral surface) of the guide ring 21 in the radial direction of the guide ring 21.

Each of the liquid guides 54 is arranged on a circle C2 having the same radius r1 as that of the circle C1 centered at the ring center line "g" of the guide ring 21. Each of the liquid guides 54 is arranged so that the cone center line "q" is located at (matched with) the circle C2. Each of the liquid guides 54 is arranged so as to be separated at guide angles θB between each of the liquid guides 54 in the circumferential direction C of the guide ring 21.

Figure 45:
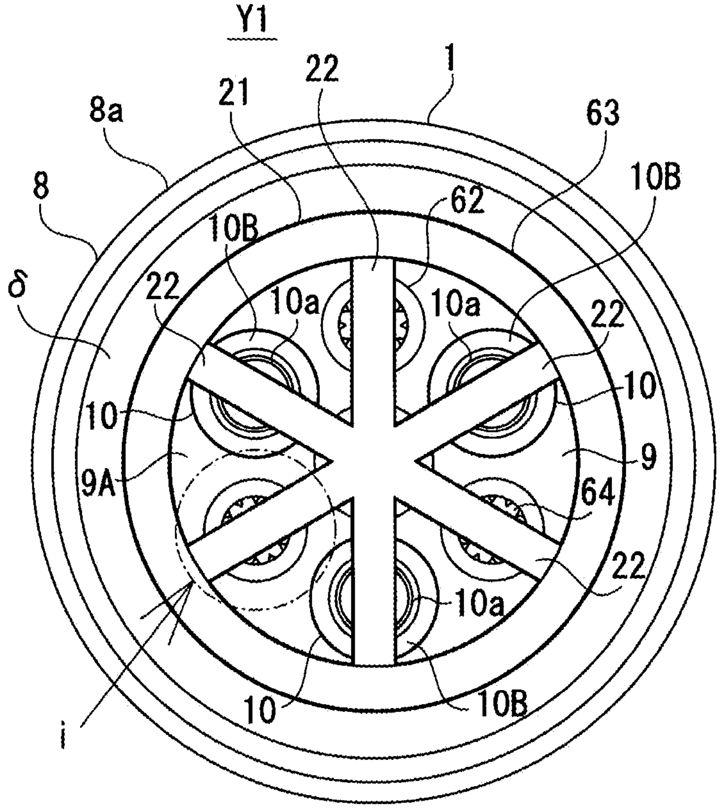
FIG. 45 is a bottom plan view (bottom view) for illustrating the bubble liquid generating nozzle according to the fifth embodiment.
Figure 46:
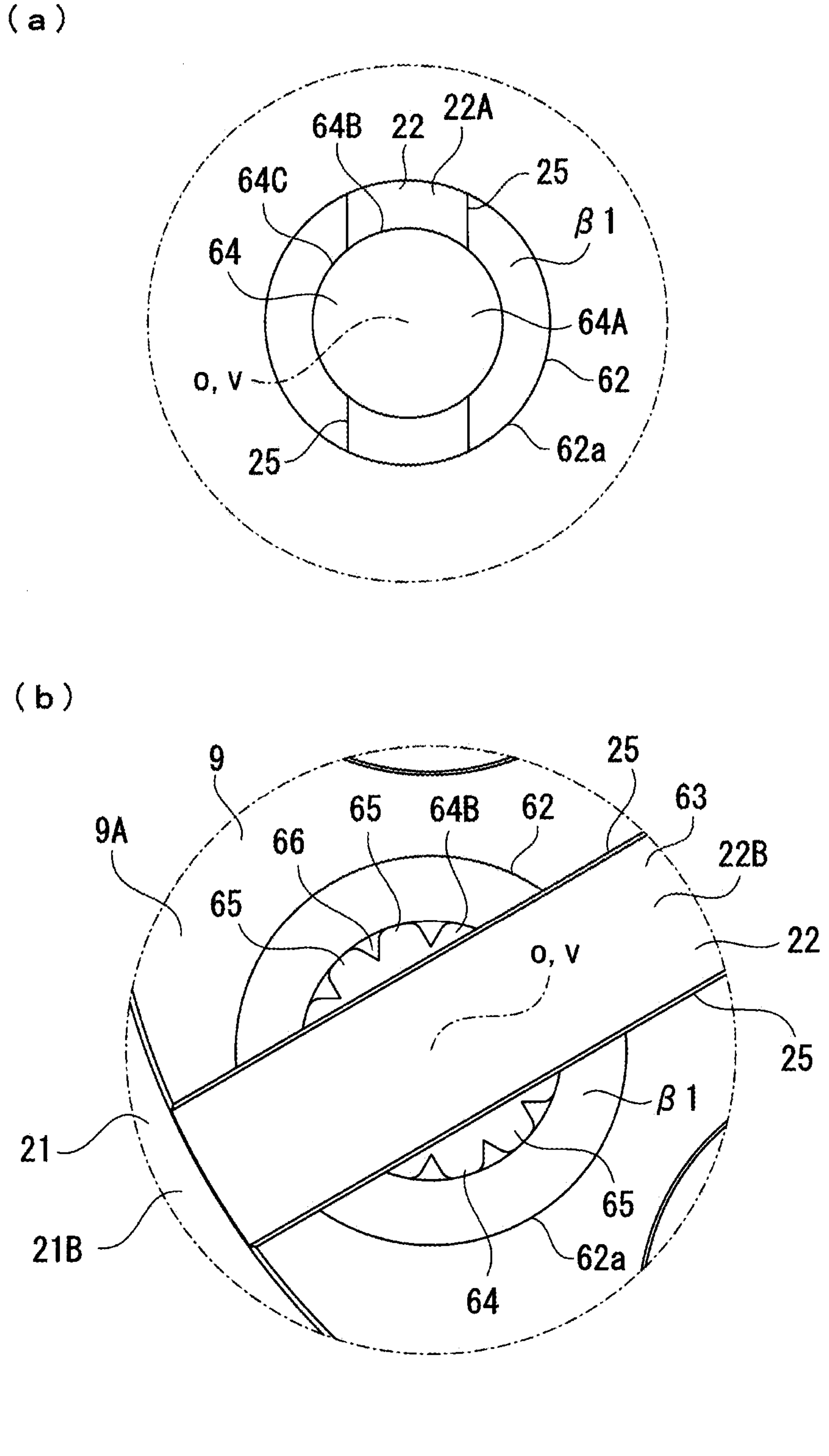
FIG. 46(*a*) is an enlarged view of an h-portion of FIG. 44, and FIG. 46(*b*) is an enlarged view of an i-portion of FIG. 45.
Figure 48:
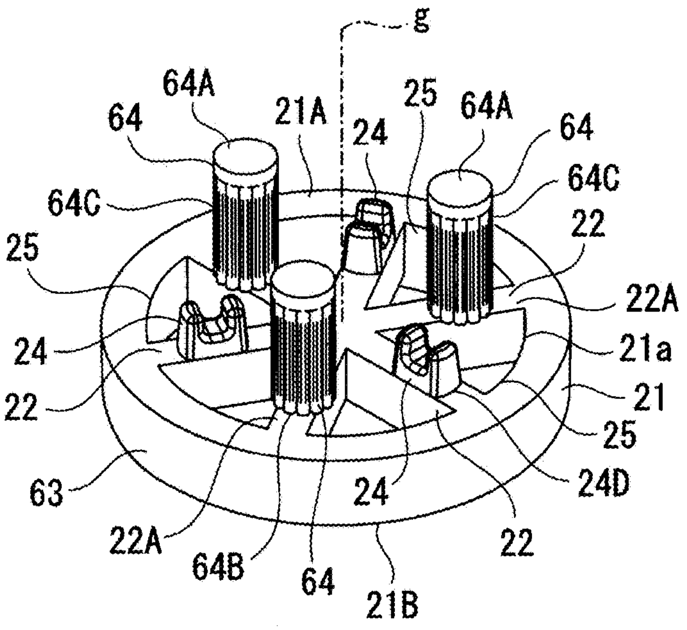
FIG. 48 is a perspective view for illustrating a liquid guide body (for example, liquid guides) in the bubble liquid generating nozzle according to the fifth embodiment.

As illustrated in FIGS. 41, each of the liquid guides 54 is placed on each of the guide ribs 22 separated at the guide angles θB. Each of the liquid guides 54 is fixed to each of the guide ribs 22 so that the conical bottom surface 54B is brought into abutment against the rib front surface 22A of each of the guide ribs 22. As illustrated in FIG. 45, FIGS. 46, and FIG. 48, each of the liquid guides 54 is fixed to each of the guide ribs 22 so that the conical bottom surface 54B protrudes from each of the guide ribs 22 to each of the communication holes 25 in the circumferential direction C of the guide ring 21 (liquid guide body 53). Each of the liquid guides 54 protrudes from the rib front surface 22A of each of the guide ribs 22 in the direction G of the ring center line "g" of the guide ring 21 to be provided upright on each of the guide ribs 22.

In the bubble liquid generating nozzle X4, each of the connecting protrusions 24 is arranged between each of the liquid guides 54 (see FIGS. 41) in the same manner as described in FIG. 10 to FIGS. 14.

As illustrated in FIG. 33 to FIGS. 37, the liquid guide body 53 (guide ring 21, each guide rib 22, each liquid guide 54, and each connecting protrusion 24) is incorporated into the nozzle main body 1.

The liquid guide body 53 is inserted into the inflow space "δ" (into the tubular body 8) from the another tube end 8B so that the conical upper surface 54A of the liquid guide 54 faces the closing flat plate 9. The liquid guide body 53 is inserted into the inflow space "δ" concentrically with the tubular body 8.

As illustrated in FIG. 33 to FIGS. 37, each of the liquid guides 54 is arranged in each of the liquid jetting holes 2. Each of the liquid guides 54 is arranged in each of the liquid jetting holes 2 from the inflow space "δ". Each of the liquid guides 54 is arranged concentrically with each of the liquid jetting holes 2, and is inserted into each of the liquid jetting holes 2.

Figure 37:
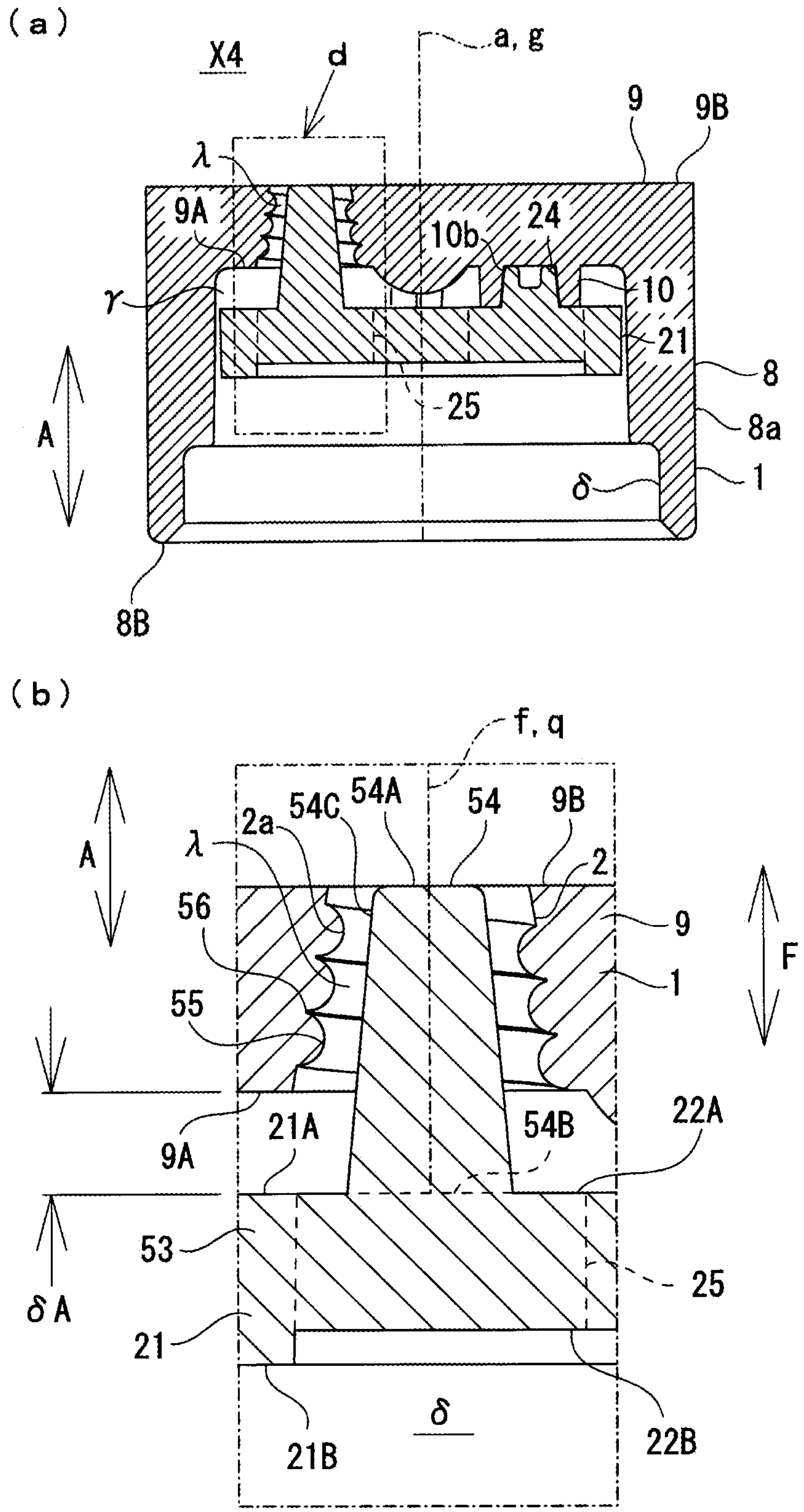
FIG. 37(*a*) is a sectional view taken along the line a-a of FIG. 34, and FIG. 37(*b*) is an enlarged view of a d-portion of FIG. 37(*a*).

As illustrated in FIGS. 36 and FIGS. 37, each of the liquid guides 54 is inserted into each of the liquid jetting holes 2 from the conical upper surface 54A (one end face) with a gap between the conical side surface 54C (side surface) and the conical inner peripheral surface 2*a* (inner peripheral surface) of each of the liquid jetting holes 2. As illustrated in FIGS. 37, each of the liquid guides 54 is arranged concentrically with each of the liquid jetting holes 2 to be mounted in each of the liquid jetting holes 2 so as to form a liquid flow path "λ" between the conical bottom surface 54B side (conical side surface 54C on the conical bottom surface 54B side) and the uneven surface (conical inner peripheral surface 2*a*) of each of the liquid jetting holes 2. Each of the liquid guides 54 is mounted in each of the liquid jetting holes 2 so that the conical upper surface 54A is arranged to be flush with the another closing plate flat surface 9B (another nozzle plate surface) of the closing flat plate 9 (nozzle flat plate/nozzle plate). As illustrated in FIGS. 36 and FIGS. 37, the liquid flow path "λ" is formed in an annular shape (circular annular shape) over the circumferential direction of the liquid jetting hole 2 (liquid guide 54) between the uneven surface (conical inner peripheral surface 2*a*) and the conical side surface 54C of the liquid guide 54. The liquid flow path "λ" is formed in an annular shape (circular annular shape) over the entire circumference of the conical inner peripheral surface 2*a* of the liquid jetting hole 2 (conical side surface 54C of the liquid guide 54). The liquid flow path "λ" is formed in a circular annular shape (annular shape) over the circumferential direction of the liquid jetting hole 2 (circumferential direction of the liquid guide 54) between the convex portion 55 (or the concave portion 56) of the uneven surface (conical inner peripheral surface) and the conical side surface 54C of the liquid guide 54. As illustrated in FIGS. 37, the liquid flow path "λ" is formed in an annular shape (circular annular shape) penetrating through the closing flat plate 9 (nozzle flat plate/nozzle plate) while being reduced in diameter from the inflow space "δ" side in the direction F of the hole center line "f" of the liquid jetting hole 2. The liquid flow path "λ" penetrates through the closing flat plate 9 in the direction F of the hole center line "f" of the liquid jetting hole 2 and communicates to the inflow space "δ". The liquid flow path "λ" is opened to each of the closing plate flat surfaces 9A and 9B (each nozzle plate flat surface) of the closing flat plate 9 (nozzle flat plate) over the circumferential direction of the liquid jetting hole 2 (liquid guide 54) and communicates to the inflow space "δ" (flow path space "γ").

In the bubble liquid generating nozzle X4, each of the connecting protrusions 24 is fixed to each of the connecting tubular portions 10 (nozzle main body 1) by pressing of each of the connecting convex portions 30 and 31 against the inner peripheral surface 10*b* (see FIGS. 37) in the same manner as described in FIG. 3, FIGS. 5, and FIG. 7.

As illustrated in FIGS. 41, the guide ring 21, each of the guide ribs 22, and each of the liquid guides 54 are fixed to the nozzle main body 1 by fixing of each of the connecting protrusions 24 to each of the connecting tubular portions 10 (nozzle main body 1).

As illustrated in FIGS. 37, the guide ring 21 is arranged concentrically with the tubular body 8 in the inflow space "δ", and is fixed to the nozzle main body 1.

The guide ring 21 partitions the flow path space "γ" between the guide ring 21 and the closing flat plate 9

(closing body) in the direction A of the tube center line "a" of the tubular body 8 (see FIGS. 37) in the same manner as described in FIGS. 5.

Each of the guide ribs 22 partitions the flow path space "γ" between each of the guide ribs 22 and the closing flat plate 9 (closing body) in the direction A of the tube center line "a" of the tubular body 8 (see FIGS. 37) in the same manner as described in FIGS. 5 and FIG. 6.

As illustrated in FIGS. 37, each of the liquid guides 54 is arranged so that the conical bottom surface 54B side (conical side surface 54C on the conical bottom surface 54B side) protrudes from each of the liquid jetting holes 2 to the flow path space "γ" by abutment of each of the guide ribs 22 (rib front surface 22A) against each of the connecting tubular portions 10 (another connecting tube end 10B). Each of the liquid flow paths "λ" penetrates through the closing flat plate 9 in the direction F of the hole center line "f" of the liquid jetting hole 2 and communicates to the flow path space "γ".

In FIG. 33 to FIGS. 37, in the bubble liquid generating nozzle X4, a liquid (for example, water) flows from the another tube end 8B of the tubular body 8 into the inflow space "δ". The liquid having flowed into the inflow space "δ" flows into each of the communication holes 25, flows through each of the communication holes 25, and flows out to the flow path space "γ".

As illustrated in FIGS. 36 and FIGS. 37, the liquid having flowed into the flow path space "γ" flows along the conical side surface 54C on the conical bottom surface 54B side, and flows into each of the liquid flow paths "λ". The liquid having flowed out to the flow path space "γ" is guided by the conical side surface 53C protruding to the flow path space "γ" (inflow space "δ"), and flows into the liquid flow path "λ" from the entire circumference of each of the liquid jetting holes 2.

As illustrated in FIGS. 36 and FIGS. 37, the liquid having flowed into the liquid flow path "λ" from the flow path space "γ" (inflow space "δ") flows through the liquid flow path "λ" (between the uneven surface and the conical side surface 54C). As a result, the liquid is reduced in pressure while being increased in flow velocity, and is ejected from the nozzle main body 1 (each of the liquid jetting holes 2). The liquid having flowed into the liquid flow path "λ" flows along the uneven surface (conical inner peripheral surface 2*a*) to become turbulence due to the uneven surface, and generates cavitation. The gas (air) in the liquid flowing through the liquid flow path "λ" is precipitated from the liquid by cavitation and turbulence (fluid resistance), and is crushed (sheared) to form a large amount of microbubbles and a large amount of ultrafine bubbles. The microbubbles and ultrafine bubbles are mixed and dissolved in the liquid flowing through the liquid flow path "λ", and become a bubble liquid (bubble water) in which a large amount of microbubbles and a large amount of ultrafine bubbles are mixed and dissolved. The bubble liquid flows through the liquid flow path "λ", and is ejected from each of the liquid jetting holes 2 (liquid flow path "λ"). The bubble liquid flows through the liquid flow path "λ" in an annular shape (circular annular shape) due to the liquid flow path "λ" [between the conical side surface 54C (side surface) and the uneven surface] having an annular shape (circular annular shape) formed over the circumferential direction of the liquid jetting hole 2 to be formed into a liquid film (film of water) having an annular shape (circular annular shape), and is ejected from each of the liquid jetting holes 2. The liquid film (water film) having an annular shape (circular annular shape) becomes a soft annular liquid film (annular bubble liquid film), and is ejected from each of the liquid jetting holes 2 (liquid flow paths "λ") to an ejection target to effectively remove dirt and germs from the ejection target. The liquid flow path "λ" forms the liquid (bubble liquid) flowing through the liquid flow path "λ" into an annular shape (circular annular shape) and ejects the annular liquid (bubble liquid/annular bubble liquid film) from the liquid jetting hole 2.

A bubble liquid generating nozzle according to a fifth embodiment is described with reference to FIG. 43 to FIGS. 51.

In FIG. 43 to FIGS. 51, the same reference symbols as those in FIG. 1 to FIGS. 14 denote the same members and the same configurations, and hence the detailed description thereof is omitted.

In FIG. 43 to FIGS. 51, a bubble liquid generating nozzle Y1 according to the fifth embodiment (hereinafter referred to as "bubble liquid generating nozzle Y1") includes a nozzle main body 1, a plurality of (for example, three) liquid jetting holes 62, and a liquid guide body 63 (liquid guides 64).

As illustrated in FIG. 43, FIG. 44, FIGS. 46, and FIGS. 47, each of the liquid jetting holes 62 is formed in the closing flat plate 9 (nozzle main body 1). Each of the liquid jetting holes 62 is arranged between the tube center line "a" of the tubular body 8 and the outer periphery 8*a* (outer peripheral surface) of the tubular body 8 in the radial direction of the tubular body 8. Each of the liquid jetting holes 62 is arranged on the circle C1. Each of the liquid jetting holes 62 is arranged so that a hole center line "v" is located at (matched with) the circle C1. Each of the liquid jetting holes 62 is arranged so as to be separated at the hole angles θA between each of the liquid jetting holes 62 in the circumferential direction C of the tubular body 8. Each of the liquid jetting holes 62 is arranged between each of the connecting tubular portions 10 (at the center between each of the connecting tubular portions 10) in the circumferential direction C of the tubular body 8.

Figure 47:
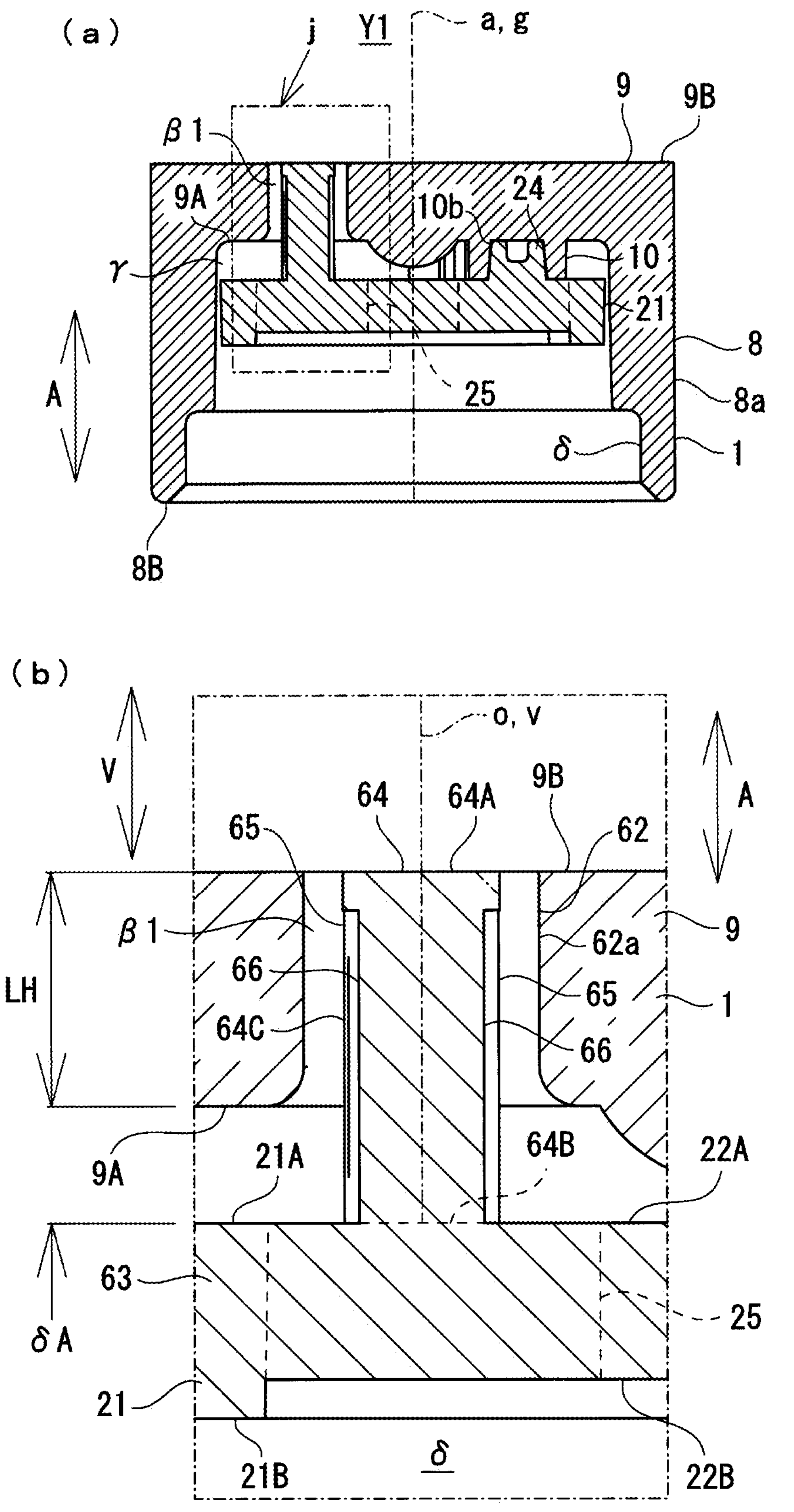
FIG. 47(*a*) is a sectional view taken along the line g-g of FIG. 44, and FIG. 47(*b*) is an enlarged view of a j-portion of FIG. 47(*a*).

As illustrated in FIGS. 47, each of the liquid jetting holes 62 penetrates through the closing flat plate 9 (closing body) in the direction A of the tube center line "a" of the tubular body 8 to be opened to each of the closing plate flat surfaces 9A and 9B of the closing flat plate 9. Each of the liquid jetting holes 62 is formed in a shape of a circular hole penetrating through the closing flat plate 9 (closing body) in the direction A of the tube center line "a" of the tubular body 8.

Each of the liquid jetting holes 62 has a jetting hole length LH in a direction V of the hole center line "v".

As illustrated in FIG. 48 to FIGS. 51, the liquid guide body 63 (guide fixed body) includes a guide ring 21, a plurality of (for example, six) guide ribs 22 (guide legs), a plurality of (for example, three) liquid guides 64, and a plurality of (for example, three) connecting protrusions 24.

As illustrated in FIG. 48 to FIGS. 51, each of the liquid guides 64 is formed in a three-dimensional shape having a pair of end faces and a side surface arranged (formed) between each of the end faces. Each of the liquid guides 64 is formed in a columnar shape (columnar body). Each of the liquid guides 64 has a circular upper surface 64A (one circular end face/one end face), a circular bottom surface 64B (another circular end face/another end face), and an outer peripheral side surface 64C (outer peripheral surface/side surface). The outer peripheral side surface 64C (side surface) of each of the liquid guides 64 is arranged (formed) between the circular upper surface 64A and the circular bottom surface 64B (between each of the end faces). The outer peripheral side surface 64C (side surface) of each of the liquid guides 64 is formed in a shape of an uneven surface (uneven shape) on which a convex portion 65 and a concave portion 66 are arranged. The outer peripheral side surface 64C (side surface) of each of the liquid guides 64 is formed in a shape of an uneven surface (uneven shape) having a plurality of convex portions 65 and a plurality of concave portions 66.

Figure 50:
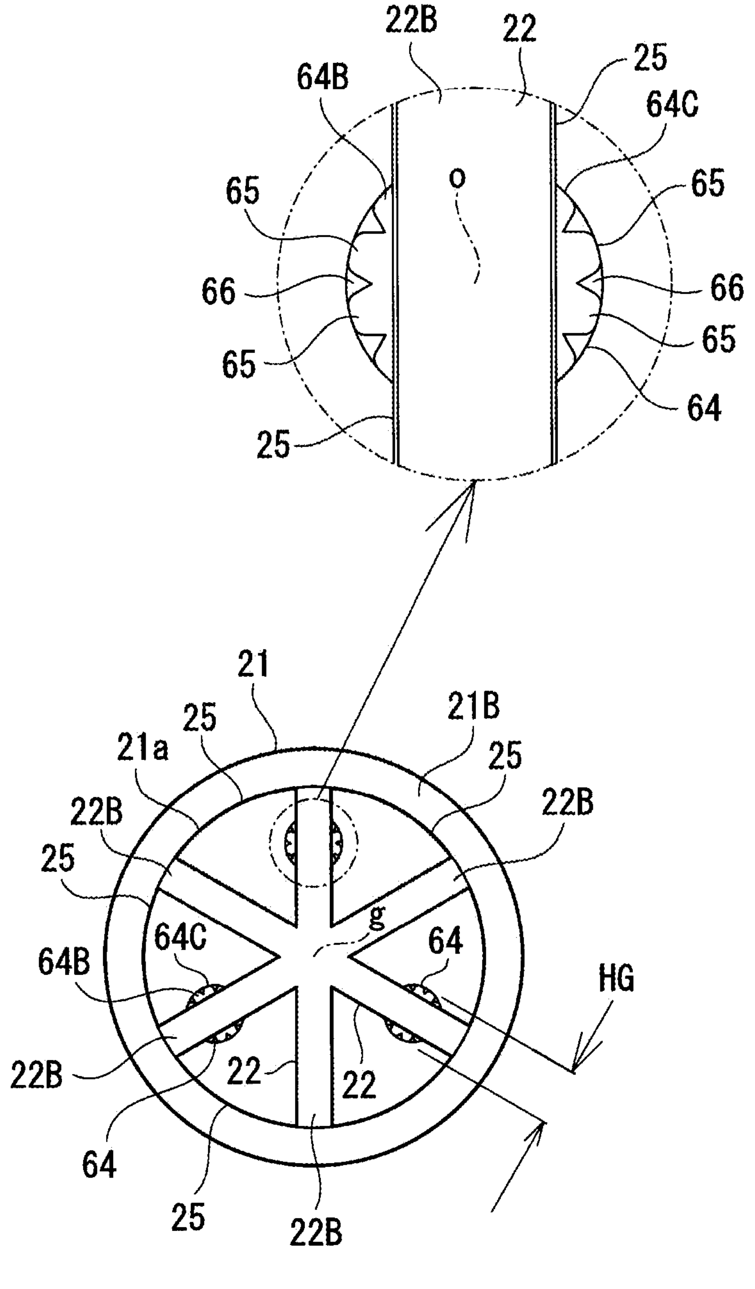
FIG. 50 is a bottom plan view (bottom view) for illustrating the liquid guide body in the bubble generating nozzle according to the fifth embodiment.
Figure 51:
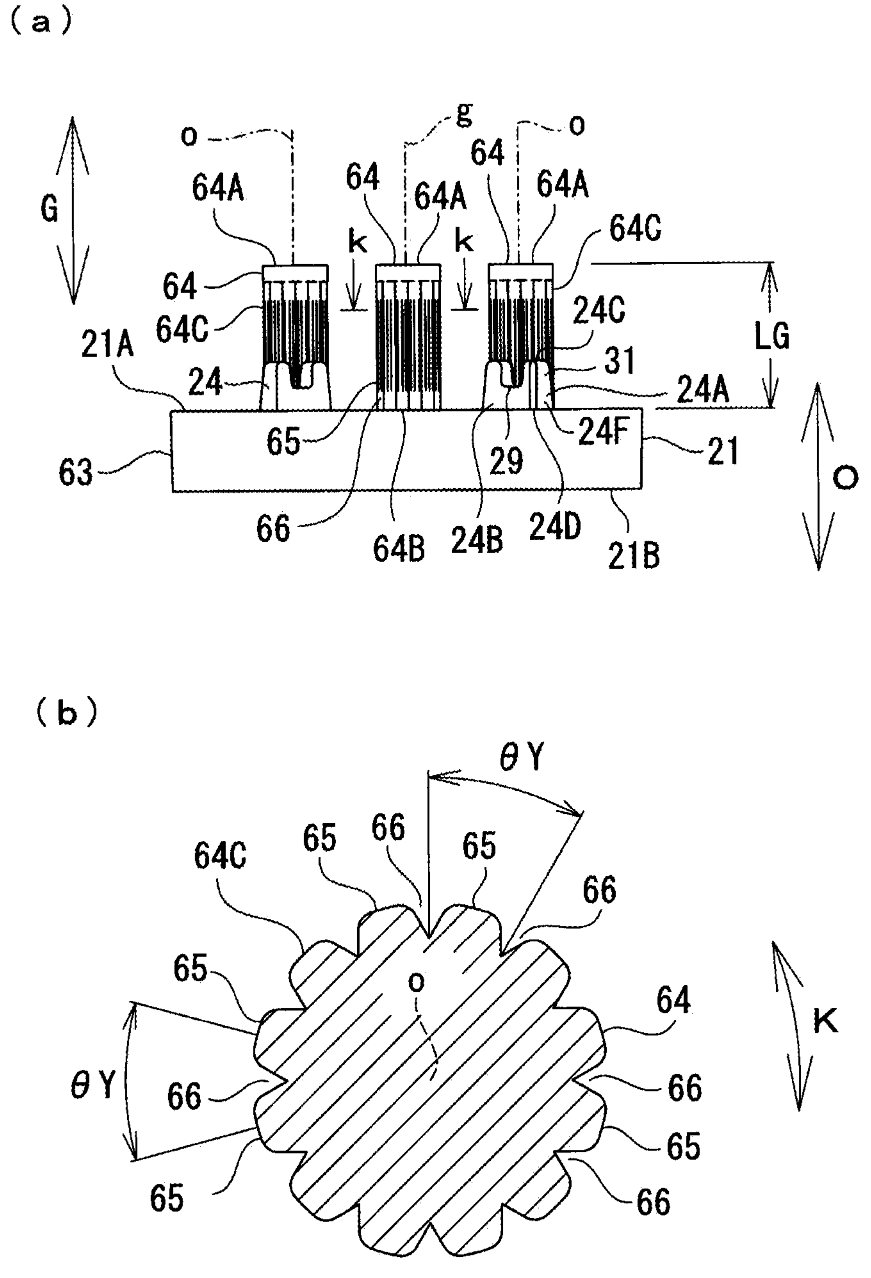
FIG. 51(*a*) is a side view for illustrating the liquid guide body in the bubble liquid generating nozzle according to the fifth embodiment, and FIG. 51(*b*) is an enlarged sectional view taken along the line k-k of FIG. 51(*a*).
Figure 52:
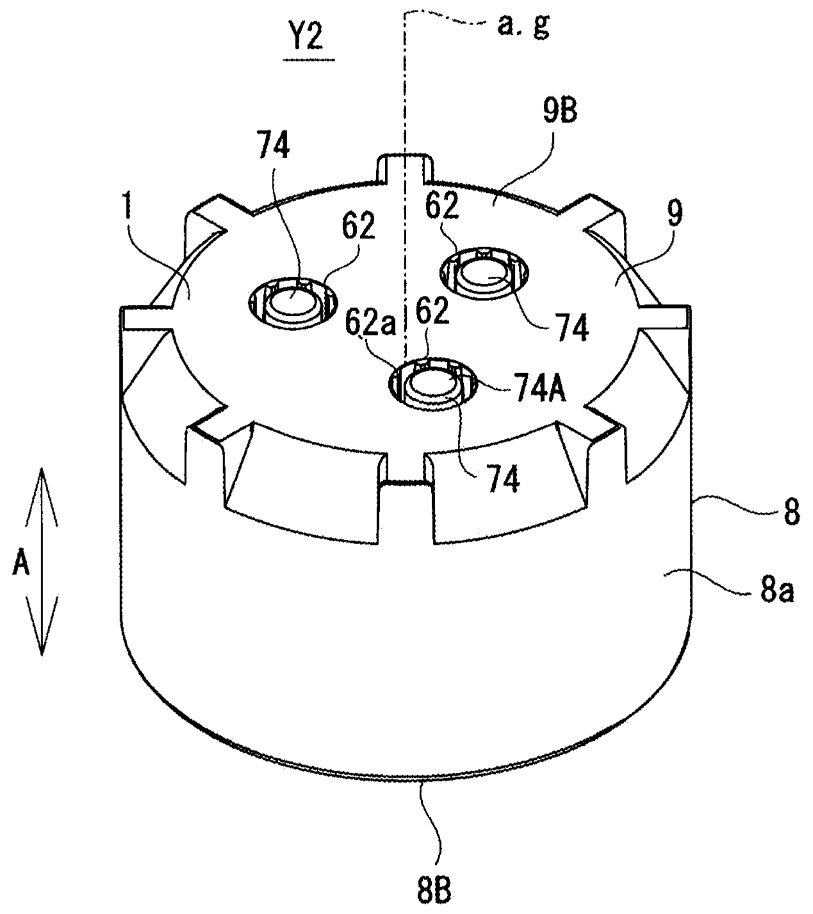
FIG. 52 is a perspective view for illustrating a bubble liquid generating nozzle according to a sixth embodiment.
Figure 53:
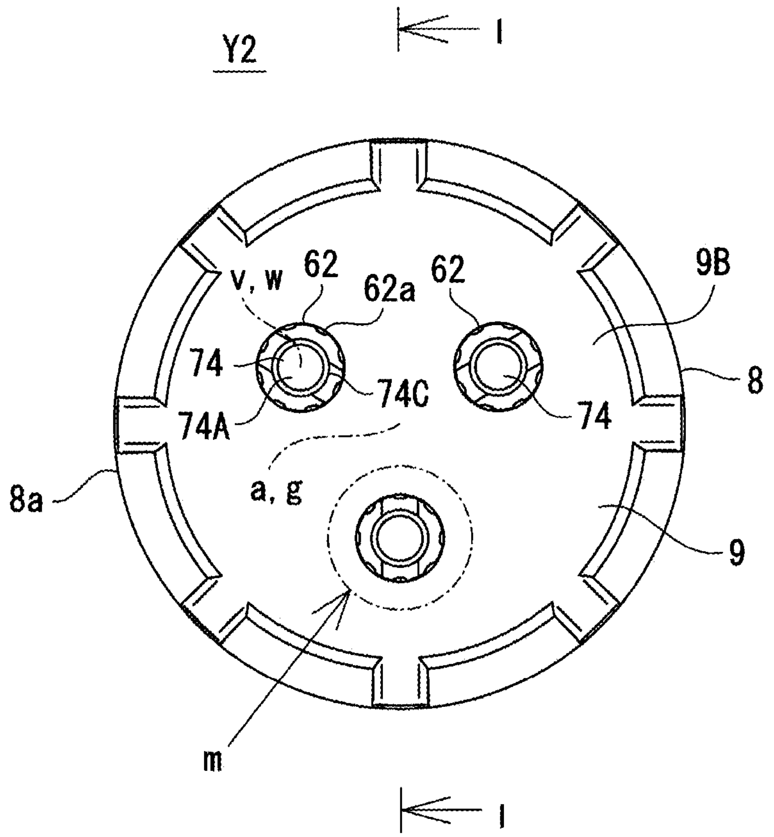
FIG. 53 is a top plan view (top view) for illustrating the bubble liquid generating nozzle according to the sixth embodiment.
Figure 54:
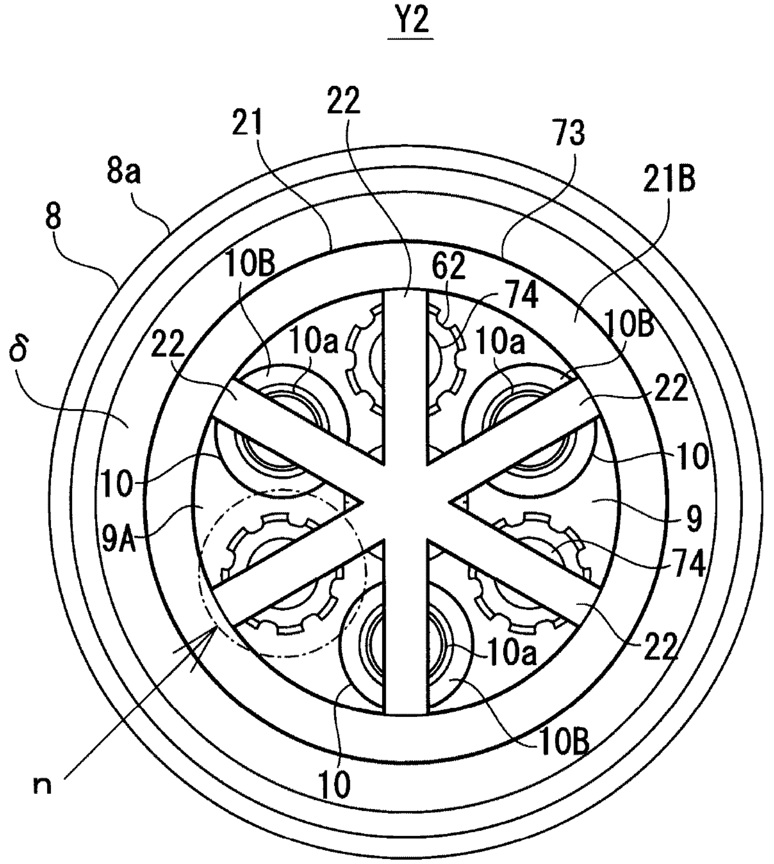
FIG. 54 is a bottom plan view (bottom view) for illustrating the bubble liquid generating nozzle according to the sixth embodiment.

As illustrated in FIG. 48, FIG. 50, and FIGS. 51, the plurality of convex portions 65 are formed in a linear shape (stripe) (linear convex portion/stripe convex portion). Each of the convex portions 65 is arranged so as to be separated at arrangement angles θY between each of the convex portions 65 in the circumferential direction K of the liquid guide 64. Each of the convex portions 65 is formed so that the cross-section perpendicular to a cone center line "o" of the liquid guide 64 is formed in a trapezoidal shape (hereinafter referred to as "trapezoidal shape in cross-section").

As illustrated in FIG. 48, FIG. 50, and FIGS. 51, each of the plurality of concave portions 66 is formed in a linear shape (stripe) (linear concave portion/stripe concave portion). Each of the concave portions 66 is formed (arranged) between each of the convex portions 65 at the arrangement angles θY between each of the concave portions 66 in the circumferential direction K of the liquid guide 64.

Each of the convex portions 65 is continuously formed (arranged) in the circumferential direction K of the liquid guide 64 so as to have, for example, a trapezoidal shape in cross-section, and each of the concave portions 66 is arranged (formed) between each of the convex portions 65 that continues in the circumferential direction K of the liquid guide 64.

As illustrated in FIGS. 51, each of the convex portions 65 and each of the concave portions 66 extend between the circular upper surface 64A side (circular upper surface) and the circular bottom surface 64B in a direction O of a column center line "o" of the liquid guide 64, to thereby form the uneven surface of the outer peripheral side surface 64C (side surface) [form the outer peripheral side surface 64C (side surface) into an uneven shape].

As illustrated in FIGS. 51, each of the liquid guides 64 has a guide height LG in the direction O of the column center line "o". The guide height LG is set to be higher than the jetting hole length LH of the liquid jetting hole 62. As illustrated in FIG. 50, each of the liquid guides 64 has a maximum diameter HG of the circular bottom surface 64B.

As illustrated in FIG. 48 to FIGS. 51, each of the liquid guides 64 is arranged between the ring center line "g" and the inner periphery 21*a* (inner peripheral surface) of the guide ring 21 in the radial direction of the guide ring 21. Each of the liquid guides 64 is arranged on a circle C2 having a radius r1 centered at the ring center line "g" of the guide ring 21. Each of the liquid guides 64 is arranged so that the column center line "o" is located at (matched with) the circle C2. Each of the liquid guides 64 is arranged so as to be separated at guide angles θB between each of the liquid guides 64 in the circumferential direction C of the guide ring 21.

Figure 49:
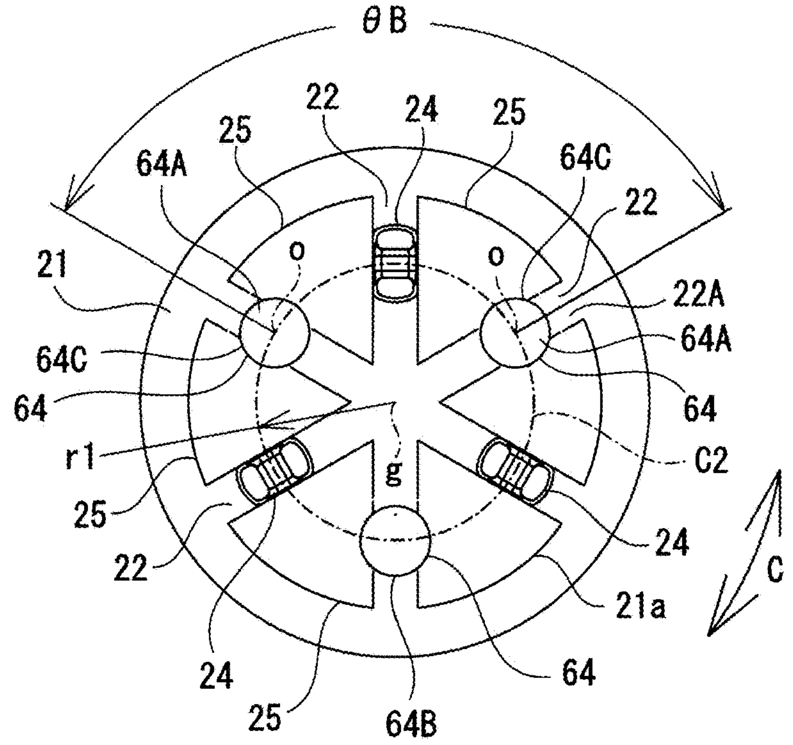
FIG. 49 is a top plan view (top view) for illustrating the liquid guide body in the bubble liquid generating nozzle according to the fifth embodiment.

As illustrated in FIG. 48 to FIG. 50, each of the liquid guides 64 is placed on each of the guide ribs 22 separated at the guide angles θB. Each of the liquid guides 64 is fixed to each of the guide ribs 22 so that the circular bottom surface 64B is brought into abutment against the rib front surface 22A of each of the guide ribs 22.

Each of the liquid guides 64 is fixed to each of the guide ribs 22 so that the circular bottom surface 64B (outer peripheral side surface 64C) protrudes from each of the guide ribs 22 to each of the communication holes 25 in the circumferential direction C of the guide ring 21 (liquid guide 64).

Each of the liquid guides 64 protrudes from the rib front surface 22A of the guide ribs 22 in the direction G of the ring center line "g" of the guide ring 21 to be provided upright on the guide ribs 22.

In the bubble liquid generating nozzle Y1, each of the connecting protrusions 24 is arranged between each of the liquid guides 64 (see FIG. 49) in the same manner as described in FIG. 10 to FIGS. 14.

As illustrated in FIG. 43 to FIGS. 47, the liquid guide body 63 (guide ring 21, each guide rib 22, each liquid guide 64, and each connecting protrusion 24) is incorporated into the nozzle main body 1.

The liquid guide body 63 is inserted into the inflow space "δ" (into the tubular body 8) from the another tube end 8B so that the circular upper surface 64A of the liquid guide 64 faces the closing flat plate 9. The liquid guide body 63 is inserted into the inflow space "δ" concentrically with the tubular body 8.

As illustrated in FIG. 43 to FIGS. 47, each of the liquid guides 64 is arranged in each of the liquid jetting holes 62. Each of the liquid guides 64 is arranged in each of the liquid jetting holes 62 from the inflow space "δ". Each of the liquid guides 64 is arranged concentrically with each of the liquid jetting holes 62, and is arranged in the liquid jetting holes 62.

As illustrated in FIGS. 46 and FIGS. 47, each of the liquid guides 64 is inserted into each of the liquid jetting holes 2 from the circular upper surface 64A (one end face) with a gap between the outer peripheral side surface 64C (side surface) and an inner peripheral surface 62*a* (circular inner peripheral surface) of each of the liquid jetting holes 62. As illustrated in FIGS. 47, each of the liquid guides 64 is arranged concentrically with each of the liquid jetting holes 62 to be mounted in each of the liquid jetting holes 52 so as to form a liquid flow path "β" between the uneven surface (outer peripheral side surface 64C) and the inner peripheral surface 62*a* of each of the liquid jetting holes 62. Each of the liquid guides 64 is mounted in each of the liquid jetting holes 2 so that the circular upper surface 64A is arranged to be flush with the another closing plate flat surface 9B (another nozzle plate surface) of the closing flat plate 9 (nozzle flat plate/nozzle plate). As illustrated in FIGS. 46 and FIGS. 47, each of the liquid flow paths β1 is formed in an annular shape (circular annular shape) over a circumferential direction of the liquid jetting hole 62 between the uneven surface (outer peripheral side surface 64C/side surface) and the inner peripheral surface 62*a* of the liquid jetting hole 62. The liquid flow path β1 is formed in an annular shape (circular annular shape) over an entire circumference of the inner peripheral surface 62*a* of the liquid jetting hole 2. The liquid flow path β1 is formed in a circular annular shape (annular shape) over the circumferential direction of the liquid jetting hole 62 (circumferential direction of the liquid guide 64) between each of the convex portions 65 of the uneven surface (outer peripheral side surface 64C) and the inner peripheral surface 62*a* of the liquid jetting hole 62. As illustrated in FIGS. 47, the liquid flow path "λ" is formed in an annular shape (circular annular shape) penetrating through the closing plate 9 (nozzle flat plate) in the direction V of the hole center line "v" of the liquid jetting hole 62. The liquid flow path β1 penetrates through the closing flat plate 9 in the direction V of the hole center line "v" of the liquid jetting hole 62 and communicates to the inflow space "δ". The liquid flow path β1 is opened to each of the closing plate flat surfaces 9A and 9B (each of the nozzle plate flat surfaces) of the closing flat plate 9 (nozzle flat plate) over the circumferential direction of the liquid jetting hole 2 and communicates to the inflow space "δ" (flow path space "γ").

In the bubble liquid generating nozzle Y1, each of the connecting protrusions 24 is fixed to each of the connecting tubular portions 10 (nozzle main body 1) by pressing of each of the connecting convex portions 30 and 31 against the inner peripheral surface 10*b* (see FIGS. 47) in the same manner as described in FIG. 3, FIGS. 5, and FIG. 7.

As illustrated in FIGS. 47, the guide ring 21, each of the guide ribs 22, and each of the liquid guides 64 are fixed to the nozzle main body 1 by fixing of each of the connecting protrusions 24 to each of the connecting tubular portions 10 (nozzle main body 1).

The guide ring 21 is arranged concentrically with the tubular body 8 in the inflow space "δ", and is fixed to the nozzle main body 1.

The guide ring 21 partitions the flow path space "γ" between the guide ring 21 and the closing flat plate 9 (closing body) in the direction A of the tube center line "a" of the tubular body 8 (see FIGS. 47) in the same manner as described in FIGS. 5.

Each of the guide ribs 22 partitions the flow path space "γ" between each of the guide ribs 22 and the closing flat plate 9 (closing body) in the direction A of the tube center line "a" of the tubular body 8 (see FIGS. 47) in the same manner as described in FIGS. 5 and FIG. 6.

As illustrated in FIGS. 47, each of the liquid guides 64 is arranged so that the circular bottom surface 64B side (another end face side) protrudes from each of the liquid jetting holes 62 to the flow path space "γ" by abutment of each of the guide ribs 22 (rib front surface 22A) against each of the connecting tubular portions 10 (another connecting tube end 10B). Each of the liquid guides 64 is arranged so that the outer peripheral side surface 64C (side surface) on the circular bottom surface 64B side (another end face side) protrudes from each of the liquid jetting holes 62 to the flow path space "γ". Each of the liquid flow paths β1 penetrates through the closing flat plate 9 in the direction V of the hole center line "v" of the liquid jetting hole 62 and communicates to the flow path space "γ".

In FIG. 43 to FIGS. 47, in the bubble liquid generating nozzle Y1, a liquid (for example, water) flows from the another tube end 8B of the tubular body 8 into the inflow space "δ". The liquid having flowed into the inflow space "δ" flows into each of the communication holes 25, flows through each of the communication holes 25, and flows out to the flow path space "γ".

As illustrated in FIGS. 46 and FIGS. 47, the liquid having flowed out to the flow path space "γ" flows along the outer peripheral side surface 64C (uneven surface) on the circular bottom surface 64B side, and flows into each of the liquid flow paths β1. The liquid having flowed out to the flow path space "γ" is guided by the outer peripheral side surface 64C (uneven surface) protruding to the flow path space "γ", and flows into the liquid flow path β1 from the entire circumference of each of the liquid jetting holes 2.

As illustrated in FIGS. 47, the liquid having flowed into the liquid flow path β1 from the flow path space "γ" (inflow space "δ") flows through the liquid flow path β1 (between the uneven surface and the inner peripheral surface 62*a*). As a result, the liquid is reduced in pressure while being increased in flow velocity, and is ejected from the nozzle main body 1 (each of the liquid jetting holes 62). The liquid having flowed into the liquid flow path β1 flows along the uneven surface (outer peripheral side surface 64C) to become turbulence due to the uneven surface, and generates cavitation. The gas (air) in the liquid flowing through the liquid flow path β1 is precipitated from the liquid by cavitation and turbulence (fluid resistance), and is crushed (sheared) to form a large amount of microbubbles and a large amount of ultrafine bubbles. The microbubbles and ultrafine bubbles are mixed and dissolved in the liquid flowing through the liquid flow path β1, and become a bubble liquid (bubble water) in which a large amount of microbubbles and a large amount of ultrafine bubbles are mixed and dissolved. The bubble liquid flows through the liquid flow path β1, and is ejected from each of the liquid jetting holes 62 (liquid flow path β1). The bubble liquid (bubble water) flows through the liquid flow path β1 in an annular shape (circular annular shape) due to the liquid flow path β1 (between the inner peripheral surface 62*a* and the uneven surface) formed in an annular shape (circular annular shape) over the circumferential direction of the liquid jetting hole 62 to be formed into a liquid film (film of water) having an annular shape (circular annular shape), and is ejected from each of the liquid jetting holes 62 (liquid flow path β1). The liquid film (water film) having an annular shape (circular annular shape) becomes a soft annular liquid film (annular bubble liquid film), and is ejected from each of the liquid jetting holes 2 to an ejection target to effectively remove dirt and germs from the ejection target. The liquid flow path β1 forms the liquid (bubble liquid) flowing through the liquid flow path β1 into an annular shape (circular annular shape) and ejects the annular liquid (bubble liquid/annular bubble liquid film) from the liquid jetting hole 62.

A bubble liquid generating nozzle according to a sixth embodiment is described with reference to FIG. 52 to FIGS. 62.

In FIG. 52 to FIGS. 62, the same reference symbols as those in FIG. 1 to FIGS. 14 and FIG. 43 to FIGS. 51 denote the same members and the same configurations, and hence the detailed description thereof is omitted.

In FIG. 52 to FIGS. 62, a bubble liquid generating nozzle Y2 according to the sixth embodiment (hereinafter referred to as "bubble liquid generating nozzle Y2") includes a nozzle main body 1, a plurality of (for example, three) liquid jetting holes 62, and a liquid guide body 73 (liquid guides 74).

As illustrated in FIG. 57 to FIGS. 60, the inner peripheral surface 62*a* (circular inner peripheral surface) of each of the liquid jetting holes 62 is formed in a shape of an uneven surface (uneven shape) on which a convex portion 75 and a concave portion 76 are arranged. The inner peripheral surface 62*a* of each of the liquid jetting holes 62 is formed in a shape of an uneven surface (uneven shape) having a plurality of convex portions 75 and a plurality of concave portions 76.

Figure 59:
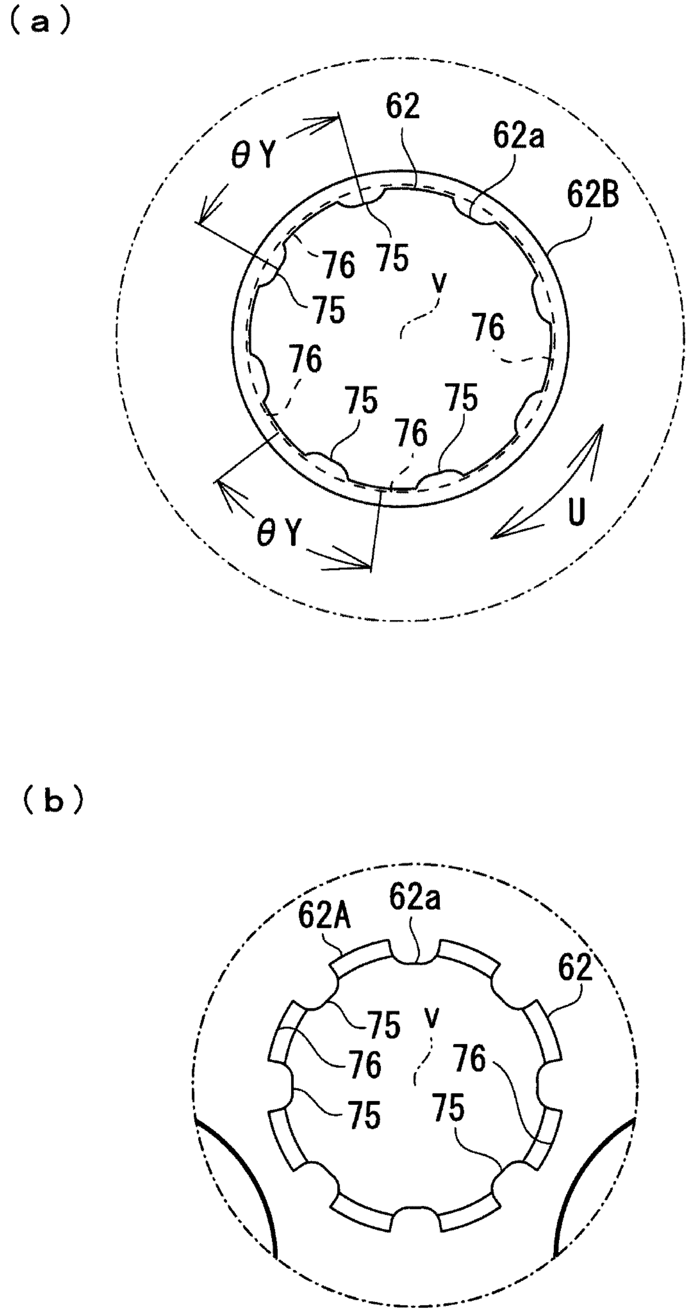
FIG. 59(*a*) is an enlarged view of a p-portion of FIG. 58(*a*), and FIG. 59(*b*) is an enlarged view of an s-portion of FIG. 58(*b*).
Figure 60:
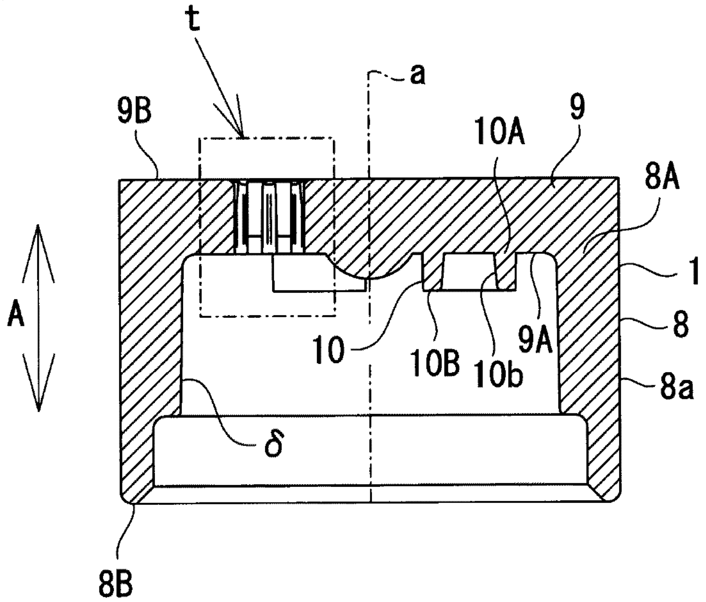
FIG. 60(*a*) is a sectional view taken along the line q-q of FIG. 58(*a*), and FIG. 60(*b*) is an enlarged view of a t-portion of FIG. 60(*a*).
Figure 60:
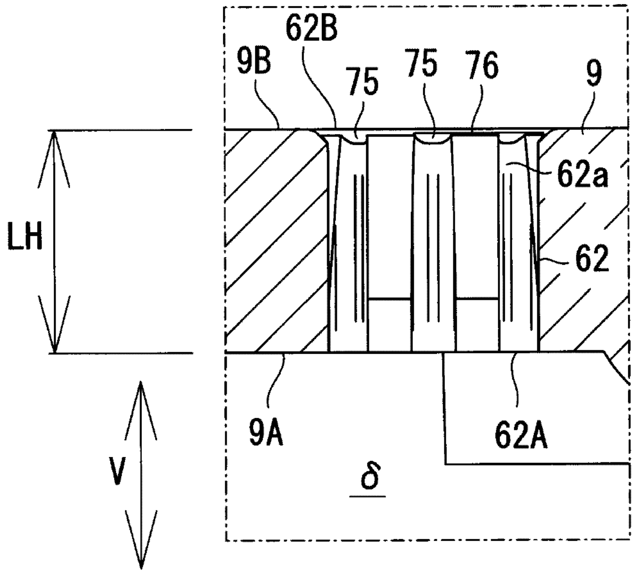

As illustrated in FIGS. 59 and FIGS. 60, each of the plurality of convex portions 75 is formed in a linear shape (stripe) (stripe convex portion/stripe convex portion). Each of the convex portions 75 is arranged so as to be separated at arrangement angles θY between each of the convex portions 75 in a circumferential direction U of the liquid jetting hole 62.

As illustrated in FIGS. 59 and FIGS. 60, each of the plurality of concave portions 76 is formed in a linear shape (stripe) (linear concave portion/stripe concave portion). Each of the concave portions 76 is formed (arranged) between each of the convex portions 75 so as to be separated at the arrangement angles θY between each of the concave portions 76 in the circumferential direction U of the liquid jetting hole 62.

Each of the convex portions 75 has, for example, a protrusion width in the circumferential direction U of the liquid jetting hole 62, and each of the concave portions 76 has, for example, a recess width in the circumferential direction U of the liquid jetting hole 62 and is arranged between each of the convex portions 75. The recess width of each of the concave portions 76 is the same as the protrusion width of each of the convex portions 75, or is larger than the protrusion width.

As illustrated in FIGS. 59 and FIGS. 60, each of the convex portions 75 and each of the concave portions 76 are arranged concentrically with the liquid jetting hole 62. Each of the convex portions 75 and each of the concave portions 76 extend between the opening 62A on the inflow space "δ" side (one closing plate flat surface 9A) and the another opening 62B side (another closing plate flat surface 9B side) in the direction V of the hole center line "v" of the liquid jetting hole 62, to thereby form the uneven surface of the inner peripheral surface 62*a* (form the inner peripheral surface 62*a* into an uneven shape).

Figure 61:
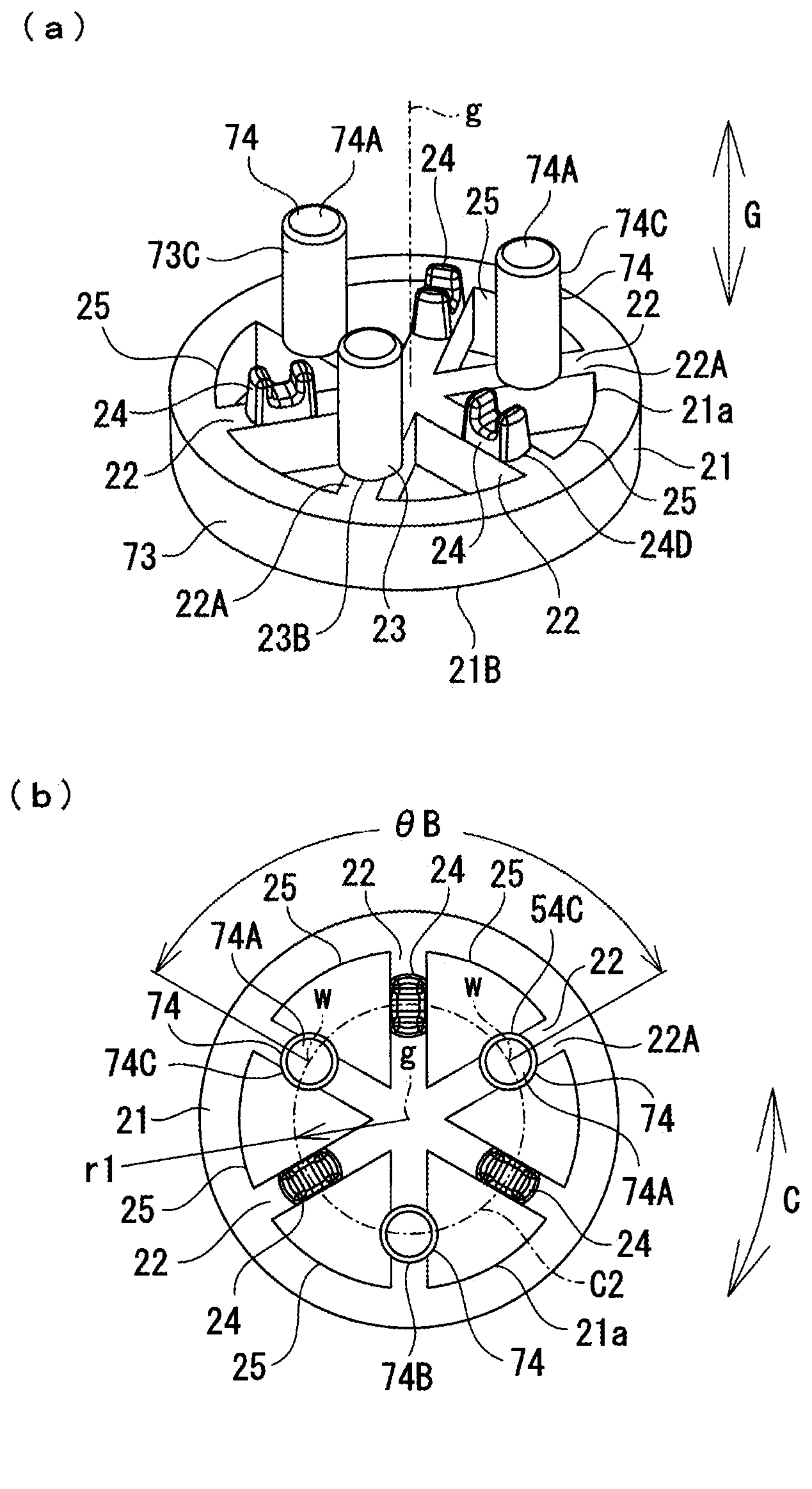
FIG. 61(*a*) is a perspective view for illustrating a liquid guide body in the bubble liquid generating nozzle according to the sixth embodiment, and FIG. 61(*b*) is a top plan view (top view) for illustrating the liquid guide body.
Figure 62:
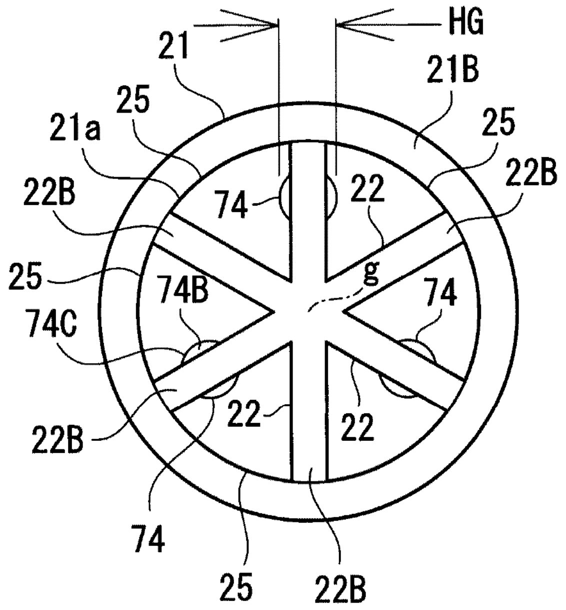
FIG. 62(*a*) is a bottom plan view (bottom view) for illustrating the liquid guide body in the bubble liquid generating nozzle according to the sixth embodiment, and FIG. 62(*b*) is a side view for illustrating the liquid guide body.
Figure 62:
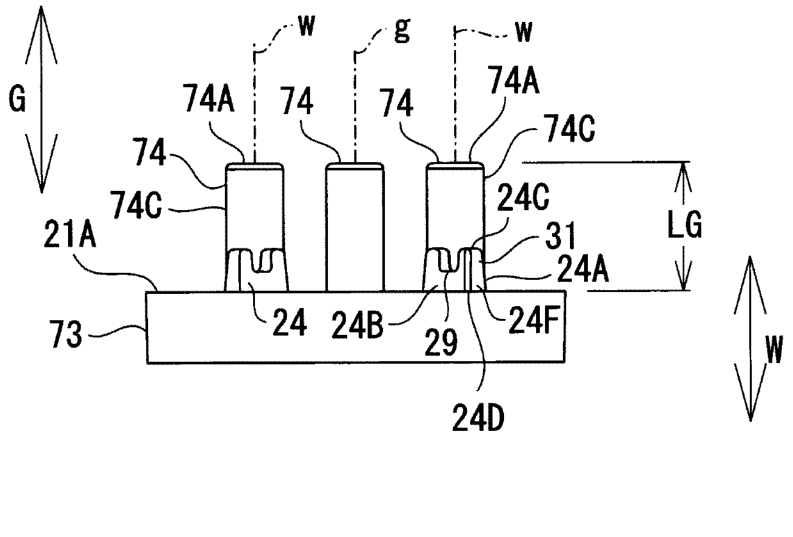

As illustrated in FIGS. 61 and FIGS. 62, the liquid guide body 73 (guide fixed body) includes a guide ring 21, a plurality of (for example, six) guide ribs (guide legs), a plurality of (for example, three) liquid guides 74, and a plurality of (for example, three) connecting protrusions 24.

As illustrated in FIGS. 61 and FIGS. 62, each of the liquid guides 74 is formed in a three-dimensional shape having a pair of end faces and a side surface arranged (formed) between each of the end faces. Each of the liquid guides 74 is formed in a columnar shape (columnar body). Each of the liquid guides 74 has a circular upper surface 74A (one columnar end face/one end face), a circular bottom surface 74B (another columnar end face/another end face), and an outer peripheral side surface 74C (side surface). The outer peripheral side surface 74C (side surface) of each of the liquid guides 74 is arranged (formed) between the circular upper surface 74A and the circular bottom surface 74B (between each of the end faces).

As illustrated in FIGS. 62, each of the liquid guides 74 has a guide height LG in a direction W of a columnar center line "w". Each of the liquid guides 74 has a maximum diameter HG of the circular bottom surface 74B.

As illustrated in FIGS. 61 to FIGS. 62, each of the liquid guides 74 is arranged between the ring center line "g" and the inner periphery 21*a* (inner peripheral surface) of the guide ring 21 in the radial direction of the guide ring 21. Each of the liquid guides 74 is arranged on a circle c2 having a radius r1 centered at the ring center line "g" of the guide ring 21. Each of the liquid guides 74 is arranged so that the columnar center line "w" is located at (matched with) the circle C2. Each of the liquid guides 74 is arranged so as to be separated at guide angles θB between each of the liquid guides 74 in the circumferential direction C of the guide ring 21.

As illustrated in FIGS. 61 and FIGS. 62, each of the liquid guides 74 is placed on each of the guide ribs 22 separated at the guide angles θB. Each of the liquid guides 74 is fixed to each of the guide ribs 22 so that the circular bottom surface 74B is brought into abutment against the rib front surface 22A of each of the guide ribs 22.

Each of the liquid guides 7 is fixed to each of the guide ribs 22 so that the circular bottom surface 74B (outer peripheral side surface 73C) protrudes from each of the guide ribs 22 to each of the communication holes 25 in the circumferential direction C of the guide ring 21 (liquid guide 74).

Each of the liquid guides 74 protrudes from the rib front surface 22A of the guide ribs 22 in the direction G of the ring center line "g" of the guide ring 21 to be provided upright on the guide ribs 22.

In the bubble liquid generating nozzle Y2, each of the connecting protrusions 24 is arranged between each of the liquid guides 74 (see FIGS. 61 and FIGS. 62) in the same manner as described in FIG. 10 to FIGS. 14.

As illustrated in FIG. 52 to FIGS. 56, the liquid guide body 73 (guide ring 21, each guide rib 22, each liquid guide 74, and each connecting protrusion 24) is incorporated into the nozzle main body 1.

The liquid guide body 73 is inserted into the inflow space "δ" (into the tubular body 8) from the another tube end 8B so that the circular upper surface 74A of the liquid guide 74 faces the closing flat plate 9. The liquid guide body 73 is inserted into the inflow space "δ" concentrically with the tubular body 8.

As illustrated in FIG. 52 to FIGS. 56, each of the liquid guides 74 is arranged in each of the liquid jetting holes 62. Each of the liquid guides 74 is arranged in each of the liquid jetting holes 62 from the inflow space "δ". Each of the liquid guides 74 is arranged concentrically with each of the liquid jetting holes 62, and is arranged in each of the liquid jetting holes 62.

Figure 55:
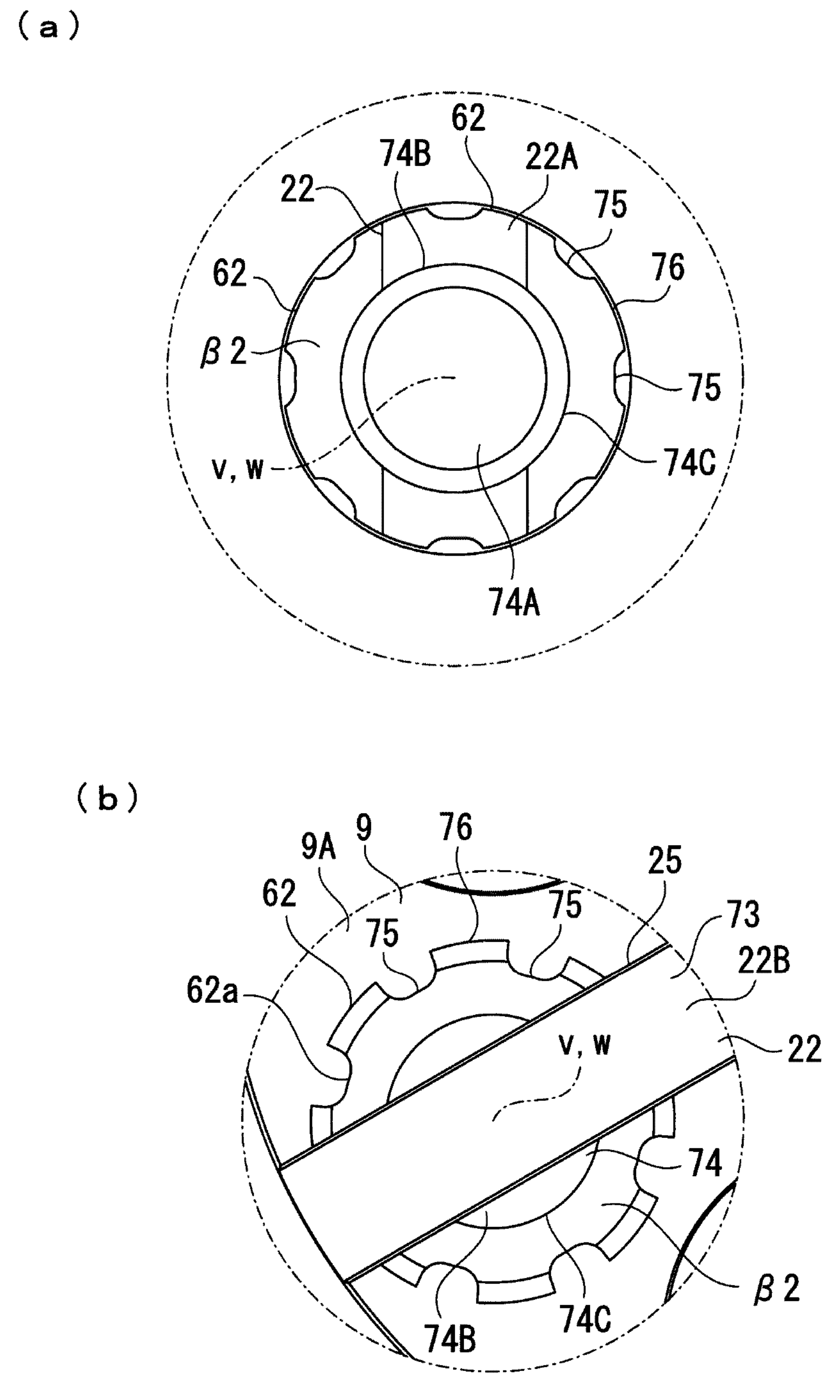
FIG. 55(*a*) is an enlarged view of an m-portion of FIG. 53, and FIG. 55(*b*) is an enlarged view of an n-portion of FIG. 54.
Figure 56:
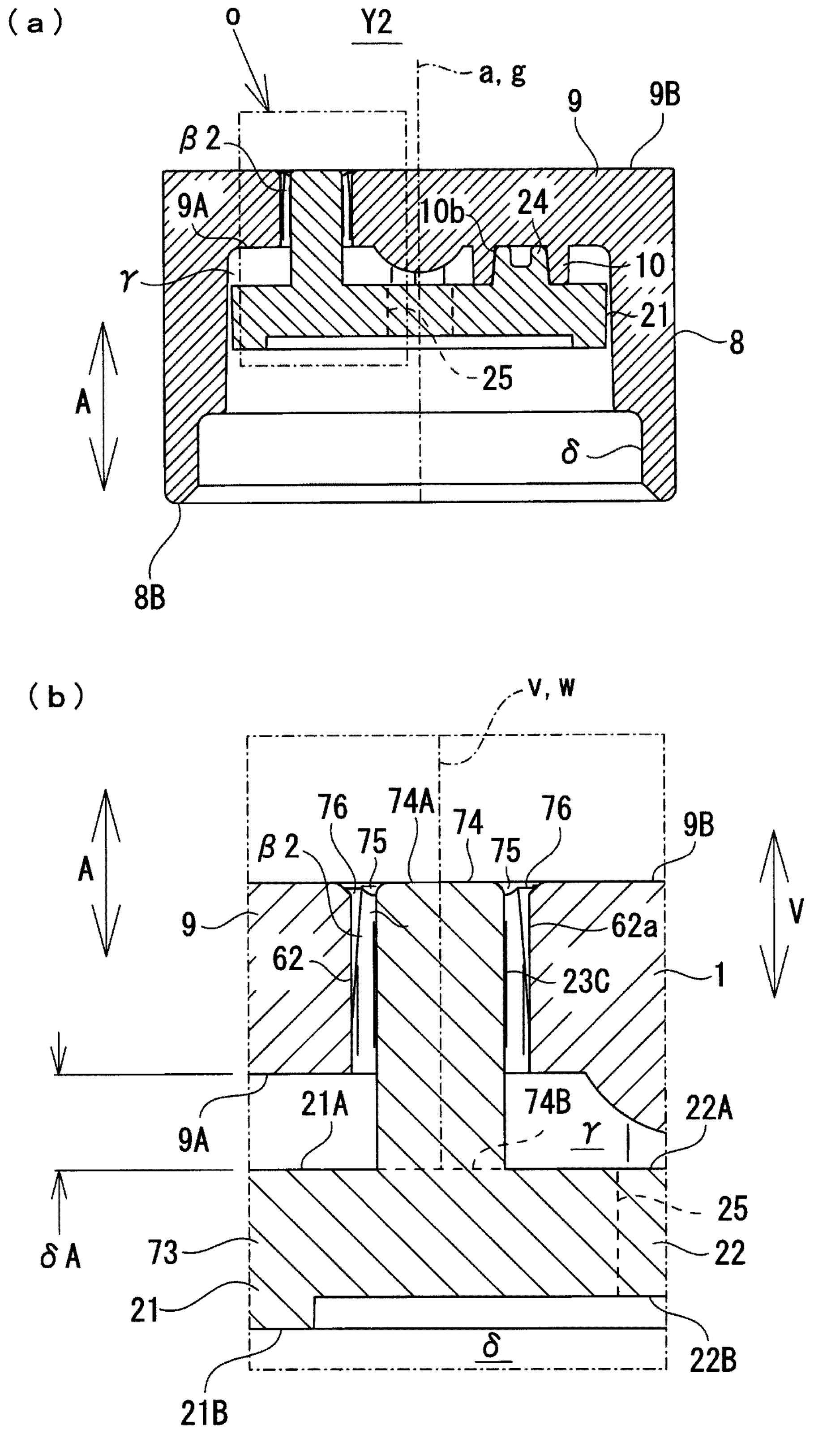
FIG. 56(*a*) is a sectional view taken along the line I-I, and FIG. 56(*b*) is an enlarged view of an o-portion of FIG. 56(*a*).
Figure 57:
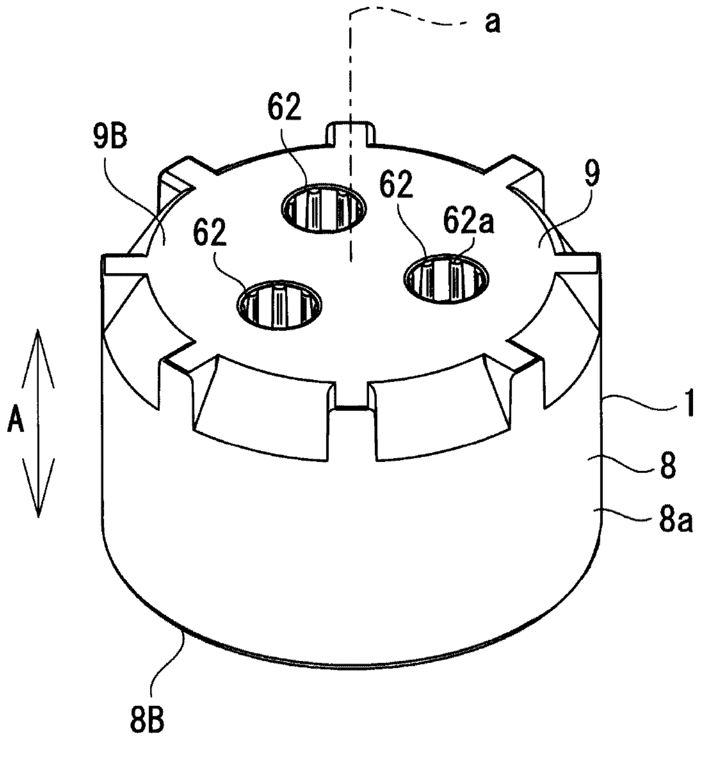
FIG. 57 is a perspective view for illustrating a nozzle main body in the bubble liquid generating nozzle according to the sixth embodiment.
Figure 58:
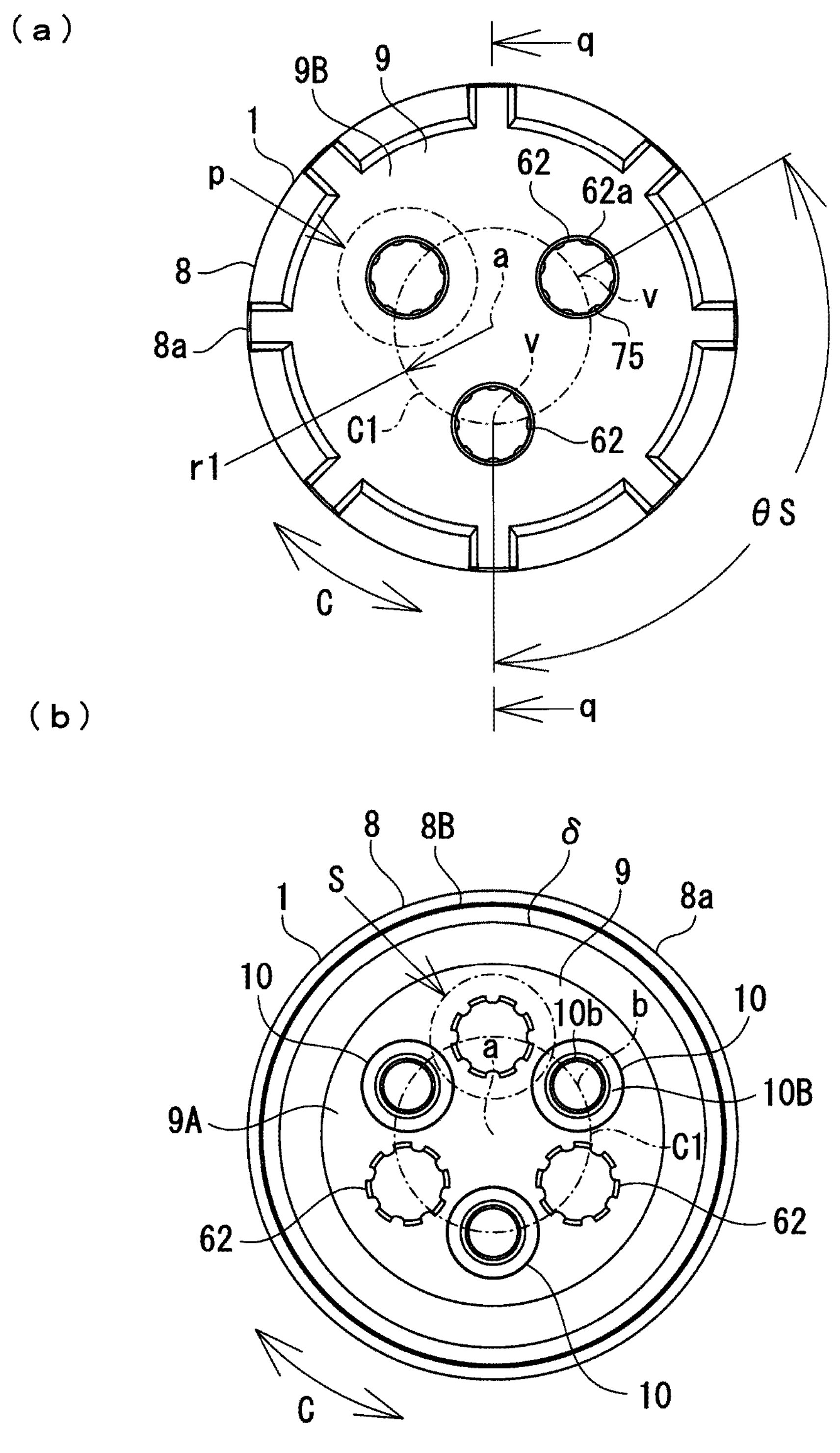
FIG. 58(*a*) is a top plan view (top view) for illustrating the nozzle main body in the bubble liquid generating nozzle according to the sixth embodiment, and FIG. 58(*b*) is a bottom plan view (bottom view) for illustrating the nozzle main body.

As illustrated in FIGS. 55 and FIGS. 56, each of the liquid guides 74 is inserted into each of the liquid jetting holes 2 from the circular upper surface 74A (one end face) with a gap between the outer peripheral side surface 74C (side surface) and the inner peripheral surface 62*a* (circular inner peripheral surface) of each of the liquid jetting holes 62. As illustrated in FIGS. 55 and FIGS. 56, each of the liquid guides 74 is arranged concentrically with each of the liquid jetting holes 62 to be mounted in each of the liquid jetting holes 62 so as to form a liquid flow path β2 between the outer peripheral side surface 74C and the uneven surface (inner peripheral surface 62*a*) of each of the liquid jetting holes 62. Each of the liquid guides 74 is mounted in each of the liquid jetting holes 2 so that the circular upper surface 74A is arranged to be flush with the another closing plate flat surface 9B (another nozzle plate surface) of the closing flat plate 9 (nozzle flat plate/nozzle plate). As illustrated in FIGS. 55 and FIGS. 56, each of the liquid flow paths β2 is formed in an annular shape (circular annular shape) over the circumferential direction of the liquid jetting hole 62 between the uneven surface (inner peripheral surface 62*a*) and the outer peripheral side surface 74C of the liquid guide 74. The liquid flow path β2 is formed in an annular shape (circular annular shape) over an entire circumference of the inner peripheral surface 2*a* of the liquid jetting hole 62 (outer peripheral side surface 74C of the liquid guide 74). The liquid flow path β2 is formed in a circular annular shape (annular shape) over the circumferential direction of the liquid jetting hole 62 (liquid guide 74) between the convex portions 75 of the uneven surface (inner peripheral surface 62*a*) and the outer peripheral side surface 74C of the liquid guide 74. As illustrated in FIGS. 56, the liquid flow path β2 is formed in an annular shape (circular annular shape) penetrating through the closing plate 9 (nozzle flat plate) in the direction V of the hole center line "v" of the liquid jetting hole 62. The liquid flow path β2 penetrates through the closing flat plate 9 in the direction V of the hole center line "v" of the liquid jetting hole 62 and communicates to the inflow space "δ". The liquid flow path β2 is opened to each of the closing plate flat surfaces 9A and 9B (each of the nozzle plate flat surfaces) of the closing flat plate 9 (nozzle flat plate) over the circumferential direction of the liquid jetting hole 2 and communicates to the inflow space "δ" (flow path space "γ").

In the bubble liquid generating nozzle Y2, each of the connecting protrusions 24 is fixed to each of the connecting tubular portions 10 (nozzle main body 1) by pressing of each of the connecting convex portions 30 and 31 against the inner peripheral surface 10*b* (see FIGS. 56) in the same manner as described in FIG. 3, FIGS. 5, and FIG. 7.

As illustrated in FIGS. 56, the guide ring 21, each of the guide ribs 22, and each of the liquid guides 74 are fixed to the nozzle main body 1 by fixing of each of the connecting protrusions 24 to each of the connecting tubular portions 10 (nozzle main body 1).

The guide ring 21 is arranged concentrically with the tubular body 8 in the inflow space "δ", and is fixed to the nozzle main body 1.

The guide ring 21 partitions the flow path space "γ" between the guide ring 21 and the closing flat plate 9 (closing body) in the direction A of the tube center line "a" of the tubular body 8 (see FIGS. 56) in the same manner as described in FIGS. 5.

Each of the guide ribs 22 partitions the flow path space "γ" between each of the guide ribs 22 and the closing flat plate 9 (closing body) in the direction A of the tube center line "a" of the tubular body 8 (see FIGS. 56) in the same manner as described in FIGS. 5 and FIG. 6.

As illustrated in FIGS. 56, each of the liquid guides 74 is arranged so that the circular bottom surface 64B side (another end face side) protrudes from each of the liquid jetting holes 62 to the flow path space "γ" by abutment of each of the guide ribs 22 (rib front surface 22A) against each of the connecting tubular portions 10 (another connecting tube end 10B). Each of the liquid guides 74 is arranged so that the outer peripheral side surface 64C (side surface) on the circular bottom surface 64B side (another end face side) protrudes from each of the liquid jetting holes 62 to the flow path space "γ". Each of the liquid flow paths "β2" penetrates through the closing flat plate 9 in the direction V of the hole center line "v" of the liquid jetting hole 62 and communicates to the flow path space "γ".

In FIG. 52 to FIGS. 56, in the bubble liquid generating nozzle Y2, a liquid (for example, water) flows from the another tube end 8B of the tubular body 8 into the inflow space "δ". The liquid having flowed into the inflow space "δ" flows into each of the communication holes 25, flows through each of the communication holes 25, and flows out to the flow path space "γ".

As illustrated in FIGS. 55 and FIGS. 56, the liquid having flowed out to the flow path space "γ" flows along the outer peripheral side surface 74C (uneven surface) on the circular bottom surface 74B side, and flows into each of the liquid flow paths β2. The liquid having flowed out to the flow path space "γ" is guided by the outer peripheral side surface 74C protruding to the flow path space "γ", and flows into the liquid flow path β2 from the entire circumference of each of the liquid jetting holes 2.

As illustrated in FIGS. 56, the liquid having flowed into the liquid flow path β2 from the flow path space "γ" (inflow space "δ") flows through the liquid flow path β2 (between the uneven surface and the outer peripheral side surface 74C). As a result, the liquid is reduced in pressure while being increased in flow velocity, and is ejected from the nozzle main body 1 (each of the liquid jetting holes 62). The liquid having flowed into the liquid flow path β2 flows along the uneven surface (inner peripheral surface 62*a*) to become turbulence due to the uneven surface, and generates cavitation. The gas (air) in the liquid flowing through the liquid flow path β2 is precipitated from the liquid by cavitation and turbulence (fluid resistance), and is crushed (sheared) to form a large amount of microbubbles and a large amount of ultrafine bubbles. The microbubbles and ultrafine bubbles are mixed and dissolved in the liquid flowing through the liquid flow path β1, and become a bubble liquid (bubble water) in which a large amount of microbubbles and a large amount of ultrafine bubbles are mixed and dissolved. The bubble liquid flows through the liquid flow path β2, and is ejected from each of the liquid jetting holes 62 (liquid flow path β1). The bubble liquid (bubble water) flows through the liquid flow path β2 in an annular shape (circular annular shape) due to the liquid flow path β2 (between the inner peripheral surface 62*a* and the uneven surface) formed in an annular shape (circular annular shape) over the circumferential direction of the liquid jetting hole 62 to be formed into a liquid film (film of water) having an annular shape (circular annular shape), and is ejected from each of the liquid jetting holes 62 (liquid flow path β2). The liquid film (water film) having an annular shape (circular annular shape) becomes a soft annular liquid film (annular bubble liquid film), and is ejected from each of the liquid jetting holes 2 to an ejection target to effectively remove dirt and germs from the ejection target. The liquid flow path β2 forms the liquid (bubble liquid) flowing through the liquid flow path β into an annular shape (circular annular shape) and ejects the annular liquid (bubble liquid/annular bubble liquid film) from the liquid jetting hole 62.

In the bubble liquid generating nozzle of the present invention, each of the liquid jetting holes 2 and 62 is not limited to be formed in a conical hole or a circular hole and may be any of various holes, such as a polygonal hole and an elliptical hole, and the inner peripheral surface of each of various holes is formed in a shape of an uneven surface on which a convex portion and a concave portion are arranged. The uneven surface (inner peripheral surface) of each of various holes forms a liquid flow path having an annular shape (circular annular shape) over the circumferential direction of the liquid jetting hole between the uneven surface and the side surface of the liquid guide.

In the bubble liquid generating nozzle of the present invention, the liquid guides 23, 34, 44, 54, 64, and 74 are not limited to a conical shape or a columnar shape and may be formed in a three-dimensional shape, such as a pyramidal shape or an elliptical columnar shape, having a pair of end faces and a side surface between each of the end faces, and the side surface of the three-dimensional shape is formed in a shape of an uneven surface on which a convex portion and a concave portion are arranged. The uneven surface having a three-dimensional shape forms a liquid flow path having an annular shape (circular annular shape) over the circumferential direction of the liquid jetting hole between the uneven surface and the inner peripheral surface of the liquid jetting hole.

Industrial Applicability

The present invention is most suitable for generating (producing) a bubble liquid.

REFERENCE SIGNS LIST

X1 bubble liquid generating nozzle
1 nozzle main body
8 tubular body
9 closing flat plate (closing body δ inflow space
2 liquid jetting hole
23 liquid guide
23A conical upper surface
23B conical bottom surface
23C conical side surface (uneven surface
27 convex portion
28 concave portion
ε liquid flow path

The invention claimed is:

1. A bubble liquid generating nozzle, comprising:

a nozzle main body, which includes a tubular body, a closing flat plate that closes one tube end of the tubular body, and a plurality of connecting tubular portions, and in which an inflow space into which a liquid flows is formed inside the tubular body between another tube end of the tubular body and the closing plate;

a plurality of liquid jetting holes that are arranged between a tube center line of the tubular body and-an outer peripheral surface of the tubular body; and a guide fixed body, wherein the closing flat plate closes one tube end of the tubular body so that one closing plate flat surface is brought into abutment against the one tube end of the tubular body;

wherein each of the connecting tubular portions is arranged between the tube center line of the tubular body and the outer periphery of the tubular body, wherein each of the connecting tubular portions is arranged so as to be separated at tube angles between each of the connecting tubular portions in a circumferential direction of the tubular body, wherein each of the connecting tubular portions is arranged in the inflow space so that one connecting tube end of the connecting tubular portion is brought into abutment against the one closing plate flat surface of the closing flat plate, wherein each of the connecting tubular portions is fixed to the closing flat plate so as to protrude from the one closing plate flat surface of the closing flat plate to the inflow space in a direction of the tube center line of the tubular body, wherein each of the liquid jetting holes is arranged so as to be separated at hole angles between each of the liquid jetting holes in the circumferential direction of the-tubular body, wherein each of the liquid jetting holes is arranged between each of the connecting tubular portions in the circumferential direction of the tubular body, wherein each of the liquid jetting holes penetrates through the closing flat plate in the direction of the tube center line of the tubular body to be opened to each of the closing plate flat surfaces of the closing flat plate, wherein each of the liquid jetting holes is formed in a shape of a conical hole penetrating through the closing flat plate while being reduced in diameter from the inflow space side, wherein the guide fixed body includes a guide ring arranged in the inflow space concentrically with the tubular body, a plurality of guide ribs arranged inside the guide ring and having a rib thickness in the direction of a ring center line of the guide ring, a plurality of liquid guides each formed in a conical shape, and-a plurality of connecting protrusions, wherein each of the guide ribs is arranged so as to be separated at rib angles between each of the guide ribs in a circumferential direction of the guide ring, to thereby form a communication hole between each of the guide ribs, wherein each of the guide ribs extends between the ring center line and inner peripheral surface of the guide ring, and is fixed to the inner periphery of the guide-ring, wherein a conical side surface of the liquid guide is an undulating surface having a plurality of convex portions and a plurality of concave portions, wherein each of the convex portions is arranged so as to be separated at arrangement angles between each of the convex portions in a circumferential direction of the liquid guide, wherein each of the concave portions is formed between each of the convex portions so as to be separated at arrangement angles between each of the concave portions in the circumferential direction of the liquid guide, wherein each of the liquid guides is arranged between the ring center line and the inner peripheral surface of the guide ring, wherein each of the liquid guides is arranged so as to be separated at guide angles between each of the liquid guides in the circumferential direction of the guide ring, wherein each of the liquid guides is fixed to each of the guide ribs so that a conical bottom surface of the liquid guide is brought into abutment against a rib front surface in a rib thickness direction of each of the guide ribs, wherein each of the liquid guides is inserted into each of the liquid jetting holes from a conical upper surface of the liquid guide with a gap between the conical side surface and a conical inner peripheral surface of the liquid jetting holes, wherein each of the liquid guides is arranged so that the conical bottom surface protrudes from each of the guide ribs to each of the communication holes in the circumferential direction of the guide ring, wherein each of the liquid guides is mounted in each of the liquid jetting holes so as to form a liquid flow path between the conical side surface and the conical inner peripheral surface, wherein each of the connection protrusions is arranged between the ring center line and the inner peripheral surface of the guide-ring, wherein each of the connecting protrusions is placed on each of the guide ribs between each of the liquid guides so as to be separated at protrusion angles between each of the connecting protrusions in the circumferential direction of the guide ring, wherein each of the connecting protrusions is fixed to each of the guide ribs so that a bottom surface of each of the connecting protrusions is brought into abutment against the rib front surface of each of the guide ribs, wherein each of the connecting protrusions is press-fitted into each of the connecting tubular portions from the inflow space, and is mounted in each of the connecting tubular portions, wherein each of the guide ribs on which the connecting protrusions are placed is arranged in the inflow space so that the rib front surface of each of the guide ribs is brought into abutment against the another connecting tube end of each of the connecting tubular portions by insertion of each of the connecting protrusions into each of the connecting tubular portions, wherein each of the guide ribs partitions a flow path space with a guide interval between the rib front surface of each of the guide ribs and the one closing plate flat surface by abutment against the another connecting tube end of each of the connecting tubular portions, wherein each of the communication holes communicates to another tube end of the tubular body and the flow path space, wherein each of the liquid flow paths is formed in an annular shape over a circumferential direction of the liquid jetting holes between the conical side surface and the conical inner peripheral surface of the liquid jetting holes and communicates to the flow path space, and wherein the liquid having flowed out to the flow path space flows into the liquid flow path, and the liquid flow path ejects the annular liquid from each of the liquid jetting holes.

2. The bubble liquid generating nozzle according to claim 1, wherein each of the guide ribs has a rib width in the circumferential direction of the guide ring, wherein each of the connecting tubular portions has an inner peripheral surface having a conical shape that is gradually reduced in diameter from another connecting tube end of the connecting tubular portion to the one connecting tube end, wherein each of connecting protrusions is formed in a trapezoidal flat plate having the same plate thickness as the rib width of the guide rib, wherein each of the connecting protrusions includes a connecting hole groove and a pair of connecting convex portions, wherein the connecting hole groove penetrates through the connecting protrusion, is opened to a plate front surface and a plate back surface of the connecting protrusion in a plate thickness direction of the connecting protrusion, and is opened to a trapezoid upper surface of the connecting protrusion, wherein the pair of connecting convex portions is formed between the connecting hole groove and each of the trapezoidal side surface of the connecting protrusion, wherein each of the connecting protrusions is placed on each of the guide ribs between each of the liquid guides so that a trapezoidal bottom surface of the connecting protrusion is brought into abutment against the rib front surface, wherein each of the connecting protrusions is press-fitted into each of the connecting tubular portions from a trapezoidal upper surface of the connecting protrusion, wherein each of the connecting protrusions is mounted in each of the connecting tubular portions from the trapezoidal upper surface while each of the connecting convex portions is brought into abutment against a conical inner peripheral surface of the connecting tubular portion, wherein each of the connecting convex portions of each of the connecting protrusions is pressed against the inner peripheral surface of the connecting tubular portion by abutment against the conical inner peripheral surface of the connecting tubular portion, and wherein each of the connecting protrusions is fixed to each of the connecting tubular portions by pressing of each of the connecting convex portions against the inner peripheral surface of the connecting tubular portion.

3. The bubble liquid generating nozzle according to claim 2, wherein each of the connecting protrusions is placed on each of the guide ribs between each of the liquid guides so that the plate front surface and the plate back surface face the circumferential direction of the guide ring and the trapezoidal surface of the connecting protrusion is brought into abutment against the rib front surface of the guide rib, and wherein each of the connecting protrusions is fixed to each of the guide ribs so that the plate front surface and the plate back surface of the connecting protrusion are arranged to be flush with each rib width end face of the guide rib.

4. The bubble liquid generating nozzle according to claim 1, wherein each of the liquid guides is arranged so that the conical bottom surface side protrudes from each of the liquid jetting holes to the flow path space by abutment of each of the guide ribs against another connecting tube end of each of the connecting tubular portions, and wherein each of the liquid guides is mounted in each of the liquid jetting holes so that the conical upper surface of each of the liquid guides is arranged to be flush with the another closing plate flat surface of the closing flat plate.

* * * * *